United States Patent
Lukose et al.

(10) Patent No.: US 8,296,181 B1
(45) Date of Patent: Oct. 23, 2012

(54) METHOD AND SYSTEM FOR OFFSETTING PRINTING COSTS IN A SYSTEM FOR TARGETED DATA DELIVERY

(75) Inventors: Rajan Mathew Lukose, Palo Alto, CA (US); Joshua Rogers Tyler, Mountain View, CA (US); Norman Paul Jouppi, Palo Alto, CA (US); Erwin Oertli, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2326 days.

(21) Appl. No.: 11/414,245

(22) Filed: Apr. 27, 2006

(51) Int. Cl.
*G06F 17/30* (2006.01)
*G06F 17/60* (2006.01)
*G06Q 30/00* (2012.01)

(52) U.S. Cl. .............. 705/14.11; 705/14.19; 705/14.36; 707/736

(58) Field of Classification Search ............ 705/14, 705/14.56, 14.69, 34, 14.11, 14.19, 14.36; 707/3, 4, 501.1, 736; 709/228; 726/22
See application file for complete search history.

(56) References Cited

U.S. PATENT DOCUMENTS

| | | | |
|---|---|---|---|
| 5,754,938 A | 5/1998 | Herz et al. | |
| 5,794,210 A * | 8/1998 | Goldhaber et al. | 705/14.69 |
| 5,848,396 A | 12/1998 | Gerace | |
| 5,857,175 A | 1/1999 | Day et al. | |
| 5,933,811 A * | 8/1999 | Angles et al. | 705/14.56 |
| 5,974,398 A | 10/1999 | Hanson et al. | |
| 5,987,252 A | 11/1999 | Leino et al. | |
| 6,047,327 A | 4/2000 | Tso et al. | |
| 6,085,216 A | 7/2000 | Huberman et al. | |
| 6,108,639 A | 8/2000 | Walker et al. | |
| 6,182,050 B1 | 1/2001 | Ballard | |
| 6,182,068 B1 | 1/2001 | Culliss | |
| 6,195,698 B1 | 2/2001 | Lillibridge et al. | |
| 6,199,067 B1 | 3/2001 | Geller | |
| 6,324,519 B1 | 11/2001 | Eldering | |
| 6,353,925 B1 | 3/2002 | Stata et al. | |
| 6,396,833 B1 | 5/2002 | Zhang et al. | |
| 6,539,377 B1 | 3/2003 | Culliss | |

(Continued)

FOREIGN PATENT DOCUMENTS
WO WO-97/17774 5/1997

(Continued)

OTHER PUBLICATIONS

Lillibridge, Mark "Translucent Sums: A Foundation for Higher-Order Mosule Systems", (Dec. 12, 1996),1-14.

(Continued)

*Primary Examiner* — John Weiss
*Assistant Examiner* — Marilyn G Macasiano

(57) ABSTRACT

A system and method for offsetting printing costs. Specifically, the method includes collecting user information about a user and generating a user profile based on the user information. The user profile is stored such that the user profile is used to achieve delivery of data that is targeted to the user based on the user profile without requiring a release of user information in the user profile. At least one offer for the delivery of data is presented to the user. The data is targeted to the user based on the user profile. Thereafter, the method determines that an item of the data presented to the user has been printed. An incentive is received for printing the item.

20 Claims, 32 Drawing Sheets

U.S. PATENT DOCUMENTS

| | | | |
|---|---|---|---|
| 6,546,390 B1 | 4/2003 | Pollack et al. | |
| 6,560,588 B1 | 5/2003 | Minter | |
| 6,567,507 B1 | 5/2003 | Shaffer et al. | |
| 6,614,764 B1 | 9/2003 | Rodeheffer et al. | |
| 6,618,814 B1 | 9/2003 | Gaur et al. | |
| 6,654,743 B1 | 11/2003 | Hogg et al. | |
| 6,665,710 B1 | 12/2003 | Bates et al. | |
| 6,670,964 B1 | 12/2003 | Ward et al. | |
| 6,681,059 B1 | 1/2004 | Thompson | |
| 6,718,365 B1 | 4/2004 | Dutta | |
| 6,721,275 B1 | 4/2004 | Rodeheffer et al. | |
| 6,735,589 B2 | 5/2004 | Bradley et al. | |
| 6,738,978 B1 | 5/2004 | Hendricks et al. | |
| 6,771,290 B1 | 8/2004 | Hoyle | |
| 6,832,207 B1 | 12/2004 | Shkedi | |
| 6,834,195 B2 | 12/2004 | Brandenberg et al. | |
| 6,850,247 B1 | 2/2005 | Reid et al. | |
| 6,937,291 B1 | 8/2005 | Gryskiewicz | |
| 6,983,311 B1 | 1/2006 | Haitsuka et al. | |
| 7,010,176 B2 | 3/2006 | Kusunoki | |
| 7,034,848 B2 | 4/2006 | Sobel | |
| 7,035,469 B2 | 4/2006 | Laaksonen | |
| 7,061,509 B2 | 6/2006 | Dischert et al. | |
| 7,064,867 B2 | 6/2006 | Lapstun et al. | |
| 7,065,247 B2 | 6/2006 | Lapstun et al. | |
| 7,130,841 B1 | 10/2006 | Goel et al. | |
| 7,155,508 B2 | 12/2006 | Sankuratripati et al. | |
| 7,260,573 B1 | 8/2007 | Jeh et al. | |
| 7,305,691 B2 | 12/2007 | Cristofalo | |
| 7,310,612 B2 | 12/2007 | McQueen et al. | |
| 2001/0020242 A1* | 9/2001 | Gupta et al. | 707/501.1 |
| 2001/0036224 A1 | 11/2001 | Demello et al. | |
| 2001/0041566 A1 | 11/2001 | Xanthos et al. | |
| 2001/0042132 A1 | 11/2001 | Mayadas | |
| 2002/0052778 A1 | 5/2002 | Murphy et al. | |
| 2002/0082923 A1 | 6/2002 | Merriman et al. | |
| 2002/0099605 A1 | 7/2002 | Weitzman et al. | |
| 2002/0102992 A1 | 8/2002 | Koorapaty et al. | |
| 2002/0124098 A1 | 9/2002 | Shaw | |
| 2002/0156677 A1 | 10/2002 | Peters et al. | |
| 2002/0178257 A1 | 11/2002 | Cerrato | |
| 2003/0023589 A1 | 1/2003 | Castle | |
| 2003/0028451 A1 | 2/2003 | Ananian | |
| 2003/0033199 A1 | 2/2003 | Coleman | |
| 2003/0037041 A1 | 2/2003 | Hertz | |
| 2003/0050839 A1 | 3/2003 | Shiomi | |
| 2003/0078863 A1* | 4/2003 | Pilu | 705/34 |
| 2003/0105666 A1* | 6/2003 | Taub et al. | 705/14 |
| 2003/0110497 A1 | 6/2003 | Yassin et al. | |
| 2003/0171995 A1 | 9/2003 | Dezonno et al. | |
| 2003/0187726 A1 | 10/2003 | Bull et al. | |
| 2003/0212745 A1 | 11/2003 | Caughey | |
| 2004/0168190 A1 | 8/2004 | Saari et al. | |
| 2004/0210661 A1* | 10/2004 | Thompson | 709/228 |
| 2004/0215711 A1 | 10/2004 | Martin et al. | |
| 2005/0177387 A1 | 8/2005 | Mojsa | |
| 2005/0183143 A1* | 8/2005 | Anderholm et al. | 726/22 |
| 2005/0228719 A1* | 10/2005 | Roberts et al. | 705/14 |
| 2005/0240580 A1* | 10/2005 | Zamir et al. | 707/4 |
| 2005/0265313 A1 | 12/2005 | Poikselka | |
| 2006/0058948 A1 | 3/2006 | Blass et al. | |
| 2006/0069615 A1* | 3/2006 | Gupta | 705/14 |
| 2006/0090184 A1 | 4/2006 | Zito et al. | |
| 2006/0136393 A1* | 6/2006 | Abbott et al. | 707/3 |

FOREIGN PATENT DOCUMENTS

| | | |
|---|---|---|
| WO | WO-9834189 | 8/1998 |

OTHER PUBLICATIONS

Lillibridge, Mark "Exceptions Are Strictly More Powerful Than Call/CC", (Jul. 1995),1-9.
Webcash Generator, "A Get Paid to Surf and Free Money Programs", http://www.webcashgenerator.com, (Aug. 11, 2002),1-2.
Kraut, et al., "Markets for Attention: Will Postage for Email Help?", CSCW'02-ACM (Nov. 16, 2002),1-10.
Olsen, Stefanie "In Search of Profits-Tech News", CNET News.Com http://news.com/2030-1032-1000366.html, (May 8, 2003),1-4.
Damgard, et al., "The Theory and Implementation of an Electronic Voting System", (Jul. 31, 2002),1-26.
The Captcha Project, "Can Hard AI Problems Foil Internet Interlopers", *S. Robinson, SIAM News*; http://www.captcha.net/news/ai.html, (2001),1-4.
The Captcha Project, "Gimpy", http://www.captcha.net/captchas/gimpy, (2000),1-1.
The Captcha Project, "Telling Humans and Computer Apart (Automatically)", http://www.captcha.net, (2000),1-3.
NPSNET, "Anonymity with electronic money systems; How private are "private" electronic payment systems?", http://www.npsnet.com/danf/emoney-anon.html, (Apr. 19, 1996),1-4.
IBlast Inc., "What is iBlast? Transforming the connection between content and the consumer", http://www.iblast.com/wat.php3, (2002),1-1.
IBlast Inc., "How iBlast works? The technology is already in place", http://www.iblast.com/how.php3, (2002),1-1.
Dotcast, "Dotcast—About Dotcast. First-of-a-Kind Network", http://www.dotcast.com/htdocs/ssi/about/about.htm Aug. 11, 2003 ,1-2.
Borland, John "TV-based high-speed network draws $60 million", CNET News.Com http://news.com.com/2100/1033/248200.html?tag-nl, (Nov. 6, 2000),1-2.
Olsen, et al., "Disney preps wireless video service", CNET News.Com http://news.com.com/2100/1031/995846.html, (1995),1-3.
Cachin, et al., "Cryptography and Information Security Group: Private Information Retrieval", *CIS Private Information Retrieval Reserach* http://theory.lcs.mit.edu/cis/pir.html (1999),1-1.
Canetti, et al., "Selective Private Function Evaluation with Applications to Private Statistics", *In Proceedings of Twentieth ACM Symposium on Principles of Distributed Computing PODC*, (2001),1-10.
Lipmaa, Helger "Electronic Voting", *Cryptology Pointers* http://www.tcs.hut.fi/helger/crypto/link/protocols/voting.html, (Jan. 1, 1970),1-2.
Copyright Office, "The Digital Millennium Copyright Act of 1998", *U.S. Copyright Office summary*, (Dec. 1998),1-18.
Lukose, et al., "SHOCK: Communicating with Computational Messages and Automatic Private Profiles", *WWW 2003/ACM* , (May 20, 2003),1-10.
Lillibridge, Mark "Unchecked Exceptions can be Strictly More Powerful than Call/CC", *Higher-Order and Symbolic Computations*, (1999),275-307.
Harper, et al., "Operational Interpretations of an Extension of Fw with Control Operators", *J. Functional Programming*, (Jan. 1993),1-26.
Harper, et al., "Polymorphic Type Assignment and CPS Conversion", *ACM SIGPLAN Workshop on Continuations*, (1993),1-19.
Lillibridge, et al., "A Cooperative Internet Backup Scheme", *Elnikety, Rice University, Birrell, Burrows; Microsoft Research*, (Jun. 2003),1-13.
Flanagan, et al., "Extended Static Checking for Java", *Compaq Systems Research Center*, (Jun. 17, 2002),1-12.
Golle, et al., "Incentives for Sharing in Peer-to-Peer Networks", *Stanford Graduate Fellowship*, (Nov. 2001),1-13.
Harper, et al., "A Type-Theoretic Approach to Higher-Order Modules with Sharing", *Advanced Research Projects Agency, CSTO*, (Jan. 1994).
Harper, et al., "Explicit Polymorphism and CPS Conversion", *Defense Advanced Research Projects Agency CSTO*, (Jan. 1993),1-13.
Harper, et al., "Polymorphic Type Assignment and CPS Conversion", *National Science Foundation Graduate Fellowship*, (Jun. 1992),1-9.
Huberman, et al., "Social Dilemmas and Internet Congestion", www.sciencemag.org *SCIENCE*, vol. 277, (Jul. 25, 1997),535-542.
Huberman, et al., "Strong Regularities in World Wide Web Surfing", www.sciencemag.org *SCIENCE*, vol. 280 (Apr. 3, 1998),95-98.
Lukose, et al., "Surfing as a Real Option", *First International Conference on Information and Computation Economics by ACM Press*, (1998),1-7.
Adamic, Lada A., "Search in Power-Law Networks", *Physical Review E*, vol. 64, 046135, (Sep. 26, 2001),1-8.
Milojicic, et al., "Peer-to-Peer Computing", (Mar. 8, 2002),1-52.

Adar, et al., "Shock: Aggregating Information Wihle Preserving Privacy", *Information Systems Frontiers 5:1*, (2003),15-28.

Adamic, et al., "Local Search in Unstructured Networks", *WILEY-VCH Verlag Berlin GmbH*, (Jun. 3, 2002),1-25.

Lukose, et al., "SHOCK: Communicating with Computational Messages and Automatic Private Profiles", http://www.2003.org/cdrom/papers/refereed/p691/p691-lukose.htnn, (May 20, 2003),1-14.

Lukose, et al., "A Methodology for Managing Risk in Electronic Transactions over the Internet", *Third International Conference on Computational Economics*, Stanford University, (Jun. 30, 1997),1-14.

Aguilera, et al., "Block-Level Security for Network-Attached Disks", *HP Systems Research Center*, (Mar. 2003),1-16.

Ostrovsky, et al., "Efficient Consistency Proofs for Generalized Queries on a Committed Database", (Jul. 20, 2004),1-25.

Micali, et al., "Zero-Knowledge Sets", *Laboratory for Computer Science*, (2003),1-12.

Merkle, Ralph C., "Protocols for Public Key Cryptosystems", *IEEE*, (1980),122-134.

Martel, et al., "A General Model for Authenticated Data Structures", *Technical Report; UC Davis Department of Computer Science*, (Dec. 6, 2001),1-19.

Gain Corporation, "GAIN-Home", http://www.gatoradvertisinginformationnetwork.com, 1-2.

MICROSOFT.COM, "MSDN: Commerce Server 2000, Targeting and Personalization", *MSDN Database*, (2007),1-4.

Gallagher, et al., "A Framework for Targeting Banner Advertising on the Internet", *IEEE, 13th Annual Hawwaii International Conference*, (1997).

Dissanaike, et al., "Utilizing XML-RPC or SOAP on an Embedded System", *Proceedings from the 24th International Conference on Distributed Computing Systems Workshops (ICDCSW)* (Mar. 2004),438-440.

\* cited by examiner

1. Create Your Offer

What is the name of your Advertisement?

[ Spam Killer  1910 ]

Enter any Additional Description or Subtitle:

[ This program blocks email spam.  1912 ]

Please enter the URL for the location of your advertisement content

[ http://some.placeontheinternet  1915 ]

( Continue )

CONTENT MANAGER
○ Display Offers
○ Create New Offer

CONTENT MANAGER

○ Display Offers  ○ Create New Offer

2. Set Selection Criteria

Selection Criteria 1:

Type: [Exact Search String ▼] —1930

Value: [Spam] —1931

Selection Criteria 2:

Type: [URL (visited) ▼] —1933

Value: [http://howtokillallspam] —1934

Selection Criteria 3:

Type: [URL (visited) ▼] —1935

Value: [ ]

Offer Info:
Title: Spam Killer
Subtitle: This program blocks email spam
Location: http://some.placeontheInternet
—1937

CONTENT MANAGER

○ Display Offers  ○ Create New Offer

3. Confirm/Add Query Selection Criteria

Offer Info:
Title: Spam Killer
1947 { Subtitle: This program blocks email spam
Location: http://some.placeontheinternet
Data Source: Test Advertiser

| ID | Condition Type | Condition Value | Actions — 1945 |
|---|---|---|---|
| 1941 — 451 | Search Exact | Spam | Delete |
| 1942 — 451 | Web Page Static | http://www.howtokill... | Delete |

Add another condition — 1949

CONTENT MANAGER

○ Display Offers     ○ Create New Offer

4. Set Your Offer Budget

What is your total budget for distributing this query?

$ [5,000] —1951

How much incentive do you want to provide for each delivery of data?

$ [2.45] —1953

How long do you want this query to remain active?

[30 days] —1955

Offer Info:
Title: Spam Killer
Subtitle: This program blocks email spam
Location: http://some.placeontheinternet
Data Source: Test Advertiser
—1957

CONTENT MANAGER

○ Display Offers  ○ Create New Offer

Active Offers

| | Title | Bid | Budget | Created | Expires | Status | Actions |
|---|---|---|---|---|---|---|---|
| 1907 → | Tablet PC | $1.11 | $100 | 1/20 | 2/19 | active | [edit] [expire] |
| 1960 → | Spam Killer<br>This program blocks email spam | $2.45 | $5,000 | 1/25 | 2/24 | active | [edit] [expire] |
| 1909 → | Test | $1.99 | $100 | 1/17 | 2/16 | expired | [edit] [delete] |

FIG. 19F

METHOD AND SYSTEM FOR OFFSETTING PRINTING COSTS IN A SYSTEM FOR TARGETED DATA DELIVERY

CROSS REFERENCE TO RELATED APPLICATIONS

This application is related to co-pending patent application Ser. No. 11/123,935, entitled "METHOD AND SYSTEM FOR TARGETED DATA DELIVERY," filed May 5, 2005, and assigned to the assignee of the present invention, the disclosure of which is hereby incorporated herein by reference.

BACKGROUND OF THE INVENTION

1. Field of the Invention

Embodiments of the present invention relate to the field of data delivery. More particularly, embodiments of the present invention relate generally to targeted data delivery to users who satisfy selection criteria.

2. Related Art

The delivery of data over a communication network, such as the internet, to users can be an inexpensive and powerful tool for marketing goods and services. As one example, data can be delivered to a display of a user through various means while the user is connected to the communication network. For example, data such as an advertisement over the internet to a user coupled to the internet can be delivered through the forms of banner ads, pop-up ads, e-mails, etc. Typically, delivery of such advertisement is without the consent of the user. That is, the advertisement is unsolicited by the user.

The initial cost for the delivery of the advertisement through the communication network is much less than that of conventional forms of advertising communicating through more traditional media, such as mailers, magazines, television, radio, etc. As a result, the advertiser can easily deliver many more advertisements to users over the communication network. Also, since, typically, few if any restrictions are placed on the delivery of advertisements, the advertisers take advantage of the cheaper form of advertising by delivering advertisements to wider segment of the population.

However, the inexpensive delivery of advertising can be problematic to users. That is, users may be deluged with unwanted and unsolicited advertising. For example, advertising can be delivered through e-mails. Because the cost of sending e-mail is relatively small, unsolicited junk e-mail or "spam" can be delivered to numerous e-mail addresses. As such, a user may be bombarded with multiple different spam e-mail advertisements.

These unsolicited spam e-mail advertisements can adversely affect the user by wasting the user's time, resources, and opportunities. Specifically, the unsolicited spam e-mail advertisement may overwhelm a user since the user must waste valuable time in addressing and deleting unwanted spam e-mail advertisement. In addition, unsolicited spam e-mail advertising may overload a user's e-mail account. That is, the in-box for the user can be quickly filled with unsolicited spam e-mails. This denies the user full use of their e-mail account, since legitimate or wanted e-mails are not delivered to the spam-filled e-mail account. As such, resources are wasted on unsolicited spam e-mails, and opportunities may be lost since the user cannot access legitimate or wanted e-mails.

In addition, while the inexpensive delivery of advertising over the communication network is an advantage to the advertiser, the various forms for delivering advertisements in the conventional art are inefficient. For example, banner advertising, which is more expensive to implement than spam e-mails can be delivered to inappropriate recipients due to incomplete information about the users. That is, the targeting of users is insufficient due to a lack of information about the users. As a result, advertising funds are wasted on delivery of the advertisement to uninterested or inappropriate users. For example, a business may offer services that are valuable only to owners of an automobile. Using conventional spam delivery techniques, the advertisement may be delivered to numerous users who do not own an automobile and are uninterested in automobile-related services. As such, the business is wasting its advertising by delivering advertisements to users who are not likely to be interested in the services offered by the sources. In short, traditional data delivery methods may lack efficiency by delivering data to inappropriate users.

Further, conventional delivery mechanisms may encroach on the privacy of the user. For example, various spyware mechanisms provide targeting information to advertisers by spying on the activity of a user on an electronic device. This spying is typically perceived as an encroachment on the privacy of the user. In another example centralized storehouses datamine user information from a cross-section of websites and off-line sources. This may be perceived as an encroachment on the privacy of the user.

Accordingly, what is needed is a form of advertising delivery that discourages spam, is more efficient in targeting, and does not encroach on a user's privacy.

BRIEF DESCRIPTION OF THE DRAWINGS

FIGS. 19A-F are diagrams illustrating exemplary user interfaces used to generate an offer for the targeted delivery of data, in accordance with one embodiment.

DETAILED DESCRIPTION OF THE INVENTION

Figure 1:
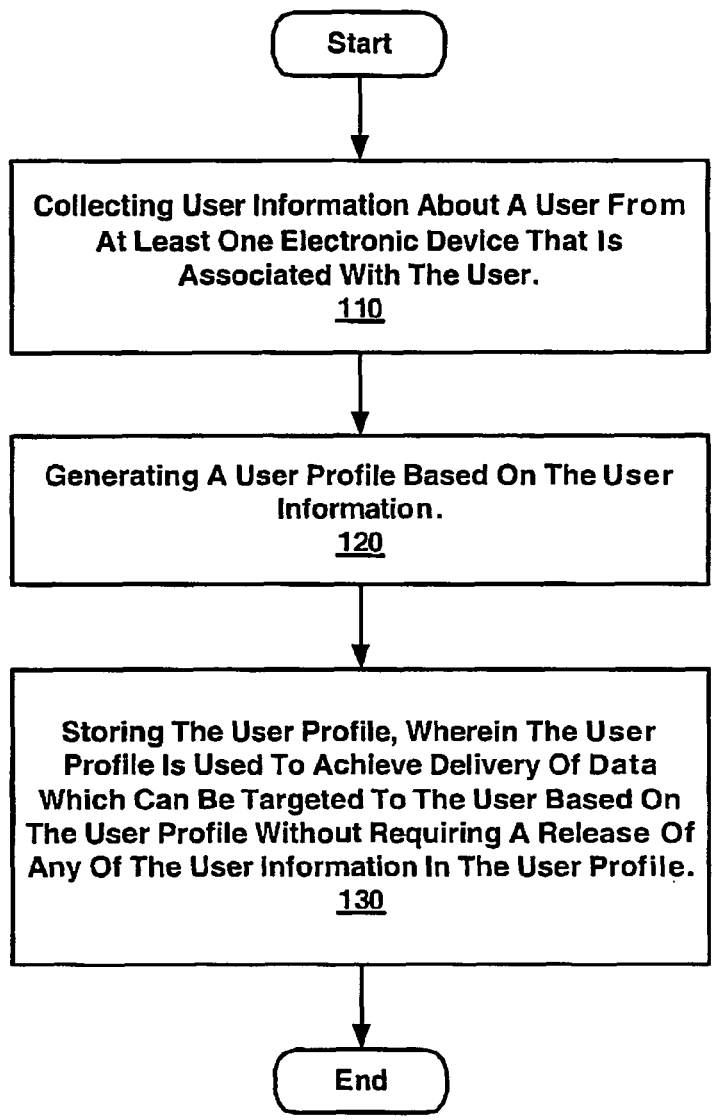
FIG. 1 is a flow diagram illustrating a computer implemented method for targeted data delivery, in accordance with one embodiment of the present invention.

Reference will now be made in detail to the preferred embodiments of the present invention, a method and system of targeted data delivery, examples of which are illustrated in the accompanying drawings.

Accordingly, various embodiments of the present invention disclose a method and system for targeted data delivery. Embodiments of the present invention provide for protection of user privacy. In addition, other embodiments of the present invention provide the above accomplishments and provide for more efficient data delivery by targeting advertising to intended recipients. Also, other embodiments of the present invention provide the above accomplishments and also discourage spam through a filtering mechanism through the preprocessing of messages to determine if they meet a relevancy criteria set by the user.

NOTATION AND NOMENCLATURE

Embodiments of the present invention can be implemented on software running on a computer system. The computer system can be a personal computer, notebook computer, server computer, mainframe, networked computer, handheld computer, personal digital assistant, workstation, and the like. This software program is operable for providing targeted data delivery. In one embodiment, the computer system includes a processor coupled to a bus and memory storage coupled to the bus. The memory storage can be volatile or non-volatile and can include removable storage media. The computer can also include a display, provision for data input and output, etc.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of operations or instructions leading to a desired result. The operations are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "collecting," "generating," "storing," "performing," and "monitoring," or the like, refer to the actions and processes of a computer system, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Overview of Embodiments of the Present Method and System for Targeted Data Delivery Electronic devices such as personal computers (PCs), televisions, personal digital assistants (PDAs), cellular telephones, and the like have become an essential and commonly-used part of life for millions, if not billions, of people throughout the world. These and other similar electronic devices are used frequently and for a variety of purposes. As will be described below in detail, various embodiments of the present invention utilize user information which is collected from at least one electronic device that is associated with a user. Embodiments of the present invention generate a user profile based on the collected user information. Embodiments in accordance with the present invention utilize the user profile to target delivery of data to at least one specific user. Furthermore, as will be described in detail below, embodiments in accordance with the present invention achieve such targeted delivery of data to users without requiring a release of any user information in the user profile.

Various specific embodiments in accordance with the present invention will be described in detail below in Sections 1 through 6.

Section 1

General Method and System for Targeted Data Delivery

Embodiments of the present invention are discussed within the context of targeted delivery of data. For purposes of brevity and clarity, the targeted delivery of advertisements is used for illustrative purposes throughout the application. However, although advertisements are used for purposes of brevity and clarity in certain examples, the targeted delivery of data is not intended to be limited to the targeted delivery of advertisements.

Other embodiments of the present invention are discussed within the context of electronic devices that are associated with a user. One electronic device, for example is the PC and is used for illustrative purposes throughout the application. Although the PC is used for purposes of brevity and clarity in many of the following examples, it is not intended that the term "electronic devices" be limited to PCs.

In addition, other embodiments of the present invention are discussed within the context of targeting delivery of data to users. In one example, the user is an individual that is associated with at least one electronic device. Although the term "user" is used for purposes of brevity and clarity in many of the following examples, it is not intended that the term "user" be limited to individuals. For example, a user is representative of a company having many individuals.

FIG. 1 illustrates a method for targeted data delivery, in accordance with one embodiment of the present invention. That is, FIG. 1 illustrates a process for targeting data delivery to a user. The method of flow diagram 100 is capable of ensuring the privacy of the user information used for targeting the delivery of data to the user.

At 110, the present embodiment collects user information about a user from at least one electronic device that is associated with the user. In one embodiment, the information is automatically collected. The user information includes behavioral characteristics exhibited by the user, personal information associated with the user, and machine configuration for electronic devices associated with the user. In addition, any other information useful for targeting the user is collected. In many embodiments of the present invention, the collection of user information is performed locally at a site associated with a user. However, other embodiments are well suited to the collection of user information at locations remote from the user. For purposes of organization, specific examples and detailed descriptions of the collection process will be described in greater detail in section 2 in which targeted data delivery is described from the standpoint of a user layer.

For example, behavioral characteristics collected for the user information include URL histories, usage of devices, usage of applications, etc. In particular, user activity on an electronic device associated with the user is monitored. In this way, user information of a user includes search behavior over the internet which includes logs (which include timing information) of web browsing, logs of e-mails sent and received, the use of various electronic devices (e.g., printers, cameras, etc.), the use of those devices in a location specific manner, the use of those devices in a time specific manner, geographic locations of an electronic device associated with the user, use of software applications on the electronic devices, hardware configuration, software configuration, etc. In addition, this user information includes personal information, such as address, income, last name, etc. As such, these behavioral characteristics and personal information are used to target users exhibiting these characteristics. A full discussion of the various types of electronic devices from which user information is collected will be described in greater detail in section 2.

At 120, the present embodiment generates a user profile based on the user information. This user profile is formatted to enable the selection of particular characteristics that are used to target users exhibiting those characteristics. For example, the user profile includes attributes that represent the characteristics (e.g., search behavior, machine configuration, personal information, etc.) of the user that are collected in the background while the electronic devices associated with the user are operating. In many embodiments of the present invention, the generation of the user profile is performed locally at a site associated with a user. However, other embodiments are well suited to the generation of user profiles at locations remote from the user. Specific details regarding the generation of the user profile are discussed below in great detail in section 2.

It should be noted that in accordance with embodiments of the present invention, even though the software is operating in the background, the software is operating with the authorization of the user for purposes of targeted data delivery. That is, unlike conventional spyware which is operating under fraudulently obtained or absent any authorization, embodiments of the present invention operate with the full knowledge and consent of the user, and often for the pecuniary benefit of the user.

At 130 the present embodiment stores the user profile. In this manner, the user profile is used to achieve delivery of data which is targeted to the user based on the user profile. In addition, this targeting of the user for the delivery of data is accomplished without requiring a release of any of the user information in the user profile. That is, the user profile is stored and used in a manner that protects the privacy of the user 250. In many embodiments of the present invention, the storing of user information is performed locally at a site associated with a user. However, other embodiments are well suited to the collection of user information at locations remote from the user. Specific examples and detailed descriptions of the storing process are described in greater detail in section 2 below.

For purposes of the present application, the term "without requiring a release of any of said user information in said user profile," or any substantially similar term or phrase, is intended to refer to the restriction that the user information is not released outside of the system that is implementing the delivery of data. More specifically, for purposes of the present application the term "without requiring a release of any of said user information in said user profile," or any substantially similar term or phrase, is intended to refer to the restriction that the user information is not required to be released beyond a data distribution layer as denoted by line A-A of FIG. 5. Furthermore, as will be described below with relation to FIG. 5, embodiments of the present invention do not require the release of user information beyond particular layers that define the system. In one embodiment of the present invention, the release of user information does not occur beyond a data distribution layer as denoted by line A-A. In another embodiment of the present invention, the release of user information does not occur beyond a device that is located between a user layer and the data distribution layer, as denoted between lines C-C and D-D. In still another embodiment of the present invention, the release of user information does not occur beyond a user layer denoted by line D-D.

Figure 2A:
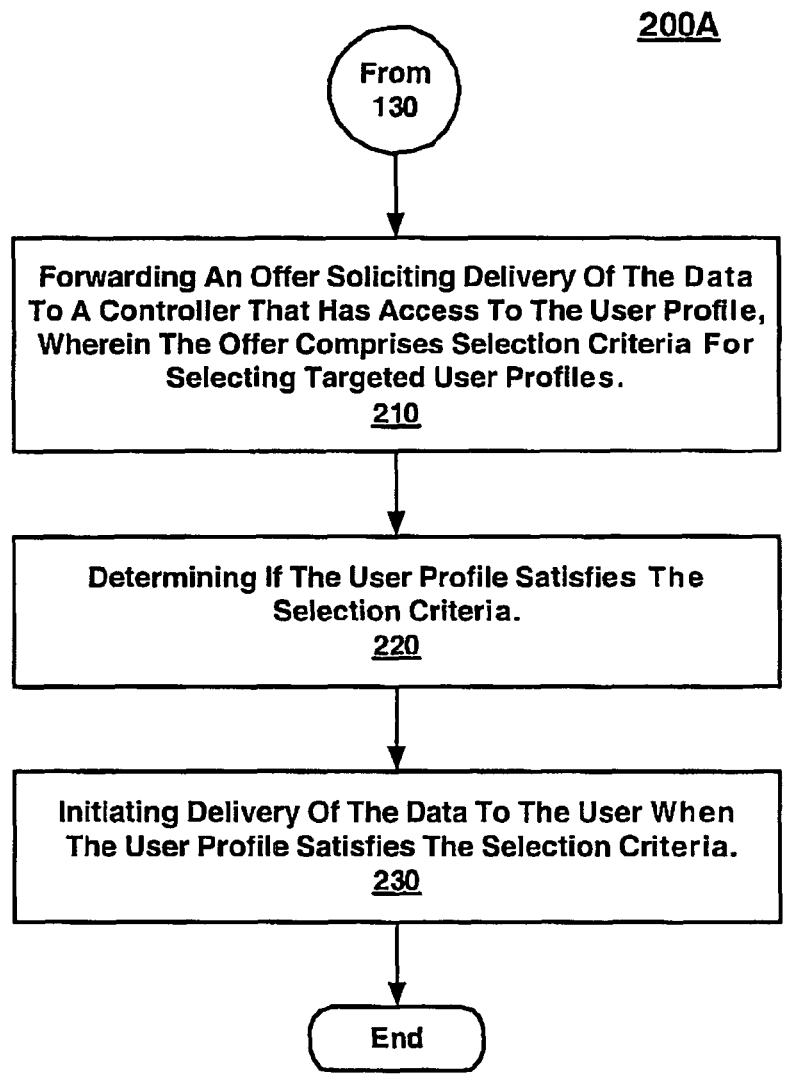
FIG. 2A is a flow diagram illustrating a computer implemented method for targeted data delivery to determine if a user profile satisfies the selection criteria, in accordance with one embodiment of the present invention.

FIG. 2A is a flow diagram illustrating operations for targeted data delivery using a query that compares a user profile to selection criteria that defines characteristics exhibited by targeted user profiles. The flow diagram 200 provides further illustration of the method for targeted data delivery of FIG. 1. The method of FIG. 2A is capable of protecting user information used for targeting the delivery of data to the user since release of any of the user information is not required.

For purposes of the present Application, it is understood that in embodiments in accordance with the present invention, the query is included within an offer for the solicitation of data. In one embodiment, the offer includes the query. In another embodiment, the offer includes the query and the location of the data to be offered for delivery. In still another embodiment, the offer includes the query and the data. Additionally, in another embodiment, an optional offer of compensation for taking delivery of the data is included within the offer. In still another embodiment, the information (e.g., query, forms of the data, compensation, etc.) included within the offer is jumbled or scrambled together. Also, additional information is optionally included (e.g., expiration period, expiration data, etc.).

The present embodiment continues from 130 of FIG. 1. At 210, the present embodiment forwards a query soliciting delivery of data to a controller that has access to the user profile. The query comprises selection criteria for selecting targeted user profiles. The selection criteria includes characteristics that are exhibited or that are similar to that found in the user profiles generated in FIG. 1. As such, the selection criteria includes information such as behavioral characteristics exhibited by the user, personal information associated with the user, and machine configuration for electronic devices associated with the user, etc. This selection criteria is used to identify targeted users whose user profiles satisfy the selection criteria. In other embodiments, the selection criteria is used to identity targeted users whose user profiles match the selection criteria. In this manner, the query is used for selecting user profiles that satisfy the selection criteria without requiring a release of any user information in the selected user profiles. Thus, the user profile of a targeted user is protected. In many embodiments of the present invention, the creation of the selection criteria is performed at the data source. However, other embodiments are well suited to the creation of selection criteria at locations other than the data source (e.g., the data distributor). For purposes of organization, section 4 below describes the selection criteria creation process in detail.

In one embodiment, selection criteria defines a target profile. That is, the target profile is representative of a user who is targeted for the delivery of data. As such, the selection criteria defines characteristics exhibited by the user profiles that are targeted for the delivery of data.

In one embodiment, the query is forwarded to a controller that is co-located with an electronic device associated with the user. That is, the query is forwarded to an electronic device that is collecting user information for use in targeted data delivery. In another embodiment, the query is forwarded to a controller that is located at a remote device that is separate from the electronic devices associated with the user. That is, in such an embodiment, user information is not collected on the remote device. In many embodiments of the present invention, the operations of the controller are performed locally at a site associated with the user, although other embodiments are well suited to performing controller operations at locations remote from the user. Section 2 below provides specific details regarding the operation of the controller.

At 220, the present embodiment determines if the user profile satisfies the selection criteria. The selection criteria defines characteristics exhibited by targeted user profiles. If the user profile satisfies the selection criteria, then the data is presumably targeted to the user associated with the user profile. That is, the data is generated specifically for users who exhibit characteristics in their user profiles that satisfy the selection criteria.

On the other hand, if the user profile does not satisfy the selection criteria, then the data is not targeted to the user. That is, the data is not generated for the user whose user profile does not satisfy the selection criteria.

In many embodiments of the present invention, the operations performed to determine if the user profile satisfies the selection criteria are performed locally at a site associated with a user. However, other embodiments are well suited to determining whether the user profile satisfies the selection criteria at locations remote from the user. Again, for purposes of organization, specific examples and detailed descriptions of the determination of whether the user profile satisfies the selection criteria is described in greater detail in section 2.

At 230, the present embodiment initiates delivery of the data to the user when the user profile satisfies the selection criteria. Targeting the user and the delivery of the data is achieved without requiring a release of the user information in the user profile. That is, user information associated with the user that is used to determine whether the user profile satisfies the selection criteria is not required to be released. Additionally, release of the user information does not occur without the knowledge and authorization of the user to protect the user's privacy. In many embodiments of the present invention, the release of user information is performed locally at a site associated with a user. However, other embodiments are well suited to the release of user information at locations remote from the user. Further details regarding the release of user information are provided in section 2.

In one embodiment, the data is delivered to an electronic device that is associated with the user. That is, the data is delivered to an electronic device from which user information is collected. In other embodiments, the data is delivered to electronic devices associated with the user from which no user information is collected. For example, the data is delivered to a television that just displays what it receives. In other embodiments, other forms of delivery media are supported, such as mailings, telephone calls, e-mails, etc. A full discussion of the various forms of delivering data to a user is provided in section 2.

In one embodiment, after the data is delivered a subset of the user information in the user profile is released with authorization by the user. The subset of information is used to determine if the user profile satisfies the selection criteria. In many embodiments of the present invention, the release of the subset of user information is performed locally at a site associated with a user. However, other embodiments are well suited to the collection of user information at locations remote from the user. The release of the subset of information is described in greater detail in section 2 below.

Figure 2B:
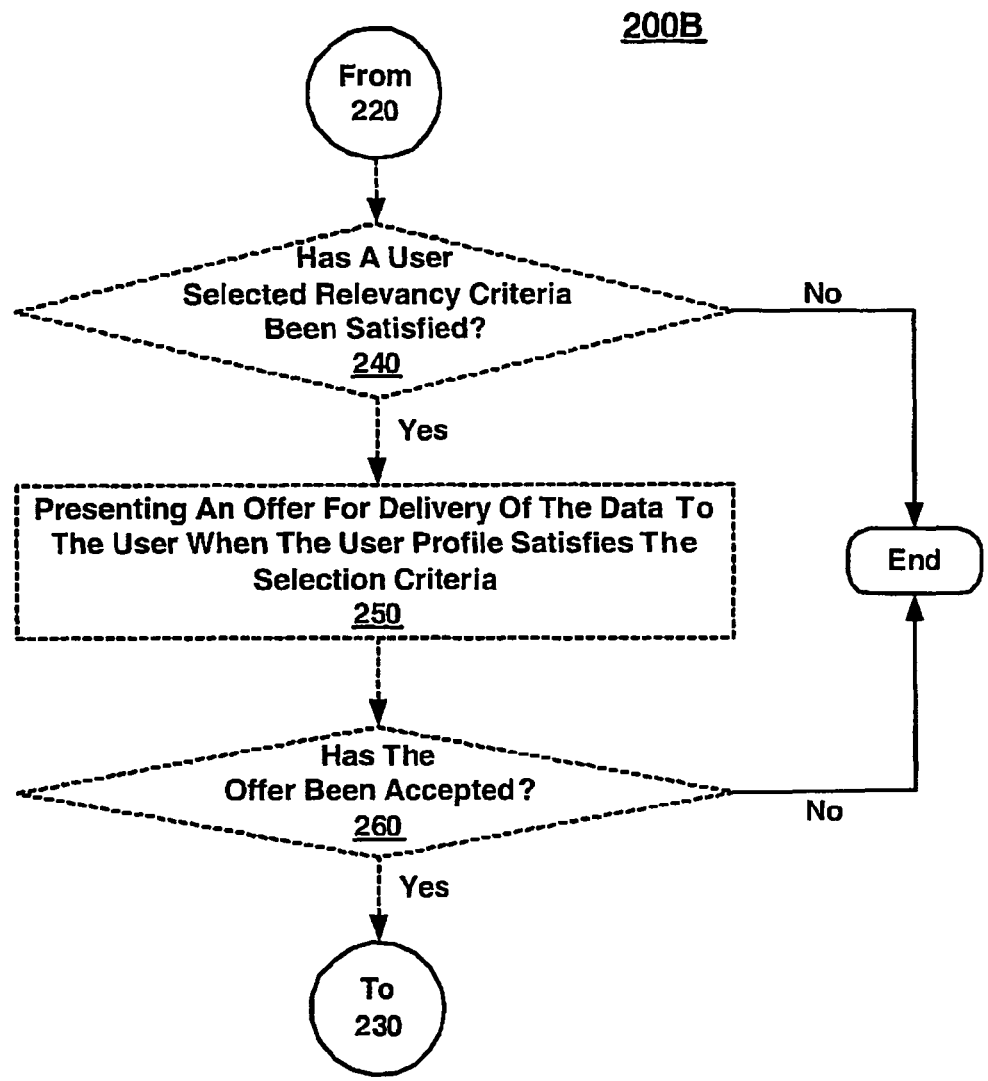
FIG. 2B is a flow diagram illustrating a computer implemented method for targeted data delivery that determines if a user selected relevancy criteria been satisfied, in accordance with one embodiment of the present invention.

FIG. 2B is a flow diagram 200B illustrating operations performed in a method for initiating delivery of data that is targeted to a user, in accordance with one embodiment of the present invention. The flow diagram provides additional operations to the flow diagram 200A and is implemented between 220 and 230 of FIG. 2A.

At 240, the present embodiment determines if the user selected relevancy criteria has been satisfied. The relevancy criteria provides a measure for valuing the user's attention. That is, in one embodiment, the relevancy criteria is a price paid to the user for the user's time in accepting delivery of the data and viewing the data. If the relevancy criteria has not been satisfied, then the present embodiment ends. However, if the relevancy criteria has been satisfied, then the present embodiment proceeds to 250. A full discussion of the user selected relevancy criteria, as well as operations performed to determine if the user selected relevancy criteria has been satisfied, is provided below in section 2.

At 250, the present embodiment presents an offer for the delivery of data to the user. This occurs when the user profile satisfies the selection criteria and the offer satisfies the user selected relevancy criteria. Section 2 provides details of the presentation of the offer to the user.

At 260, the present embodiment determines if the offer for the delivery of data has been accepted. If the offer has not been accepted, then the present embodiment ends. That is, the data is not delivered to the user. On the other hand, if the offer has been accepted, then the present embodiment proceeds to 230 to initiate the delivery of the data. As such, the user is able to determine if the data is worthwhile for viewing even though the user profile satisfies the selection criteria and the offer satisfies the user selected relevancy criteria.

In this way, the user makes another determination on whether to authorize the release of user information used to satisfy the selection criteria in return for the delivery of the data. In one embodiment, acceptance of the offer authorizes a release of the subset of information used to determine if the user profile satisfies the selection criteria. Section 2 describes the operation for the acceptance of the offer in greater detail.

In still another embodiment, the data that is delivered to the user is customized. That is, the data is customized based on the user information. That is, the content of the data (e.g., advertisement) is dynamically adapted based on the user's profile. Not only will the user be presented with data of interest to him or her, but presentation of the data is tailored to the user's experience.

Figure 3:
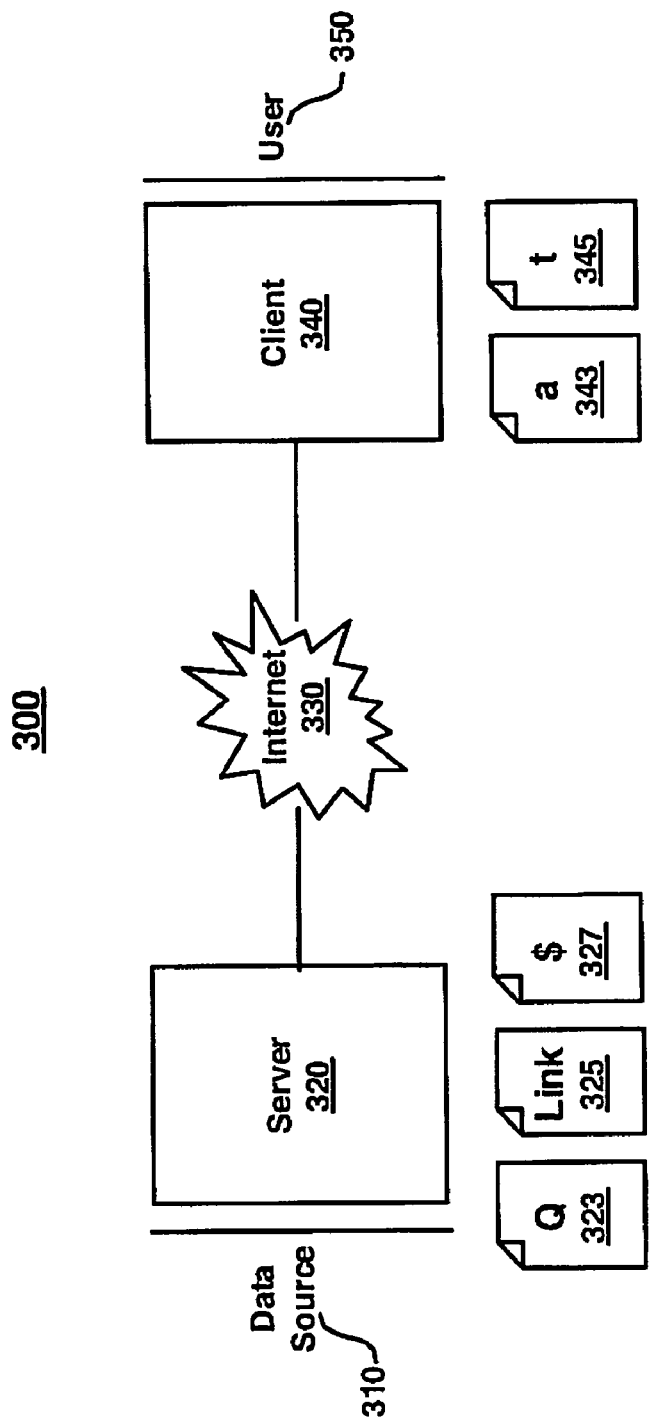
FIG. 3 is a block diagram illustrating a system architecture of a data broadcast network that is capable of targeted data delivery, in accordance with one embodiment of the present invention.

Turning now to FIG. 3, a system is shown illustrating an exemplary data broadcast network 300 that is capable of targeted data delivery between a data source 310 and a user 350, in accordance with one embodiment of the present invention. FIG. 3 provides further illustration to the methods of FIGS. 1 and 2, in one embodiment. The system of FIG. 3 is capable of protecting user information used for targeting the delivery of data to the user.

The data broadcast network 300 includes a server 320 and a client 340 which are connected through the internet 330, or any other communication network. The server 320 is operated by a data distributor, while the client 340 (e.g., a personal computer [PC]) is operated by the user 350. While the present embodiment of FIG. 3 is described within the context of one server and one client, other embodiments are well suited to supporting data broadcast networks consisting of a plurality of servers and a plurality of clients supporting one or more sources of data (e.g., advertisers) and one or more users.

As shown in FIG. 3, the client 340 represents an electronic device associated with the user 350. As described previously, user information is collected from the client 340. While in the present embodiment only one client is shown, other embodiments are well suited to supporting the collection of user information from multiple clients associated with the user 350. A detailed description of the various types of clients and the collection of user information from those clients is provided in section 2.

In FIG. 3, a user profile is based on the user information collected from the client 340. This user profile is formatted to enable the selection of particular characteristics that are used to target users exhibiting those characteristics. For example, in FIG. 3, the user profile of the user 350 includes attributes 343. The attributes 343 represent the characteristics (e.g., behavior, machine configuration, personal information, etc.) of the user 350. The attributes are collected in the background of the client 340.

It should be noted that in accordance with embodiments of the present invention, even though the collection of attributes is operating in the background, this collection is operating with the authorization of the user for purposes of targeted data delivery. That is, unlike conventional spyware which is operating under fraudulently obtained or absent any authorization, embodiments of the present invention operate with the full knowledge and consent of the user, and often for the pecuniary benefit of the user.

In one embodiment, the user 350 controls what types of data are collected for the user profile, and how long such information is held in the user profile. Furthermore, the user 350 enters additional attributes 343 into an associated user profile to specify further identifiable interests. In many embodiments of the present invention, the collection of attributes is performed locally at a site associated with a user, although other embodiments are well suited to the collection of attributes at locations remote from the user. For purposes of organization, specific examples and detailed descriptions of attributes and their collection will be described in greater detail in section 2.

In addition, the user profile includes an optional threshold 345. The threshold 345 defines the minimum payment required to make it worthwhile for the user 350 to accept delivery of data. For example, the threshold defines the payment to the user required for the user 350 to view an advertisement. In accordance with embodiments of the present invention, there are multiple thresholds associated with a user 350 depending on the currency of the offer (e.g., cash, frequent flyer miles, discounts) and the content of the data. Section 2 below provides details of the selection and implementation of the threshold 345.

In one embodiment, the collecting of 110, the generating of 120, and the storing of 130 of FIG. 1 are performed at one of the electronic devices associated with the user 350. For example, the collecting of 110, the generating of 120, and the storing of 130 are performed at locally at the client 340. The local performance of these operations protect the privacy of the user information, and are described in detail in section 2.

In another embodiment, at least one of the collecting of 110, the generating of 120, and the storing of 130 of FIG. 1 is performed on a remote electronic device that is separate from the electronic devices that are associated with the user 350.

Also shown in FIG. 3 is a data source 310. In the present embodiment, the data source 310, or some representative of the data source 310, creates a query 323, a link 325 to data (e.g., an advertisement), and an optional payment 327 that is paid upon delivery of the data. The query 323, link 325, and optional payment 327 combined constitute an offer. The query 323, link 325, and payment 327 are used for the solicitation of the delivery of the data. In one embodiment, the query 323, link 325, and payment 327 are created by the data source 310 and stored on the server 320. In other embodiments, the query 323, link 325, and payment 327 are created in combination with the server 320, or through another representative (e.g., a broker). Also, in one embodiment, the storing of the offers is implemented through a web application interface hosted by the data distributor. A full discussion of the creation of the query 323, link 325, and payment 327 is provided in section 3, in which the targeted delivery of data is described from the standpoint of the data source 310.

In the present embodiment, the data distributor through the server 320 broadcasts the query 323, link 325, and payment 327, to all of its associated clients in the data broadcast network 300, including the client 340. The client determines if an associated user profile satisfies the query. Section 2 describes, in detail, the determination of whether the user profile satisfies the query.

In other embodiments, the query 323, link 325, and payment 327 are sent to a location other than the client 340 for accessing the user profile information and determining if the user profile satisfies the query. That is, the user profile is stored in a location other than the client 340, or the determination of whether the user profile satisfies the selection criteria of the target profile occurs at a location other than the client 340. Details of various locations for performing the determination of whether the user profile satisfies the selection criteria of the target profile is provided in section 3, in which the targeted delivery of data is described from the standpoint of the data distributor layer.

In one embodiment, if the user profile of the user 350 satisfies the query 323 and potential payment 327 satisfies the threshold 345, the user 350 decides whether the delivery of the data associated with the query 323 is desired in return for the payment 327. On the other hand, if the user profile or the potential payment 327 do not satisfy the query, delivery of the data is not provided as an option to the user.

The data broadcast network 300 of the present embodiment is able to preserve the privacy of the user 350. In particular, in one embodiment all queries (e.g., query 323) are broadcast to the user 350 without revealing any information about the user 350. In such an embodiment, only when the user 350 decides to accept delivery of the data, and in turn collect the payment 327 does the user 350 intentionally disclose identity information (e.g., information in the user's profile used to satisfy the selection criteria). In one such embodiment, the identity of the user 350 is only revealed to the data distributor associated with the server 320. In addition, in another embodiment, to further protect the privacy of the users in the data broadcast network 300, only aggregate data is returned to the advertiser 310.

Figure 4:
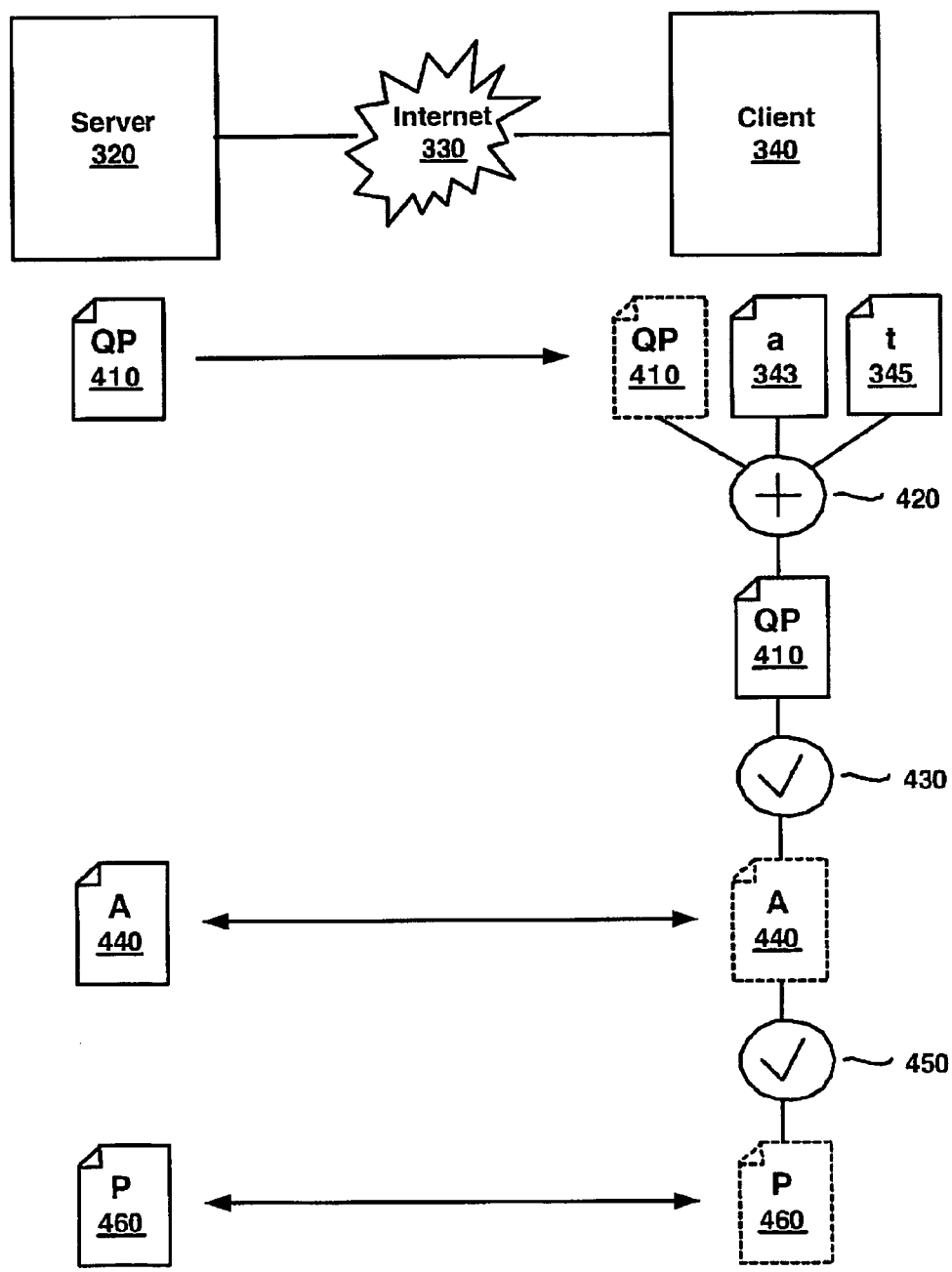
FIG. 4 is a flow diagram illustrating the flow of data in the data broadcast network of FIG. 3, in accordance with one embodiment of the present invention.

FIG. 4 is a data flow diagram 400 illustrating the flow of information in the data broadcast system 300 of FIG. 3, in accordance with one embodiment of the present invention. In the present embodiment, the client 340 communicates with the server 320 over the internet 330 to receive an offer QP 410, which includes a query and potential payment. At the comparator function block 420, the query in QP 410 is tested against the user attributes 343. In addition, the potential payment in QP 410 is tested against the threshold 345.

Also, the offer QP 410 is checked for validity. For example, an offer is invalid after exhausting an advertiser budget. In many embodiments of the present invention, the checking for the validity of the offer is performed at the data distributor layer. For purposes of organization, details for checking the validity of the offer is provided in section 3.

If the user attributes 343 satisfy the query and the potential payment satisfies the threshold 345, then at the output of the comparator function block 420, the offer QP 410 is presented to the user in a non-intrusive manner. Details of the offer for the delivery of data are provided in section 2.

At the acceptance block 430, the user decides whether it is desired to have the data to be delivered (e.g., for the purposes of watching an advertisement). If the user chooses to have the data delivered, the data (e.g., an advertisement) 440 is retrieved from the server 320 and delivered to the client 340 for presentation to the user. The operations for the acceptance of the offer for the delivery of data is provided in detail in section 2.

At the monitoring block 450, the present embodiment determines if the data has been presented to the user (e.g., viewed by the user). If the data has been presented, then the payment 460, as an incentive, is registered on the server to the user 350 that is associated with the client 340. Section 3 below provides a detailed description of the payment of the incentive.

While the present embodiment of FIG. 4 describes various functions at the server 320 and the client 340, other embodiments of the present invention are well suited to performing these functions at either the server 320, or the client 340, or any location other than the server 320 or client 340, or any combination thereto.

Figure 5:
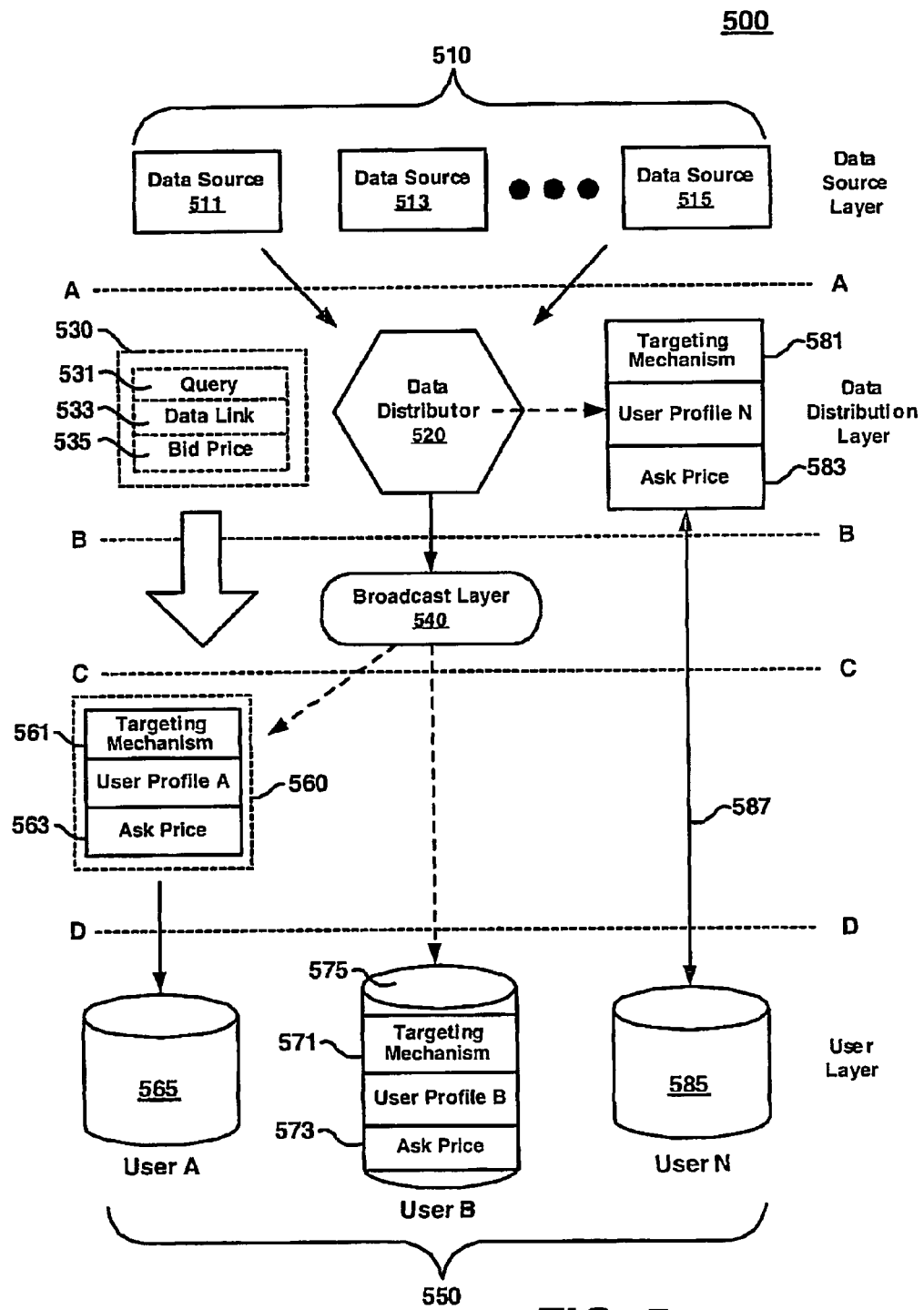
FIG. 5 is a block diagram of a network that is capable of targeted data delivery between a plurality of data sources and a network of users through a data distributor, in accordance with one embodiment of the present invention.

FIG. 5 is a diagram of an exemplary network 500 that is capable of targeted data delivery between a plurality of data sources and a network of users, in accordance with one embodiment of the present invention. Network 500 provides more detail to the data broadcast network 300 of FIG. 3, in one embodiment. In FIG. 5, the network 500 links a plurality of data sources 510 to a network of users 550 (e.g., user A, user B, on up to user N) for the targeted delivery of data. More specifically, the present embodiment links a data source with a particular user for the targeted delivery of data. Additionally, the network 500 is capable of achieving delivery of data that is targeted to a user based on information in a user profile without requiring a release of the user information to protect privacy.

In the network 500, a plurality of data sources 510 exist in a data source layer above line A-A. For purposes of introduction, a brief description of the data source layer is provided here in section 1 below. Also, a detailed description of the operations performed at the data source layer is provided in section 4, in which the targeted delivery of data is described from the standpoint of the data source layer.

The plurality of data sources 510 includes data sources 511, 513, and 515. Each of a plurality of data sources 510 provide data. The data provided by a data source includes various forms of information, such as advertisements, publications, public and private notification alerts, etc. For example, in one embodiment, the data source 510 is an advertiser. The advertiser uses network 500 to deliver advertisements, as data, to targeted users.

Additionally, the data sources provide selection criteria that is crucial in identifying users targeted for the delivery of data. The selection criteria identifies a set of users in the network of users 550. That is, the selection criteria is used to identify and target users in the network of users 550. For example, the selection criteria includes the use of accounting software on a user's computing device to manage budgets, and other behavioral characteristics that indicate the user has visited tax help web sites. In this way, a data source that provides income tax services is targeted to those users that satisfy the criteria.

In one embodiment, the data source is a broker between the originator of the data and the data distributor 520. For example, the broker interfaces with the data distributor 520 for the targeted delivery of data. That is, the broker provides the data and the criteria on behalf of the originator of the data.

In the network 500, a data distributor 520 exists in a data distributor layer between line A-A and line B-B. For purposes of introduction, a brief description of the data distribution layer is provided in section 1 below. However, a full description of the operations performed at the data distribution layer is provided in section 3, in which the targeted delivery of data is described from the standpoint of the data distribution layer.

The data distributor 520 is communicatively coupled to the network of users 550. The data distributor 520 provides the sole distribution point for the delivery of the data from the plurality of data sources 510 to the users in the network 550. That is, the data distributor 520 provides the avenue for accessing each of the users in the network of users 550 specifically for the delivery of data from the plurality of data sources 510.

In one embodiment, the data distributor is a network owner. That is, the network owner owns and provides access to its network of users 550. For example, a network owner has an association with a manufacturer of PCs. As such, a buyer of a PC from the manufacturer agrees to become part of the network of users 550 for the targeted delivery of data.

For example, the data distributor is the creator and controller of the proprietary network 500. The data distributor 520 receives a cut of every transaction equal to a function $V(A,B)$ that is a function of the user ask price, A, and the bid price, B. The incentive delivered to the user is limited by $A<=V(A,B)<=B$. The incentive provided by a data source for the delivery of data is partly paid to the data distributor 520.

In another embodiment, the data distributor 520 is a central server broadcasting to all peers over the internet. In another embodiment, the data distributor 520 is a federation of such central servers broadcasting to peers over the internet. For example, the data distributor 520 is associated with the server 320 of FIG. 3.

The data distributor 520 in combination with each of the data sources in the plurality of data sources generates offers for the targeted delivery of data. For example, an offer 530 is generated that is associated with one of the data sources in the plurality of data sources 510. The offer 530 is used to target the delivery of data. The offer 530 includes a query 531. The offer 530 includes a link 533 to the data, or any other form of accessing the data. That is, the offer 530 includes the location of the data to be offered for delivery, in some embodiments. In other embodiments, the offer 530 includes the data itself. The offer 530 also includes a bid price that indicates the price paid by the data source for the delivery of data to a user in the network of users 550. That is, the offer 530 also optionally includes an offer of compensation for taking delivery.

In one embodiment, the offer 530 is generated at the data source, or broker that represents the data source. In another embodiment, the offer 530 is generated at the data distributor. In still another embodiment, the offer 530 is generated at the data source, or broker, and the data distributor 520 in combination. For purposes of organization, specific examples and detailed description of the generation of the offer 530 will be described in section 4, in which the targeted delivery of data is described from the standpoint of the data source layer.

As shown in FIG. 5, a broadcast layer 540 broadcasts offers from the data distributor 520 to the network of users 550. The broadcast layer 540 is located between line B-B and line C-C. For purposes of introduction, a brief description of the broadcast layer 540 is provided in section 1 below. A detailed description of the operations performed at the broadcast layer is provided in section 3.

The method of broadcast include one or a combination of several possibilities including, but not limited to: a direct server connection over the internet, an indirect connection through a peer-to-peer scheme, a data casting method that broadcasts digital messages over an existing television infrastructure.

In one embodiment, the broadcast layer 540 sends offers in various distribution patterns. For example, the broadcast layer 540 sends offers to each of the network of users 550, a randomly selected number of users in the network of users 550, or a demographically selected group of users from the network of users 550 (e.g., by geographic location).

In network 500, a user layer is located below line D-D. For purposes of introduction, a brief description of the user layer is provided in section 1. Furthermore, a detailed description of the operations performed at the user layer is provided in section 2.

In the network 500, each of the network of users 550 is associated with a targeting mechanism (e.g., client software) that operates to facilitate the targeted delivery of data. The targeting mechanism operates in the background to track a wide variety of user behaviors. These behaviors include behavioral and personal characteristics, for example. It should be noted that in accordance with embodiments of the present invention, even though the targeting mechanism is operating in the background, the targeting mechanism is operating with the authorization of the user for purposes of targeted data delivery. That is, unlike conventional spyware which is operating under fraudulently obtained or absent any authorization, embodiments of the present invention operate with the full knowledge and consent of the user, and often for the pecuniary benefit of the user.

The user information is organized according to a schema that allows queries to be generated that are designed such that user information that satisfy the criteria set forth in the query enable the targeting of data to users.

This user information is collected and represented as a user profile. As such, each of the network of users 550 is associated with a user profile containing personal and configuration information related to an associated user. For example, user A is associated with user profile A, user B is associated with user profile B, and user N is associated with user profile N.

Also, each of the plurality or network of users 550 is associated with a minimum ask price. For example, user A is associated with ask price 563, user B is associated with ask price 573, and user N is associated with ask price 583. The ask price is a form of consideration that is paid in return for the delivery of the data. The ask price may be available in many forms of consideration, such as cash, frequent flier miles, donations, printers, coupons, etc.

The ask price is an economic mechanism designed to monetize the scarcity of consumer attention, in one embodiment. Users will set their ask price higher if they are not interested in receiving an increase in the number of items of data (e.g., advertisements). On the other hand, user will set their ask price lower if they are interested in receiving more items of data. In this way, the ask price is used to efficiently deliver the data to users who are interested in the data.

In another embodiment, the minimum ask price is used to discourage spam. That is, data considered as spam most likely is associated with very low bid prices in order to distribute the spam data to a large number of users. However, users with ask prices higher than the average price associated with spam data will not receive the spam data. As such, the minimum ask price is used to discourage the distribution of spam.

As shown in FIG. 5, the location of the targeting mechanism, user profile, and ask price is variable, in accordance with embodiments of the present invention. For example, the targeting mechanism 571, user profile B, and ask price 573 is located at the electronic device 575 (e.g., PC) associated with user B. That is, the targeting mechanisms 571, user profile B, and ask price 573 is locally located at the user layer. As such, the collection of user information for the user profile B and the determination of whether the user profile B satisfies any query coming from the data distributor occurs locally. Likewise, the determination of whether a bid price coming from the data distributor satisfies the user's asking price occurs locally.

In another embodiment, the location of the targeting mechanism 561, user profile A, and ask price 563 is located remotely from the electronic device 565 that is associated with the user A. That is, the targeting mechanisms 561, user profile A, and ask price 563 is located between the broadcast layer 540 and the user layer. As such, the collection of user information for the user profile A and the determination of whether the user profile A satisfies any query coming from the data distributor 520 occurs remotely. Likewise, the determination of whether a bid price coming from the data distributor satisfies the user's asking price occurs remotely.

In still another embodiment, the location of the targeting mechanism 581, user profile N, and ask price 583 is located at a server associated with the data distributor 520. That is, the targeting mechanisms 581, user profile N, and ask price 583 are located at the data distributor layer. As such, the offer 530 need not necessarily go through the broadcast layer 540, in one embodiment. As such, the collection of user information for the user profile N, and the determination of whether the user profile N satisfies any query coming from the data distributor 520, and if a bid price coming from the data distributor satisfies the user's ask price 583 occurs at the data distributor 520, or at a server closely associated with the data distributor 520.

In addition, the locations of each of the targeting mechanisms, user profiles, and ask prices is split amongst various locations shown above, in accordance with another embodiment of the present invention.

The targeting mechanisms are also used to determine if the user profiles satisfy the selection criteria as defined by the queries. For example, for user B, the targeting mechanism 571 determines if the query 531 in offer 530 is satisfied by the information in user profile B. Only if the selection criteria in query 531 is satisfied by the user profile B, and the bid price 535 exceeds the ask price 573 is an offer to deliver the data (e.g., through data link 533) presented to the user B. The bid price 535 is used as an incentive to entice a user to accept delivery of data.

For example, a choice selection is presented to user B, in one embodiment. The choice selection is presented through one of a number of mechanisms, such as a popup, a less invasive flashing systray icon, etc. The choice selection includes 1) a choice to view the data (e.g., an advertisement), or 2) a choice to ignore the data. With this choice, the purpose of the data and a description of the data source is summarized for user B.

In addition, in return for accepting delivery of the advertisement for viewing, user B will receive a payment as consideration. That is, if user B chooses to view the data, the data is presented to the user, and only then is the user's account credited. For example, the credit to the user's account is made at the data distributor 520.

Figure 6:
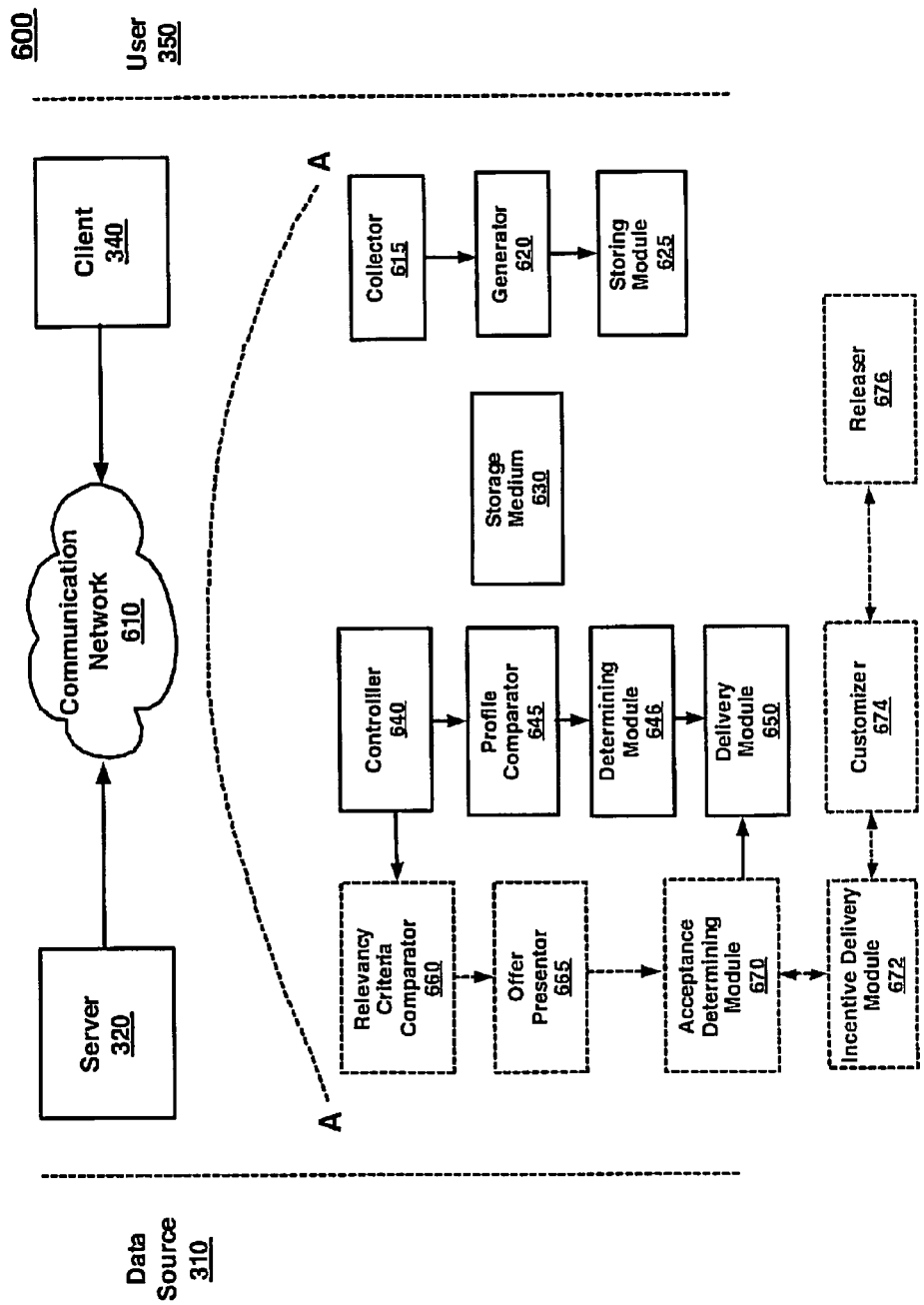
FIG. 6 is a block diagram of a system that is capable of targeted data delivery between a data source and a client, in accordance with one embodiment of the present invention.

FIG. 6 is a block diagram of a system 600 for targeted data delivery, in accordance with one embodiment of the present invention. The system 600 is implemented within the data broadcasting network of FIG. 3, for example in one embodiment. As such, system 600 includes a data source 310, a server 320 that communicates with a client 340 through a communication network 610 (e.g., interne 330), and a user 350.

The remaining components of the system 600 are shown below the dotted line A-A. Representation of these components under dotted line A-A indicates that one or more of the components are located at the client 340, the server 320, or some other remote device communicating through the communication network with the server 320 and the client 340.

The system 600 includes a collector 615, a generator 620 and a storing module 625. The collector 615 collects user information about a user 350 from at least one electronic device that is associated with the user 350. In addition, the collector further includes a monitor for monitoring user activity on an electronic device associated with the user. The generator 620 generates a user profile based on the user information. In addition, the storing module 625 stores the user profile. As such, the user profile is used to achieve delivery of data (e.g., an advertisement) which is targeted to the user 340 based on the user profile without requiring a release of any of the user information in the user profile, in one embodiment.

In one embodiment, the collector 615, generator 620, and storing module 625 are disposed on an electronic device that is associated with the user. In another embodiment, the collector 615, said generator 620, and said storing module 625 are disposed on a remote electronic device that is separate from the electronic devices associated with the user.

In addition, the system 600 includes a storage medium 630. The storage medium stores the user profile associated with the user 350. In this way, information in the user profile is used to target the delivery of data to the user 350.

In one embodiment of the present invention, the system 600 also includes an offer transmitter (not shown). For example, the offer transmitter is located at the server 320, in one embodiment. The offer transmitter sends an offer soliciting delivery of the data to a controller 640 that has access to the user profile. In one embodiment, the broadcasting of the offer is implemented through client polling. Also, in one embodiment, the controller 640 is co-located with an electronic device that is associated with the user 350. In another embodiment, the controller 640 is located on a remote device that is separate from the electronic devices associated with the user 350 from which user information is collected.

The offer's query defines selection criteria for selecting targeted user profiles. In addition, the system 600 also includes a profile comparator 645. The profile comparator 645 determines if the user profile satisfies the selection criteria.

When the user profile satisfies said selection criteria, a delivery module 650 initiates the delivery of the data to the user 350. In one embodiment, the delivery module is configured to initiate delivery of the data to an electronic device associated with the user, where user information is collected from the electronic device. In another embodiment, the delivery module is configured to initiate delivery of the data to an electronic device that does not collect user information.

As shown in FIG. 6, the system 600 also includes optional components, as follows: the relevancy criteria comparator 660, the offer presentor 665, and the acceptance determining module 670. The relevancy criteria comparator 660 determines if the offer satisfies a user selected relevancy criteria. That is, in one embodiment, the relevancy criteria comparator 660 determines if a bid price set by the data source 310 included in the offer meets or exceeds an ask price defined by the user as the user selected relevancy criteria.

In addition, the system includes an offer presentor 665 for presenting an offer to an electronic device associated with the user for delivery of the data to the user. The offer is presented when the user profile satisfies the selection criteria. In another embodiment, the offer presentor is configured to release a subset of the user information.

In addition, the system includes an acceptance determining module 670. The module 670 is able to determine if the offer has been accepted. In one embodiment, acceptance of the offer for delivery of data authorizes the release of a subset of the user information used to determine if the user profile satisfies the selection criteria. A releaser 676 releases the subset of information upon receipt of authorization by the user.

In one embodiment, on delivery of the data, an incentive delivery module 672 delivers an incentive to the user, or to a data distributor that forwards the query, or some combination of the two.

Also, in another embodiment, the system 600 includes a customizer 674. The customizer 674 customizes the data delivered to the user. More specifically, the data is customized using the user information.

Section 2

Method and System for Targeted Data Delivery from the Standpoint of the User Layer Embodiments of the present invention in section 2 are described from the standpoint of the user layer. For example, the user layer is located below line D-D in FIG. 5. As such, description of the targeted delivery of data is described below from the standpoint of the user layer.

Figure 7:
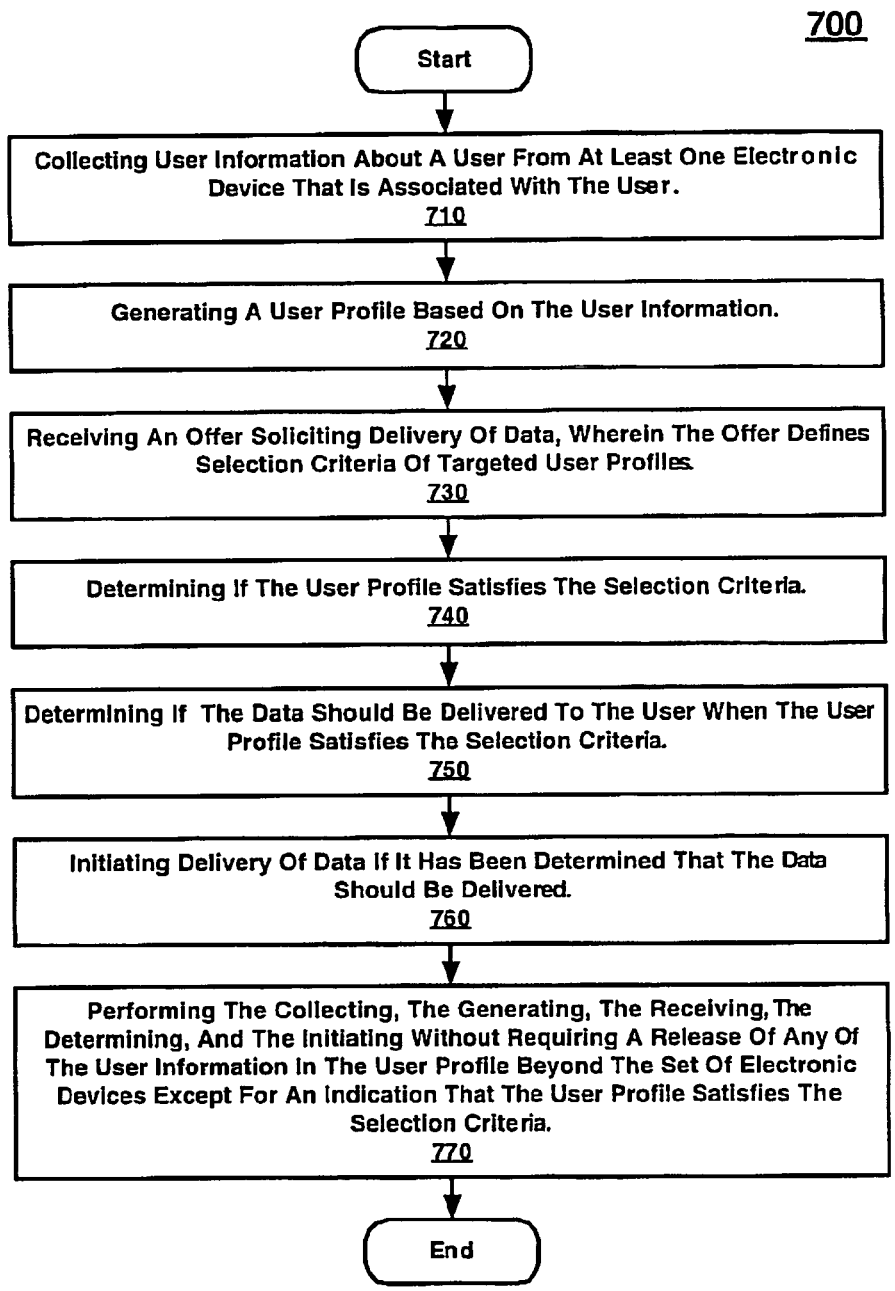
FIG. 7 is a flow diagram illustrating operations in a computer implemented method for targeted data delivery taken from the standpoint of a user layer, in accordance with one embodiment of the present invention.
Figure 8:
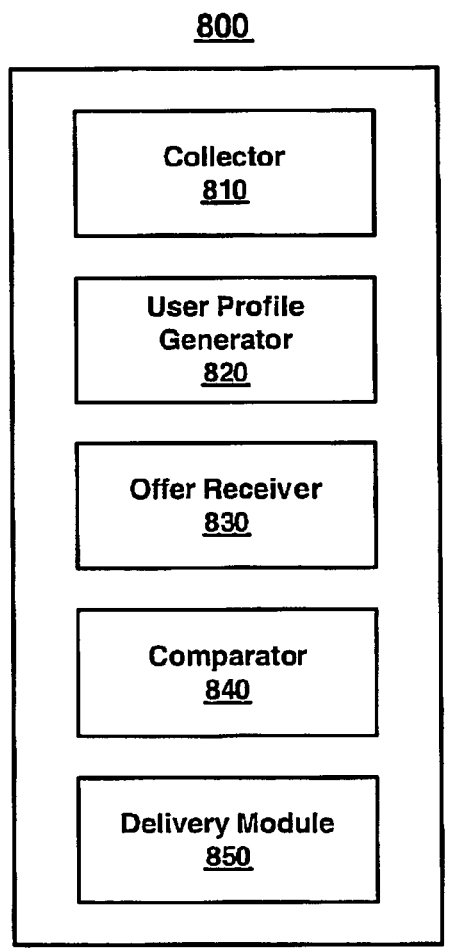
FIG. 8 is a block diagram of a system that is capable of targeted data delivery from the standpoint of a user layer, in accordance with one embodiment of the present invention.

FIGS. 7 and 8 in combination illustrate a method and system for the targeted delivery of data, in embodiments of the present invention. More specifically, FIG. 7 is a flow diagram 700 illustrating operations performed in a method for targeted data delivery, in accordance with one embodiment of the present invention. In addition, the components of the system of FIG. 8 are capable of implementing the method of FIG. 7, in accordance with one embodiment of the present invention.

In FIG. 7, the operations performed in flow diagram 700 are performed locally at the user layer of FIG. 5, in the present embodiment. Similarly, in FIG. 8, components of system 800 perform the operations of FIG. 7 and are located at the user layer. That is, system 800 is located entirely at the user layer, and is controlled by the user without any outside intervention. For example, system 800 is implemented entirely within the targeting mechanism 571 of the electronic device 575 located at the user layer to ensure privacy protection of the user's information.

In addition, continuing with FIG. 5, the user profile B is located at the electronic device 575, in one embodiment. As such, privacy protection of the user's information stored in user profile B is controlled by the user. In this way, the targeted delivery of data is implemented without requiring the release of any user information beyond or outside of the user layer. That is, the present embodiment is configured such that use of the user information for targeting purposes is limited to the user layer. As such, the user exercises tight control over the use and release of user information during the targeted delivery of data.

Operations associated with the components of system 800 are implemented in hardware or software implemented within an electronic device from which the user information is collected. In another embodiment, the components of system 800 are implemented within an electronic device other than the electronic device from which the user information is collected.

In still other embodiments, one or more of the components of system 800 are located remotely from the devices associated with the user. That is, one or more of the components of system 800 are located remotely from the user layer of FIG. 5. However, in one such embodiment, to ensure protection of user information, secure communication with the remotely located system 800 is employed.

Returning to FIG. 7, at 710, the present embodiment collects user information about a user from at least one electronic device that is associated with the user. That is, user information describing characteristics of the user is collected from one or more electronic devices comprising a set of electronic devices that is associated with the user. More specifically, each of the set of electronic devices are located below line D-D within the user layer of FIG. 5. As shown in FIG. 8, the collector 810 collects the user information. In the present embodiment, the components of the system 800 including the collector 810 are located at the user layer of FIG. 5, although in other embodiments, the collector 810 is located at other layers of FIG. 5.

The user information is collected from one or more electronic devices associated with the user. That is, any electronic device from which useful information can be collected about the user for purposes of targeting the user for the delivery of data is used. For example, electronic devices from which user information is collected includes, but is not limited to, the following: PC, printer, cell phone, pagers, household appliances, global positioning satellite (GPS) devices, television, personal digital assistant (PDAs), digital cameras, video recorders, cable set-top boxes, etc.

The user information includes characteristics that help to identify the user for the targeted delivery of data. These characteristics include personal information associated with the user, behavioral characteristics exhibited by the user, machine configuration for electronic devices of the user, etc.

In one embodiment, the user information is collected in the background of the electronic devices. That is, the user information is automatically collected while the electronic devices are operating. The user need not start, nor be acutely aware of, the collection of user information, in one embodiment. It should be noted that in accordance with embodiments of the present invention, even though the collection of user information is operating in the background, this collection occurs with the authorization of the user for purposes of targeted data delivery. That is, unlike conventional spyware which is operating under fraudulently obtained or absent any authorization, embodiments of the present invention operate with the full knowledge and consent of the user, and often for the pecuniary benefit of the user.

In one embodiment, personal information is collected for purposes of targeting the user for the delivery of data. For example, the user's name, sex, income, address, zip code, education level, etc. are collected. Many of these personal items of information are collected directly, or indirectly through inference. For example, the direct collection of personal information is collected from registration forms the user filled out and registered using the various devices associated with the user. In other words, in embodiments in accordance with the present invention, these personal items of information are located within definable spaces of the various electronic devices associated with the user.

In other embodiments, the collection of personal information is achieved through inference. For example, the stated income level may not be found in any of the various electronic devices associated with the user. However, based on a zip code that has been previously collected, a stated income level is inferred. That is, it is inferred that a user with a zip code associated with a middle class neighborhood earns approximately a middle class income.

As another example, the sex of the user is inferred through various means. In one case, the types of URLs visited provide a clue as to the sex of the user. For example, visits to URLs tailored to cosmetics may indicate that the user is a female. In another case, the name of the user may provide an indication as to the sex of the user.

In still other embodiments, the collection of user information includes behavioral characteristics of the user when interacting with the various electronic devices associated with the user. For example, behavioral characteristics collected as user information include URL histories, usage of devices, usage of applications, etc.

In one embodiment, the user's search behavior over the Internet as a behavioral characteristic is monitored for purposes of targeted data delivery. For example, raw data is collected to include the various URLs visited by the user. That is, the user information will identify which URL the user has visited, such as news groups, chatrooms, blogs, car URLs, printer URLs, etc.

For purposes of illustration only, an example is provided for reference throughout the application in which a user is interested in purchasing an inkjet printer. The user performs some research over the interne and visits a URL associated with company A for purposes of researching an inkjet printer provided by company A. For purposes of collecting behavioral characteristics, the present embodiment is capable of collecting the fact that the user has visited the URL associated with company A.

In addition, collector 810 of FIG. 8 collects various other raw pieces of information related to web browsing as behavioral characteristics. For example, collector 810 collects timing information in one embodiment in accordance with the present invention. That is, collector 810 collects a timestamp that identifies when a particular URL was visited (e.g., time and date). This is useful in determining how many times a particular URL was visited and with what frequency. Recent activity for a particular URL may indicate great interest in the subject associated with that URL.

In addition, various search terms used by the user are collected, by collector 810, as a behavioral characteristic. That is, in the above example of a user researching printers, the search term "inkjet" is collected for targeting purposes. This is valuable to an inkjet manufacturer who is targeting users who are in the market of purchasing an inkjet printer.

In one embodiment, post processing of the raw data collected by collector 810 is necessary to determine behavioral characteristics. It may not be enough to collect that the user has visited a URL. Hence, embodiments in accordance with the present invention implement various post processing techniques to obtain further identifying characteristics of the user. The techniques discussed below show examples of post processing for illustrative purposes only and are not intended to be exhaustive.

In one embodiment in accordance with the present invention, post processing of the raw data determines if the user really visited the URL. For example, it is valuable to know whether the user just visited the URL briefly or interacted with the URL. An examination of whether the user scrolled through a page on the URL indicates how long and how interested the user was in that URL. This behavioral tracking indicates that the user not only visited the URL, but was also interested in the URL. As such, this user information is more accurate and relevant for use in targeted data delivery.

In addition, post processing of URL data indicates that the URLs visited recently include specific types of URLs. For example, the URL data indicates that the user was visiting URLs associated with car manufacturers and printer manufacturers. This post processing indicates that the user is interested in purchasing both a new car and a new printer. As such, car manufacturers and also printer manufacturers utilize this information for targeted delivery of their URLs.

Other post processing techniques are also be useful in collecting user information. For example, in one embodiment, a spelling corrector is implemented to obtain a true representation of data. Text in e-mails or text messages from handheld devices are riddled with incorrect spellings in the interest of time. A spelling corrector in the post processing stage corrects the spelling so that accurate and relevant user information is collected.

In another embodiment, logs of e-mails are collected by collector 810 when performing the operation described at 710 of FIG. 7. That is, in one embodiment in accordance with the present invention, collector 810 collects a log of sent and received e-mails for purposes of targeted data delivery. Post processing of the e-mails is required to obtain useful user information. For example, a filtering of the text used in the e-mails identifies that the user is in the market for inkjet printers. Other text identifies other behavioral characteristics of the user, such as being a fan of a particular baseball team, etc. In still another embodiment, post processing of downloaded web pages is preformed by scanning text content of downloaded web pages using word frequency statistics as a possible input source.

Collector 810 of the present embodiment is also well suited to collecting behavioral activity that is not related to browsing the internet. For example, in one embodiment, information specifying the use of various devices is collected by collector 810. That is, a user utilizes a number of electronic devices, such as printers, cameras, cell phones, etc. Use of these devices is valuable in targeted data delivery to manufacturers of those devices since the user may be interested in purchasing another similar electronic device or accessory related thereto.

In addition, in various embodiments in accordance with the present invention, collection of location specific information related to the use of electronic devices is important. For example, the geographic locations of an electronic device indicates the location of the user of that electronic device. User information collected by collector 810 from a user identifies that that user travels a particular route when commuting to work. Using such information, it is determined that the user's route passes by a particular supermarket that is also located close to the user's home. The user information also includes how many times the user has passed the particular supermarket. In such an embodiment, this information is used to target that user for the delivery of advertising (e.g., coupons) enticing the user to use the nearby and frequently passed supermarket.

Other information, that is collected by collector 810 when performing the operation described at 710 of FIG. 7, might indicate that a user stores digital photographs on an electronic device (e.g., a PC). In addition, user information indicates that the user prints photographs from those digital photograph files. Using the previous example of a user in the market for an inkjet printer, a particular printer manufacturer targets the delivery of advertising for a color inkjet printer to the user who stores and prints digital photograph files using a competitor printer.

Still other information that is collected by the collector 810 is the type of music that the user listens to, in one embodiment. Music tracks typically include additional information that identifies the band, artist and type of music that the electronic device is playing. This information also is collected and be associated with the user.

In addition, user information that is collected by collector 810 includes hardware configuration of the electronic devices associated with the user. For example, the particular machine configurations of the various electronic devices associated with the user are collected. That is, the particular models of the various devices, peripheral components, drivers installed, interconnect connections (e.g., DSL, cable, telephone), and other associated hardware is collected. As such, the user information includes the model and date of manufacture of the printer associated with the user. These various hardware configuration information indicate when the user may need a new printer cartridge.

In still other embodiments, the software configuration is collected by collector 810 for purposes of targeted data delivery. That is, the types and versions of applications that are loaded onto a particular electronic device (e.g., PC) is collected. In addition, the usage of those types of applications is collected by collector 810. For example, information that indicates a software configuration including a high level publishing application and additional information indicating high use of that application are useful in targeting that particular user for printers that are suitable for desktop publishing.

Additionally, user information indicates how often a particular application crashes in one embodiment. If a particular application crashes frequently, a manufacturer of a competitor application uses this information to target the delivery of advertising data to the user whose application frequently crashes.

Still other forms of collection of user information is possible. For example, in one embodiment, the collection of user information is achieved through voice over internet protocol (VOIP) technology. That is, voice recognition software or VOIP technology is implemented to collect user information related to a user. As an example, the VOIP technology indicates that a user is interested in taking a vacation, in one embodiment. A travel agency uses this information to target the delivery of trip advertising to this particular user.

Other embodiments of the present invention are able to perform postprocessing of the raw data collected from the electronic devices associated with the user to identify which user is associated with the data. For example, multiple users may have access to an electronic device (e.g., a PC). The collection of information associated with the electronic device is most useful if the data is associated with a particular user.

Various post processing mechanisms are employed to identify the user. For example, keystroke rhythm and timing are analyzed to determine which user is currently using the electronic device. One user is identified as having a quick rate of keystroke typing in one embodiment. Another user is identified as having a slower rate of keystroke typing. In addition, users are identified based on the rhythms of the keystroke typing. A smooth rhythm indicates one user, while a choppy rhythm indicates another user.

In still other embodiments, behavioral characteristics of users are used to identify users using other types of electronic device. This is helpful in an environment where multiple users are interacting with the same set of electronic devices. As such, behavior exhibited to a particular user is correctly associated with that user.

Now returning to FIG. 7, at 720, embodiments in accordance with the present invention generate a user profile based on the user information collected in 710. Correspondingly, as shown in FIG. 8, user profile generator 820 implements the operation described at 720 of FIG. 7. As will be described below the user profile generator 820 formats the user profile to enable the use or selection of particular characteristics for purposes of targeting users exhibiting those characteristics. In the present embodiment, the components of the system 800 including the user profile generator 820 are located at the user layer of FIG. 5. More specifically, in one embodiment in accordance with the present invention, the user profile is generated by the user profile generator 820 that is contained within the targeting mechanism 571.

In one embodiment in accordance with the present invention, user profile generation by the user profile generator 820 is only performed with the explicit authorization of the user. That is, the user profile generator 820 functions under the sole control of the user. As such, in one embodiment, the user is capable of requesting that user information not be collected. In another embodiment, the user is capable of deleting the user profile, or transferring the user profile to another location, or taking other actions as controlled by the user, etc.

In another embodiment in accordance with the present invention the user profile is generated by an entity that functions as a proxy to the user. That is, the user specifically authorizes the proxy to generate the user profile and to perform operations associated with the targeted delivery of data. For example, an Internet Service Provider (ISP) functions as a proxy, in one embodiment.

As such, wherever the user profile is generated and maintained by a user profile generator 820, the user has confidence that the user information in the user profile is not compromised and that the user has control over that user information. For instance, whether the user profile generator 820 is located on the hard drive of the electronic device associated with the user, or the user profile is maintained at the ISP, or on a stored database remotely located from the user, the user profile generator 820 is still thought of as an extension of the user's electronic device, since user information is not required to be released.

Furthermore, for purposes of the present application, the term "without requiring a release of any of said user information in said user profile," or any substantially similar term or phrase, is intended to refer to the restriction that the user information is not released outside of the system that is implementing the delivery of data. More specifically, for purposes of the present application the term "without requiring a release of any of said user information in said user profile," or any substantially similar term or phrase, is intended to refer to the restriction that the user information is not required to be released beyond a data distribution layer as denoted by line A-A of FIG. 5. As described previously with relation to FIG. 5, embodiments of the present invention do not require the release of user information beyond particular layers that define the system. In one embodiment of the present invention, the release of user information does not occur beyond a data distribution layer as denoted by line A-A. In another embodiment of the present invention, the release of user information does not occur beyond a device that is located between a user layer and the data distribution layer, as denoted between lines C-C and D-D. In still another embodiment of the present invention, the release of user information does not occur beyond a user layer denoted by line D-D.

In one embodiment, the user profile includes attributes that are associated with the user information. As such, the attributes represent the characteristics (e.g., behavior, personal information, machine configuration, etc.) associated with the user. That is, user information collected by collector 810 is transformed into an attribute by the user profile generator 820. For example, an attribute indicates a URL that has been visited. Another attribute indicates search terms. Still other attributes indicate characteristics particular to a user, as previously described.

In another embodiment, the user profile generator 820 formats these attributes by grouping the attributes into one or more databases. That is, the attributes are stored in a database by the user profile generator 820. For example, the database includes attributes indicating the URLs visited. The same or another database includes all search terms used. In addition, attributes in the database expire after a period of time. As such, one or more databases includes all the attributes associated with user information identifying characteristics of the user. These attributes are formatted to be included in a particular database for searching. Thus, the attributes are used for the targeted delivery of data.

In the present embodiment, the database storing the user information is located at the user layer as described in FIG. 5. For example, the user profile B is shown stored in the electronic device 575 at the user layer. In such an embodiment, control over the user information associated with the database is tightly monitored by the user if necessary.

In other embodiments of the present invention, the user profile generator 820 stores the user profile at devices remote from the user layer. In one such embodiment, the user profile generator 820 stores the user profile at the data distributor layer (e.g., user profile N), or some location between the data distributor layer and the user layer (e.g., user profile A). The protection of privacy of the user information is paramount even with the remote storage of the database of user information. Embodiments in accordance with the present invention ensure a user's privacy by implementing various secure communication means, such as communication over a secure socket layer, communication using encryption, and other secure communication approaches well known in the art.

In still other embodiments, the database of user information corresponding to the user profile is split between various locations. In such embodiments, the user profile generator 820 stores sensitive user information in secure locations at the user layer, or data distribution layer, or some layer in between. Less sensitive user information (e.g., public information regarding the user) is stored by the user profile generator 820 in less secure areas in various locations (e.g., a general database at the data distributor 520 of FIG. 5).

Also, the user information in the user profile is used to automatically fill out electronic forms, in one embodiment. That is, the user information is parsed to select various terms that are applied to an electronic form.

In one embodiment, the user has editing capabilities with regards to an associated user profile. That is, the user adds additional information to the user profile and subtracts information from the user profile. However, the editing capability is limited to prevent user fraud. For example, user editing of profiles is limited to prevent a user from lying about information in the user profile in order to increase chances for satisfying selection criteria. In such an embodiment, the user is trying to accumulate incentives tied to the delivery of data without truly having an interest in that data. That is, the user is trying to make money by automatically trying to satisfy as many queries as possible. Prohibiting the editing of critical features of the user profile prevents misdirected and fraudulent targeting of users.

As a further example, in another embodiment of the present invention, the user is allowed to add or edit information in certain marked fields, such as "name" or "address." However, the user is restricted from editing information in most fields (e.g., URLs visited).

In still another embodiment, fields are editable by users in a limited fashion. That is, the present embodiment allows changing most fields to "not telling" rather than simply deleting their contents. A "not telling" value matches neither positive criteria or negative criteria. As such, this prevents a user from hiding the fact that the user did not visit company C. Thus, the user is prevented from falsely claiming an incentive for an inkjet advertisement from company C, for example.

At 730, the present embodiment receives an offer soliciting delivery of data. More specifically, in one embodiment, the offer includes a query that defines selection criteria of targeted user profiles. In other embodiments in accordance with the present invention, the offer includes the location of the data to be offered for delivery or the data itself, and optionally an offer of compensation for taking delivery. Additional information is optionally included within the offer, such as an expiration period, etc. As shown in FIG. 8, the offer receiver 830 is used to receive the offer. In the present embodiment, the components of the system 800 including the offer receiver 830 are located at the user layer of FIG. 5. To put it into the context of FIG. 5, the offer is received at the electronic device 575 that includes the offer receiver 830 contained within the targeting mechanism 571. In one embodiment in accordance with the present invention, the offer is received by the offer receiver 830 from the data distributor 520 through the broadcast layer.

The offer is used for the solicitation of the delivery of data, in one embodiment. That is, the query within the offer is used to determine if the user receiving the offer is a user who should be targeted. The offer is not specifically targeted to particular users. Instead, the offer is forwarded to a broad group of users. Thus, the information contained within the offer is used to select and target the delivery of data to particular users, as will be described further below.

In the present embodiment, the query included within the offer includes selection criteria used for targeting one or more user profiles. That is, the selection criteria is used to characterize particular users to whom the data is targeted. As such, the selection criteria contains certain characteristics that are important in distinguishing the targeted user profiles from other user profiles. In this way, delivery of data is targeted to particular users.

In one embodiment, the selection criteria contains positive characteristics of the targeted user. For example, these positive characteristics might be actual search terms used, actual URLs visited, actual income, etc.

In other embodiments, the selection criteria contains negative characteristics of the targeted user. For example, these negative characteristics might be search terms that are not used in conjunction with search terms that are used, URLs that have not been visited in a period of time, etc.

In one embodiment, the query included within the offer is represented as a Boolean expression. The Boolean expression includes a number of characteristics. The characteristics in the expression are connected with "and," "or," and "not" Boolean operands. That is, the query includes a number of selection criteria connected with the above mentioned operands. In another embodiment, the query is represented as an arithmetic expression.

Using the previous example of a user in the market for an inkjet printer, the selection criteria may help target or identify a user who is interested in purchasing an inkjet printer. For example, the selection criteria contains characteristics that define a user who has, at least twice, spent time on the URLs of company A and company B, both of whom manufacture inkjet printers, with pages from each domain containing the term "inkjet" and "printer," but who has never visited the URL of company C.

In addition, in another embodiment, to prevent fraud where users try to satisfy as many selection criteria as possible in order to receive incentives, the query is conditioned in favor of users who actually have a favorable behavior. For example, in the case of targeted advertising, the query is directed to users who actually make purchases of an advertised product (e.g., a cosmetic line). In other words, the selection criteria is so specific that it is unlikely that a fraudulent user can meet all of the specific criteria automatically.

Returning to FIG. 7, at 740, the present embodiment determines if the user profile satisfies the selection criteria. That is, the user profile is compared against the selection criteria. As shown in FIG. 8, the comparator 840 is used to access the user profile and to make the determination of whether the user profile satisfies the selection criteria in the query. In the present embodiment, the components of the system 800 including the comparator 840 are located at the user layer of FIG. 5. To put it into the context of FIG. 5, the determination of whether the user profile satisfies the query is made at the electronic device 575 that includes the comparator 840 contained within the targeting mechanism 571.

In embodiments in accordance with the present invention, the determination by the comparator 840 that a user's profile satisfies the selection criteria is made without requiring a release of the user information. Specifically, the user profile satisfies the selection criteria defined in the query. In other words, the determination that the user should be targeted for the delivery of data is made in such a way that the user has control over the user information utilized, and the operations performed, by comparator 840 in making the determination that the user is a targeted user. As such, this targeting of the user is performed without requiring a release of the user information.

In accordance with one embodiment of the present invention, the determination that the user is targeted for the delivery of data is made by the comparator 840 at the electronic device 575 associated with the user. That is, the components of system 800 that operate to perform the targeted delivery of data are located on the electronic device 575 that the user controls. In addition, the user profile and the information contained therein are also stored at the electronic device 575 that is in the control of the user. As such, the targeting of the user is made without requiring any release of the user information outside of the user layer of FIG. 5. More specifically, in the present embodiment, the targeting of the user is made entirely within the electronic device 575, and the user information used to target the user never leaves the electronic device 575. As such, the user is anonymously targeted for the delivery of data.

In one such embodiment as mentioned above, components in system 800 are stored at an electronic device in the control of the user. However, other embodiments of the present invention are well suited to storing the user profile and components of system 800 at a location that is remote from the user and in a secure manner such that the user information is still not required to be released. That is, the determination that the user profile satisfies the selection criteria using information in the user profile is made in a secure location that does not require a release of the user information.

For example, referring back to FIG. 5, the targeting mechanism 581 and the user profile N is located at the data distribution layer which is outside of the user layer. However, the transfer of the user information to the data distribution layer for storage in user profile N is made over a secure data link 587 (e.g., a secure socket layer) that ensures that the user information in user profile N is not released.

Moreover, the use of the information by the targeting mechanism 581 to make the determination of whether the user profile satisfies the selection criteria is made without requiring the release of the user information outside of the targeting mechanism. More specifically, the user N is targeted without requiring a release of information outside the data distribution layer. Since the data distribution layer is a secure layer, the user profile N, the targeting mechanism 581, and the information used by the targeting mechanism 581 to determine that user N is targeted for the delivery of data will not leave the secure data distribution layer. As such, user N is targeted for the delivery of data without requiring a release of information.

As such, embodiments in accordance with the present invention are capable of the targeted delivery of data without requiring a release of user information. For purposes of the present application, the term "without requiring a release of any of said user information in said user profile," or any substantially similar term or phrase, is intended to refer to the restriction that the user information is not released outside of the system that is implementing the delivery of data. More specifically, for purposes of the present application the term "without requiring a release of any of said user information in said user profile," or any substantially similar term or phrase, is intended to refer to the restriction that the user information is not required to be released beyond a data distribution layer as denoted by line A-A of FIG. 5. As described previously with relation to FIG. 5, embodiments of the present invention do not require the release of user information beyond particular layers that define the system. In one embodiment of the present invention, the release of user information does not occur beyond a data distribution layer as denoted by line A-A. In another embodiment of the present invention, the release of user information does not occur beyond a device that is located between a user layer and the data distribution layer, as denoted between lines C-C and D-D. In still another embodiment of the present invention, the release of user information does not occur beyond a user layer denoted by line D-D.

For example, in one embodiment, the targeting mechanism, a subsystem of the system that is implementing the delivery of data is implemented within the user layer below line D-D of FIG. 5. That is, the determination that a user is a targeted user for the delivery of data is implemented within this layer. As such, user information is not released to entities outside of the user layer.

In another embodiment, the targeting mechanism is implemented within the data distribution layer between lines A-A and B-B. That is, the targeting of users is implemented within this layer. As such, user information is not released to entities outside of the data distribution layer. It should be noted however, that even when at least one of the components of FIG. 8 resides within the data distribution layer (e.g., at data distributor 520), embodiments in accordance with the present invention do not require a releasing of the user information. That is, although user information may be utilized by at least one component of FIG. 8 at the data distribution layer, user information is still securely protected and is not divulged to entities outside of the system implementing the targeted delivery of data.

In still another embodiment, the targeting mechanism is implemented within a layer between the data distribution layer and the user layer of FIG. 5. For example, the system is implemented at the system 560 that is located within a layer defined between lines C-C and D-D. That is, the targeting of users is implemented within this layer. Again, in the present embodiment user information is not released to entities outside of system 560 that is located at the layer defined between lines C-C and D-D.

In still another embodiment, the targeting mechanism is implemented within a combination of the layers of FIG. 5 below line A-A. That is, the targeting of users is implemented within these layers. As such, user information is not released to entities outside of these layers.

For example, a manufacturer (e.g., data source 511) who makes a product, widget A, can market widget A to a particular group of customers. This group of customers is a targeted group. The manufacturer defines the characteristics exhibited by the targeted group of customers generally, and these characteristics are used as selection criteria. That is, the manufacturer is not specifically targeting an identifiable customer, but a group of customers that happen to exhibit common characteristics.

Thereafter, in accordance with an embodiment of the present invention, user information is used by a targeting mechanism (e.g., 561, 571, or 581) to determine if an associated user (e.g., user A, B or N) meets those characteristics. More specifically, the present embodiment determines if the user profile satisfies the selection criteria without requiring a release of user information. As such, in accordance with the present embodiment, the targeting mechanism (e.g., 561, 571, or 581) waits to receive the selection criteria, and then at that point determines if the user is one of the targeted group by determining if the user profile satisfies the selection criteria. At no point is the user information required to be released, especially to the manufacturer of widget A, the data source 511.

As such, in such an embodiment of the present invention user information that a particular user has exhibited particular characteristics (e.g., performed specific operations on a PC) that indicates potential interest in widget A is not divulged to the manufacturer of widget A. Instead the manufacturer perceives that there may be users who are interested in widget A, and perceives that these targeted users exhibit perceived characteristics. These perceived characteristics are used to select targeted users using the targeting mechanism.

In contrast to embodiments in accordance with the present invention, conventional spyware routinely divulges confidential data to third party sources, thereby compromising the privacy of unsuspecting individuals. For example, a common technique in conventional spyware is to place an application on a user's PC to spy on an individual's behavior and activity. Typically, the user does not want these spying applications loaded onto the user's PC. However, the spyware is commonly and surreptitiously loaded onto the user's PC with authorization that is fraudulently or deceptively obtained. For example, the user unknowingly accepts the spyware onto the system when downloading desired files or applications that unfortunately come packaged with the spyware. That is, spyware is used to spy on information, and spill that information to third party advertisers so that they can target individuals with unwanted advertisements (e.g., unwanted e-mails). As such, spyware is incapable of providing the targeted delivery of data without requiring a release of user information, as provided in accordance with embodiments of the present invention.

For example, a spyware company would gather information for a plurality of individuals, ship this information to a remote server, create logical representations of each of these individuals, and then market this information to advertisers. The advertisers can then see which individuals can be targeted for specific advertisements.

In a more refined approach, a spyware company would gather information for an individual, ship this information to a remote server, create a logical representation of the individual, come to a conclusion that the individual is in the market for an diamond ring, and markets that individual to diamond merchants. That is, the spyware company divulges information about the individual so that interested diamond merchants can directly contact that individual.

In addition, in direct contrast to embodiments of the present invention, conventional spyware commonly gathers data about the individual and then transfers the data to a remote site for further processing. In the case of spyware, personal data is often transferred without the individual even knowing that the transfer is happening. The transfer frequently occurs in the background when the individual is connected to the interne. During the connection, the individual's PC is communicatively coupled to a remote server for the transfer of the personal data deleteriously gathered by the spyware. This personal data is then used at a remote location without knowing authorization by the individual.

On the other hand, in embodiments of the present invention, the user is targeted for the delivery of data in a manner that ensures the protection of the user's privacy. That is, the user information in the user profile is protected even though it is used to determine if the user profile satisfies the selection criteria.

The protection of the user information is particularly important if the user has sensitive user information stored in a user profile that the user never wants released. For example, the user profile of a user includes sensitive medical information that might be particularly private or embarrassing to the user. The user may have been doing research for a medical condition inflicting the user. As such, the user may not want this information released to an outside source for fear of being identified as someone having such a condition or affliction.

Embodiments of the present invention are able to protect the user's privacy, especially the fact that the user has recently searched web sites that are directed to the user's condition, and also anonymously target the user for the delivery of data. That is, the user is targeted for the delivery of data without requiring a release of user information. In such an embodiment, the user continues to freely conduct research for the user's medical condition, and also be targeted for data related to the conditions (e.g., advertisements for medication treating the user's condition). Furthermore, the user can be targeted for such data without any concern that user information will be traced back to the user indicating that the user has recently visited web sites related to the user's condition.

As another example of the benefits conferred by embodiments in accordance with the present invention, using the previous example of a user in the market for an inkjet printer, the user may not want information released indicating that the user is interested in an inkjet printer manufactured by company C. For example, the user may work for company A which also manufactures inkjet printers. For whatever reason, however the user favors inkjet printers from a competitor, company C. If the user information were to be leaked that could identify that the user is interested in an inkjet printer from company C and that information were obtained by company A, then the user's standing within company A may be severely compromised. Fortunately, embodiments of the present invention allow the user to continue to freely search for inkjet printers from company C. In addition, these embodiments allow that fact to be collected as user information. As such, this user can be targeted for delivery of data related to inkjet printers from company C under a system that protects the user's privacy, since there is no requirement that user information be released for the targeted delivery of data.

Moreover, embodiments of the present invention are well suited to attracting users to a system or network that performs the targeted delivery of data. Normally, a user may be reluctant to participate in a system that may be construed as secretly collecting information related to that user for fear that the information may be released to others. However, embodiments of the present invention are able to collect user information in way that ensures that the user information is not required to be released for the targeted delivery of data. That is, the user knows that the user information is used only for the targeted delivery of data. As such, embodiments of the present invention are able to attract users to the system of targeted data delivery, especially if enticed with incentives for the delivery of data.

Moreover, in embodiments in accordance with the present invention, user information is only released upon explicit authorization by the user. That is, in embodiments in accordance with the present invention user information is required to be released in order for the user to receive data and any corresponding incentives. However, the user information is only released to the data distributor (e.g., distributor 520 of FIG. 5) in a secure fashion and the user information is not further released beyond the data distributor on an individual basis, in one such embodiment. The data distributor releases user information in an aggregate fashion that does not identify any users. As such, the user's privacy is ensured as the user information is never identified with the user, and is never released in a manner that connects the user to the user information.

Returning to 740 of FIG. 7, in one embodiment, satisfaction of the selection criteria is performed through a vector matching process. More specifically, the vector matching process is represented by a function F(x), where x is the query. For example, x is the vector defining the selection criteria of the target profile described previously. Although various embodiments are described using a vector matching process for clarity and brevity, other embodiments are well suited to other techniques that are capable of determining whether the user profile satisfies the selection criteria.

In one particular implementation, the query, x, is a vector that takes all of the words of web pages that are theoretically visited by a targeted user. The vector is over a high dimensional space.

In one embodiment, the function F(x) is a dot product of the query vector and the user profile in vector form. Various techniques are used to determine if the user profile satisfies the selection criteria as defined in the query. For instance, in one case, if the dot product exceeds a threshold value, then the user profile satisfies the selection criteria.

Also, if the dot product is within a predetermined numerical range, this indicates a highly valued match. That is, the user profile closely matches or satisfies the selection criteria. This rating of matches is used to determine the appropriate incentive to be paid to the user for the delivery of data, as will be described more fully below in relation to 910 of FIG. 9.

That is, in accordance with embodiments of the present invention a highly valued match will be paid a greater incentive than a lower valued match.

In addition, a selection of dot products with random vectors is taken. That is, the function F(x) is a randomly generated function. It should be pointed out, that in other embodiments of the present invention, the function F(x) is not a randomly generated function. In one embodiment, the randomly generated function can be used to select a targeted user. For example, the result of F(x) provides numbers that compactly represent a user. This compact representation can be used to filter and determine if a user satisfies the selection criteria. In one embodiment, an inference module is used to determine if the compact representation satisfies the selection criteria.

In one embodiment, if the user profile does not satisfy the selection criteria in the query, the offer containing that query is kept for a period of time. That is, the offer is stored. For example, in one embodiment in accordance with the present invention the query is stored at the targeting mechanism 571 used for targeting the delivery of data. At a subsequent time, when the user profile has changed, the user profile is again compared to the selection criteria to determine if the user profile satisfies the selection criteria.

Returning to FIG. 7, at 750, the present embodiment determines if the data should be delivered to the user when the user profile satisfies the selection criteria, in accordance with one embodiment of the present invention. A determining module 646 makes the determination of whether the data should be delivered to the user. More specifically, in one embodiment, the determining module 646 presents the offer to the user through an electronic device of the set of electronic devices associated with the user. As such, the user can actively accept the offer for the delivery of the data. In one embodiment, the offer includes information that indicates which user information in the user profile will be released should the user accept delivery of the data. As a result, the data is delivered when the offer is accepted by the user, and conversely, the data is not delivered when the offer is not accepted by the user.

At 760 the delivery of data is initiated if it has been determined that the data should be delivered to the user. That is, the data is delivered after it has been determined that the user has accepted the offer for the delivery of data, in one embodiment. More specifically, the initiation of the delivery of data is achieved without releasing any user information in the user profile, except for an indication that the user profile satisfies the selection criteria. In addition, the performance of the collecting operation at 710, the generating operation at 720, the receiving operation at 730, the determining operation at 740, the determining operation at 750 and the initiating operation at 750 are performed without requiring a release of the user information in the user profile except for the indication that the user profile satisfies the selection criteria.

More specifically, the indication that the user profile satisfies the selection criteria is not required to be released beyond line A-A of the data distribution layer in FIG. 5, in accordance with one embodiment of the present invention. In one embodiment, the indication that the user profile satisfies the selection criteria does not provide any user information, and only informs that the user profile satisfies the selection criteria. In another embodiment, the indication that the user profile satisfies the selection criteria is limited to user information that is used to satisfy the selection criteria. As such, because the user profile is closely guarded to protect the privacy of the user and since the determination of whether the user profile satisfies the selection criteria is made in a secure location, user information is not required to be released beyond line D-D of the user layer of FIG. 5 for purposes of targeted delivery of data except for the indication that the user profile satisfies the selection criteria. Hence, as stated above, the user's privacy is protected in a system that is capable of targeted data delivery.

In another embodiment, the initiation of the delivery of data is achieved without releasing any user information in the user profile beyond the user layer. That is, in one embodiment, in determining if the user profile satisfies the selection criteria, user information is not required to be released beyond line D-D of FIG. 5. For example, an offer can be multicasted to a plurality of users. More specifically, the offer forwarded to an electronic device associated with a user includes the query and either the data, a link to the data, or some form of accessing the data. If no compensation is required, as soon as the user profile associated with the user satisfies the selection criteria, initiation of the delivery of data is achieved without releasing any user information in the user profile. That is, the determination that the user profile satisfies the selection criteria and the initiation of the delivery of the data to the user occurs entirely below line D-D of FIG. 5, and does not require any release of user information beyond line D-D of FIG. 5.

As shown in FIG. 8, the delivery module 850 initiates delivery of the data. In the present embodiment, the components of the system 800 including the user profile generator 820 are located at the user layer of FIG. 5. To put it into the context of FIG. 5, the initiation of the delivery of data is performed by the delivery module 850 which is contained within the targeting mechanism 571.

Various methods for initiating delivery of the data are implemented. In one embodiment, the message containing the query also contains a link to the data. As such, once the present embodiment determines that the user profile satisfies the selection criteria, the link is invoked to initiate delivery of the data to a display that is viewed by the user. For example, the data is stored at the data distributor 520 of FIG. 5. In one such embodiment, invoking the link activates the delivery of the data by the data distributor 520 to the user who invokes the link. In this way, the user readily receives the data targeted to that user.

In one embodiment, the data is delivered to the user via a display that is present on the electronic device associated with the user. The display is any display viewable by the user. In one embodiment, the display is on a PC from which user information is collected. In another embodiment, the display is on a device which performs the various functions for targeting delivery of data, such as system 800 of FIG. 8.

In still other embodiments, the display is on any device accessible by the user. That is, the device is a dumb display, which presents the data. For example, the display is a television.

In another embodiment, the data is delivered through a standard telephone communication network. For example, the data is faxed to a user. In another example, the user is directly called in a telemarketing system. That is, once the user is targeted, the user is contacted via phone. The data is automatically played back in a recording to the user, or a telemarketer converses with the user to discuss the data.

In still another embodiment, the data is delivered in the form of e-mails. That is, once the user is targeted, one or more e-mails containing the data is delivered to the user.

Also, in another embodiment the data is customized to the user. That is, before the data is delivered to the user, user information is used to tailor presentation of the data to the user. In the example of the inkjet purchase by a user, the data is customized with a comparison of an inkjet printer of Manufacturer C to inkjet printers of Manufacturers A and B. For instance customizing the data includes text promoting the benefits of an inkjet printer by Manufacturer C, as follows: "Reasons that an inkjet printer from Manufacturer C is superior to inkjet printers from Manufacturers A or C.".

Figure 9:
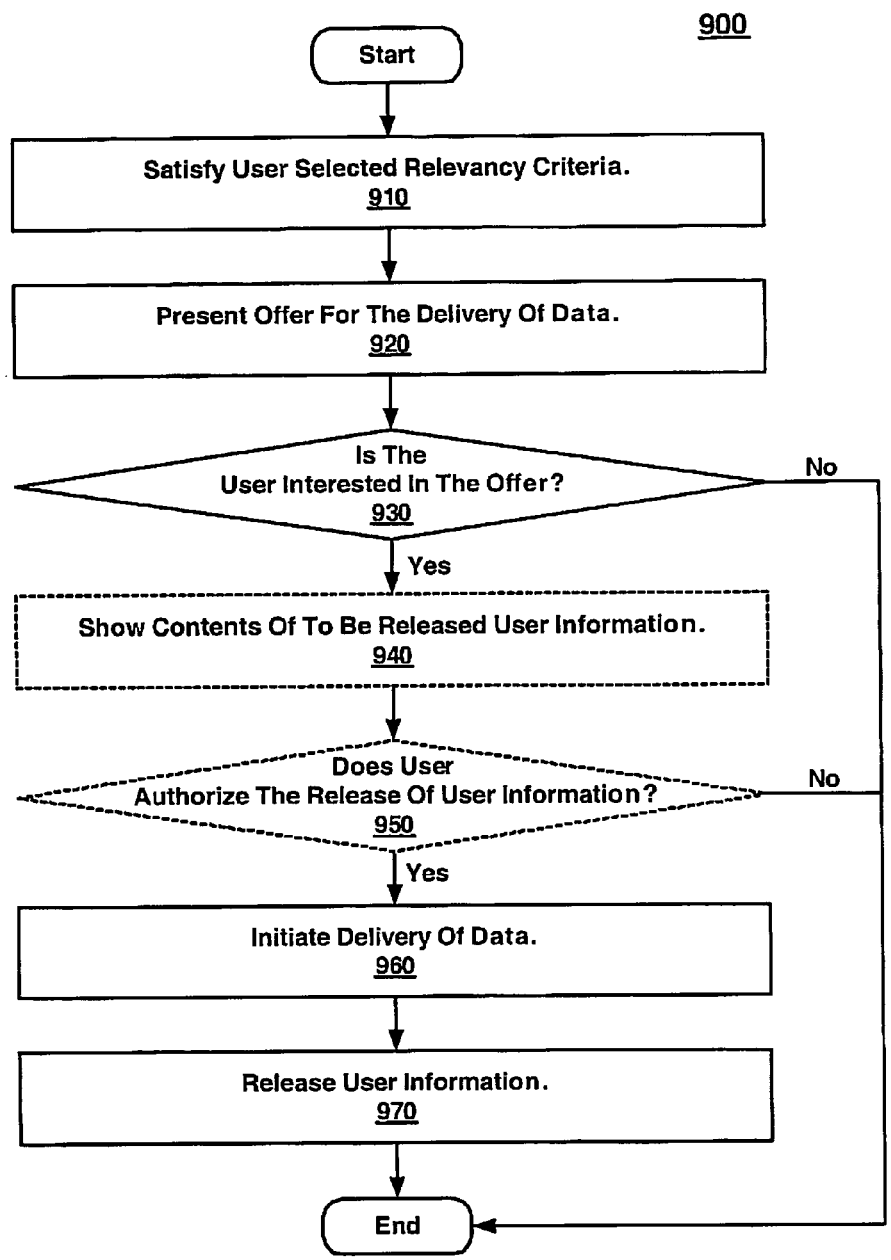
FIG. 9 is a flow diagram illustrating operations in a computer implemented method for determining if an offer for the delivery of data has been accepted, in accordance with one embodiment of the present invention.

Turning now To FIG. 9, a flow diagram illustrating operations for determining if an offer for the delivery of data has been accepted is described, in accordance with one embodiment. Additionally, flow diagram 900 provides further details related to flow diagram 200B of FIG. 2B.

At 910, the present embodiment determines if a user selected relevancy criteria has been satisfied before the initiation of the delivery of data to the user. That is, both the user selected relevance criteria and the selection criteria must be satisfied before the data is delivered to the user.

In one embodiment, the relevancy criteria measures the value to the user of viewing the data. That is, the relevancy criteria is an economic mechanism designed to set a value, as consideration, for the user's attention. For example, the relevancy criteria is some function that translates the user's attention to cash, goods, services, etc. As such, the relevancy criteria is a minimum value that is paid as consideration to the user upon delivery of the data and viewing the data. In other words, in such an embodiment, an incentive is paid to the user for the delivery of the data.

In one embodiment, the user selected relevancy criteria is an "ask price" that is selected by the user. That is, the user selected relevancy criteria is a minimum ask price that must be met before the data is delivered to that user. The ask price is included within the user profile. For example, a bid price is included within an offer soliciting the delivery of data. The bid price indicates the incentive paid to a user for the delivery of the data to the user, and the viewing of the data if required. As such, before the data is delivered, the bid price must equal or exceed the ask price in order to satisfy the user selected relevancy criteria.

Other forms of consideration for the relevancy criteria are coupons, frequent flier miles, points that are accumulated for purchasing awards, etc. In one particular embodiment, the user selected relevancy criteria corresponds to points for the purchase of a PC or printer cartridge, or some other manufactured goods or services. That is, once the user accumulates enough points, a free or reduced price PC or printer cartridge is made available to the user. In accordance with some embodiments of the present invention, the user is resupplied with printer cartridges through the receipt of the incentives paid for viewing data targeted to that user.

In addition, there are different relevancy criteria for various types of data. For example, a user might have a greater interest in sports than in treatment medications. As such, the user may want more data related to sports and less data related to treatment medications. Thus, one relevancy criteria is set to a lower threshold to attract sports data, and another relevancy criteria is set to a higher threshold to detract data regarding treatment medications.

Figure 10:
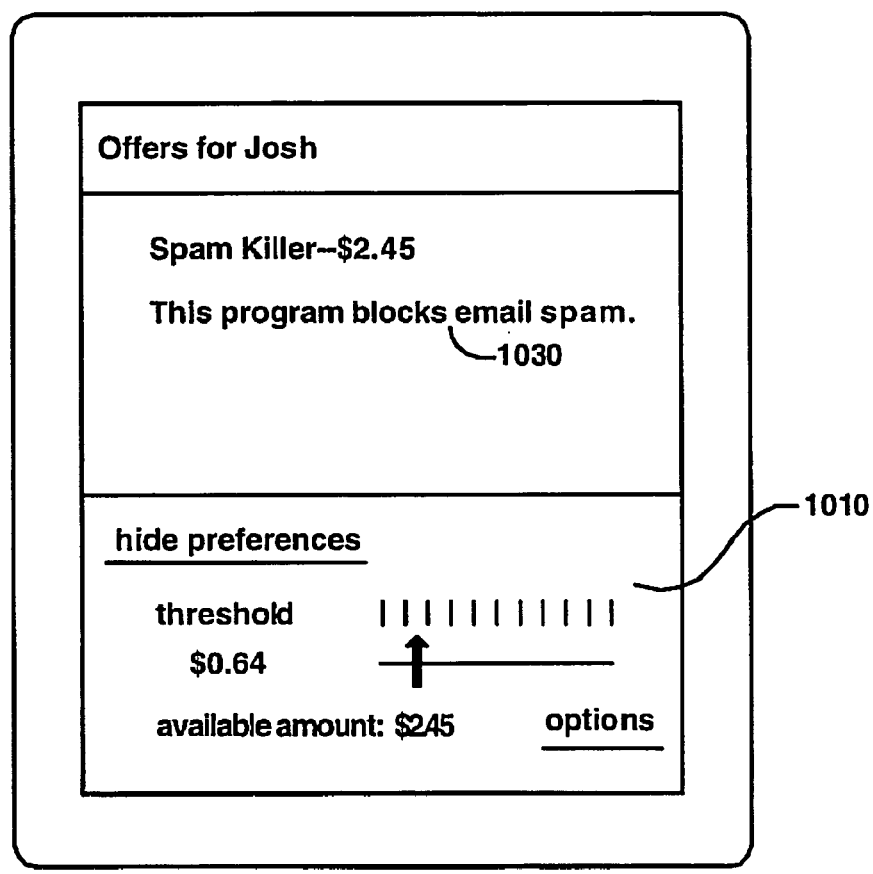
FIG. 10 is a diagram of a display illustrating an interface for an application capable of targeted data delivery, in accordance with one embodiment of the present invention.

In one embodiment, the relevancy criteria is set using a sliding bar, as shown in FIG. 10. FIG. 10 is a diagram of a display 100 displaying an interface to an application that provides targeted delivery of data to a user. In the display 100, a sliding bar 1010 under "preferences" sets the minimum user selected relevancy criteria as a threshold value (e.g., ask price). As shown in display 100, the threshold is set to sixty-four cents. Movement of the pointer in the sliding bar 1010 increases or decreases the threshold. The sliding bar 1010 is shown for illustrative purposes only as other methods for setting the threshold are used in other embodiments.

In still other embodiments, the relevancy criteria is a constraint set by the user. For example, a threshold limits the number of offers that are accepted in a month. In one embodiment, if the threshold has been exceeded, then data will not be delivered to the user. On the other hand, if the threshold has not been exceeded, then the data will be delivered to the user. In another embodiment of the present invention, the relevancy criteria is manipulated internally to limit the number of offers presented to the user to the requested threshold.

In other embodiments, the relevancy criteria is automatically set. That is, based on general criteria set by the user, the relevancy criteria is automatically selected. For example, the threshold in sliding bar 1010 is moved as a function of the number of items of data that have been delivered to spread out a monthly quota of delivered data.

Figure 11:
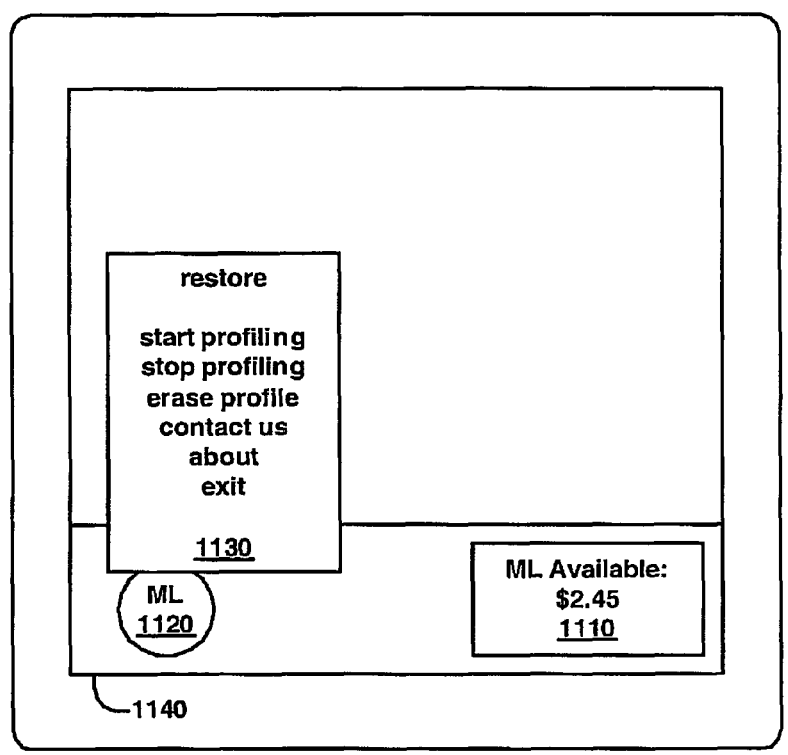
FIG. 11 is a diagram of a display illustrating an icon for a minimized application capable of targeted data delivery, in accordance with one embodiment of the present invention.

The interface in display 1000 is reached by invoking the icon 1120 of FIG. 11. The display 1100 of FIG. 11 illustrates the user interface that implements features of the targeted delivery of data when minimized. At the bottom tool bar 1140, the ML icon 1120 represents the application used for targeting the delivery of data. Block 1130 provides various user options available from the minimized application.

In addition, a summary 1110 of the available amount of consideration that is available to the user is shown. For example, the summary 1110 shows that $2.45 in cash is available for the user to earn if they view all the relevant data. This available amount is repeated in display 1000 at block 1020.

Returning to FIG. 9, at 920, an offer is presented for the delivery of data when the user profile satisfies the selection criteria. That is, before the data is delivered, the user has a choice of whether or not to accept delivery of data for viewing, in accordance with one embodiment. For example, the user bases a decision on whether the incentive or payment associated with the delivery of data is worthwhile to the user.

In accordance with embodiments of the present invention, the offer is presented to the user in an unobtrusive manner. That is, the offer need not be blatantly presented to the user, as in a pop-up advertisement in the conventional art, since the user's attention has already been filtered and the user most likely is interested in the data. For example, in the display 1000 of FIG. 10, the user interface presents a list of offers available to the user. As shown in FIG. 10, there is one offer ("Spam Killer") that is available to the user. The number of offers shown in FIG. 10 will vary depending on how many offers have selection criteria that are satisfied by the user profile.

Once the option 1030 in FIG. 10 is selected, information is provided to the user that is related to the offer. For example, a brief summary of the data source (e.g., printer company C) is provided. In addition, a brief summary of the data is also provided to the user. Other additional information is provided to the user so that the user may make an informed decision as to whether the delivery of data is desired. In another embodiment, this information is shown directly as part of display 1000.

Returning to FIG. 9, the present embodiment determines if the user is interested in the offer at 930. If the user is interested, the present embodiment proceeds to 940. On the other hand, if the user is not interested, then the present embodiment ends.

At 940, the present embodiment optionally presents to the user a summary of the user information that will be released if the offer is accepted. That is, user information that is used to satisfy the selection criteria will be released to the data distributor if the offer is accepted and is summarized for the user before being released. In this manner, the user can determine if he wants to release the user information. The release of user information is additional consideration for payment of the incentive to the user for accepting delivery of data and viewing the data.

The user's privacy is protected since only user information that is used to satisfy the selection criteria is subject to release and not the entire user profile. As such, sensitive user information that the user would like to keep private would not be released if it is not used to satisfy the selection criteria. For example, returning to the inkjet purchasing example, if the user is an employee of printer company A and is using a company computer, the user may not want information released indicating that URLs visited included a URL for a competitor of company A.

At 950, the present embodiment optionally determines if the user authorizes release of the user information. At 950, the present embodiment allows the user to stop the release of user information. That is, when the user decides that the user information is too private, the present embodiment allows the user to deny authorization for the release of the user information. When authorization is not given, then the present embodiment ends. As such, the delivery of data does not occur.

On the other hand, if authorization is given, then the present embodiment proceeds to 960 to initiate the delivery of data, as previously described in relation to 750 of FIG. 7. That is, the data is delivered to the user for viewing.

At 970 the user information is released and payment of the incentive is made. In one embodiment, the information is released to the data distributor (e.g., data distributor 520 of FIG. 5). In such an embodiment, the privacy of the user information has not been significantly compromised since it is in the data distributor's best interest to protect the privacy of its users in its network of users. As such, the data distributor provides aggregate data without violating any privacy interests to the data sources.

Automated viewing of the data facilitates fraudulent manipulation of the targeted data delivery system in order to automatically receive incentives paid for the delivery and user viewing of data without the user themselves viewing the data. That is, fraudulent users who satisfy the selection criteria and the relevancy criteria may try to have software view the data for them. However, in one embodiment, to prevent fraud computer generated Turing tests are implemented to defeat the automated viewing of the data. Other embodiments are well suited to implementing other means for determining when the data is automatically viewed fraudulently.

In another embodiment in accordance with the present invention, data is delivered before the release of information is authorized. As such, even though the data has been delivered and the user has viewed the data, the user has a last chance to stop the release of user information. That is, when the user decides that the user information is too private, the user chooses to deny authorization for the release of user information. When authorization is not given, the present embodiment ends. However, the incentive associated with viewing the data is not presented to the user as the user did not release the related user information.

In still another embodiment, after the user accepts the delivery of data and authorizes the release of user information, an additional tag-on offer is presented to the user for the delivery of additional data. The additional data is unrelated or related to the previously delivered data. For example, an offer is presented to the user for the delivery of three future e-mails from the advertiser in return for a cash incentive of five dollars.

Figure 12:
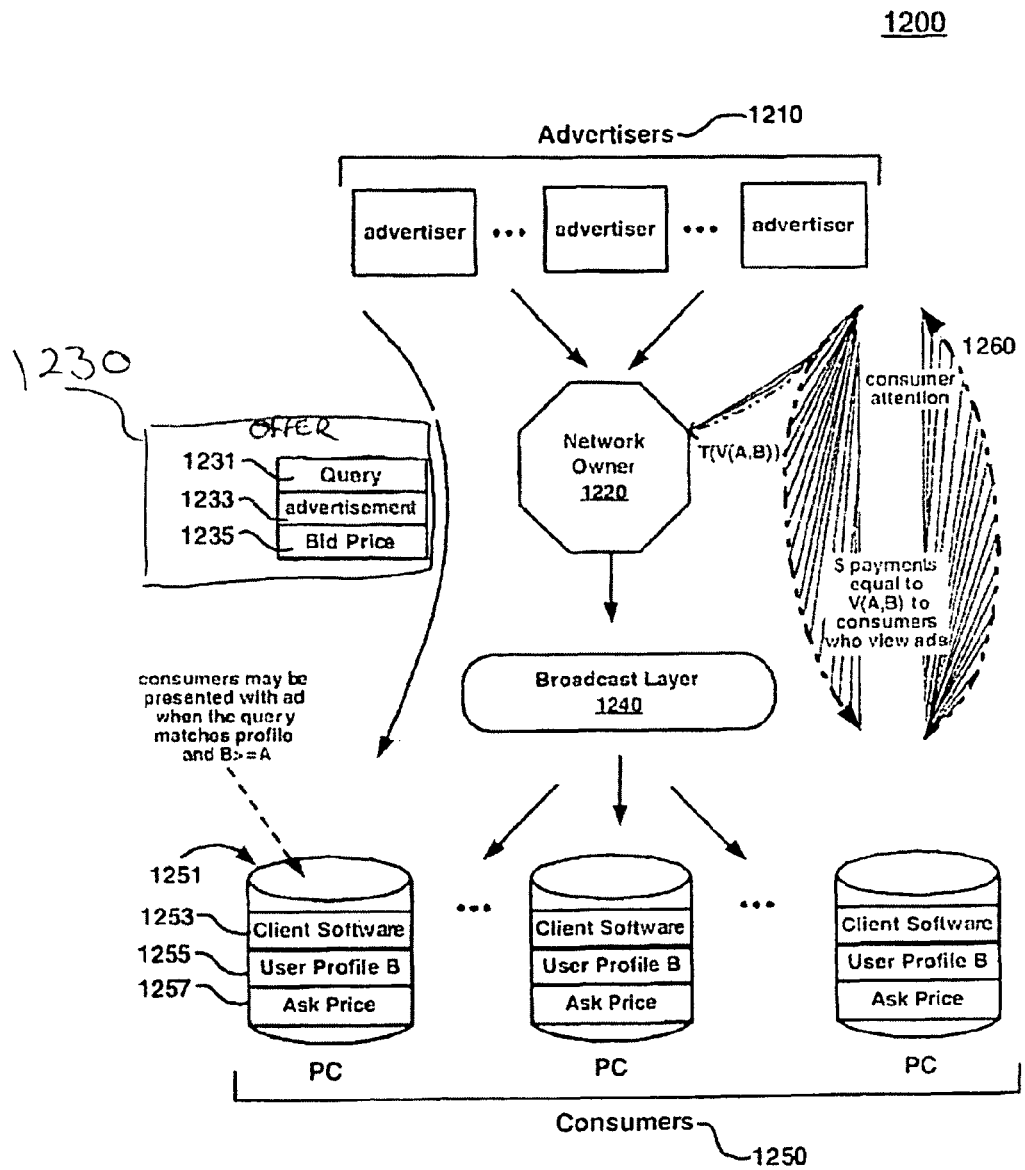
FIG. 12 is a block diagram of a system that is capable of targeted data delivery between a plurality of advertisers and a network of consumers through a data distributor, in accordance with one embodiment of the present invention.

FIG. 12 is a diagram of an exemplary system 1200 that is capable of targeted data delivery between advertisers and consumers, in accordance with one embodiment of the present invention. FIG. 12 is presented here to apply the methods and systems of FIGS. 7-11 in one particular implementation of targeting the delivery of advertisements.

In FIG. 12, the system 1200 links a plurality of advertisers 1210 to a network of consumers 1250 for the targeted delivery of advertisements. More specifically, the present embodiment links an advertiser with a particular consumer for the targeted delivery of an advertisement. For purposes of illustration, the system 1200 is described in the context of delivering advertisements, but is also used for the delivery of other types of data, such as announcements, messages, etc. Additionally, the system 1200 is capable of achieving delivery of an advertisement that is targeted to a user based on information in a user profile associated with the consumer without requiring a release of user information in the user profile to protect privacy.

The architecture of system 1200 functions similarly to the architecture in network 500 of FIG. 5. For example, an advertiser uses a network owner 1220 to broadcast a offer 1230 through a broadcast layer 1240 to reach a network of consumers 1250. That is, the offer 1230 is propagated to each of the network of consumers 1250. The offer 1230 includes a query 1231, an advertisement link 1233, and a bid price 1235. If the selection criteria in query 1231 is satisfied by any of the user profiles associated with a consumer, then the advertisement is delivered to that consumer.

In system 1200, client software is installed on PCs sold to users who participate in the network of consumers 1250. In other embodiments, the client software is installed onto computing devices of the user (e.g., PC) when the user decides to join the network of consumers 1250. That is, the client software is installed after the purchase of the computing device. The software operates in the background of the PC and tracks a wide variety of user information and behaviors, as previously described in relation to 710 of FIG. 7. This logged information is put into a database which is stored locally on the PC. In other embodiments, the logged information is stored in a database which is remotely located from the user and not on the PC.

It should be noted that in accordance with embodiments of the present invention, even though the software is operating in the background, the software is operating with the authorization of the user for purposes of targeted data delivery. That is, unlike conventional spyware which is operating under fraudulently obtained or absent any authorization, embodiments of the present invention operate with the full knowledge and consent of the user, and often for the pecuniary benefit of the user.

For example, PC 1251 is associated with a particular consumer. Client software 1253 is installed on the PC 1251 to track and log user information associated with the consumer. The user information is provided in a user profile 1255 which is stored locally on the PC 1251. Because the user information is stored locally, the consumer has maximum control over the associated data. That is, the consumer has control over whether information is released from the PC 1251, and when that information is released. In addition, an ask price 1257 associated with the consumer is stored locally on the PC 1251.

Also, the client software 1253 is used to determine if the user profile 1255 satisfies the query 1231. That is, the computation done to determine if the user profile 1255 satisfies the query 1231 occurs locally on the PC 1251. Further, the computation is performed transparently to the consumer.

Only when the criteria in the query 1231 is satisfied by the user profile 1255, and when the bid price 1235 exceeds the ask price 1257 will the offer to view the advertisement be presented to the consumer. If the consumer chooses to the view the advertisement, then the network owner 1220 delivers the advertisement to the consumer for viewing (e.g., the link 1233 is invoked). In addition, in return for the consumer's attention, a payment is made to the consumer who is viewing the advertisement, as depicted at 1260. The payment is a function of the user ask price, A, and the bid price, B. The incentive delivered to the user is limited by $A \leq V(A,B) \leq B$. In addition, in another embodiment, credit to the consumer is managed by the network owner 1220.

In the present embodiment, the system 1200 operates without anyone other than the consumer knowing that the consumer's user profile 1255 satisfies the criteria set forth in the query 1231, until the offer is accepted, at which point the network owner is made aware of information in the consumer's user profile. Even though the targeting is extremely specific (e.g., exploiting a wide range of consumer data) which allows the advertiser to reach exactly who they want to reach, this is accomplished without violating the consumer's privacy because of the privileged position of the PC as the final stage in the delivery of all content.

As a result, the system of FIG. 12 is capable of targeting advertisements to particular users who exhibit characteristics that the advertiser thinks are indicative of a potential buyer. Further, the advertiser is willing to pay, for example, three dollars for the attention of a consumer, if the selection criteria is satisfied.

Section 3

Method and System for Targeted Data Delivery from the Standpoint of the Data Distribution Layer In section 3, embodiments of the present invention are described from the standpoint of the data distribution layer. For example, the data distribution layer is located between lines A-A and B-B in FIG. 5. As such, description of the targeted delivery of data is described below from the standpoint of the data distribution layer.

Figure 13A:
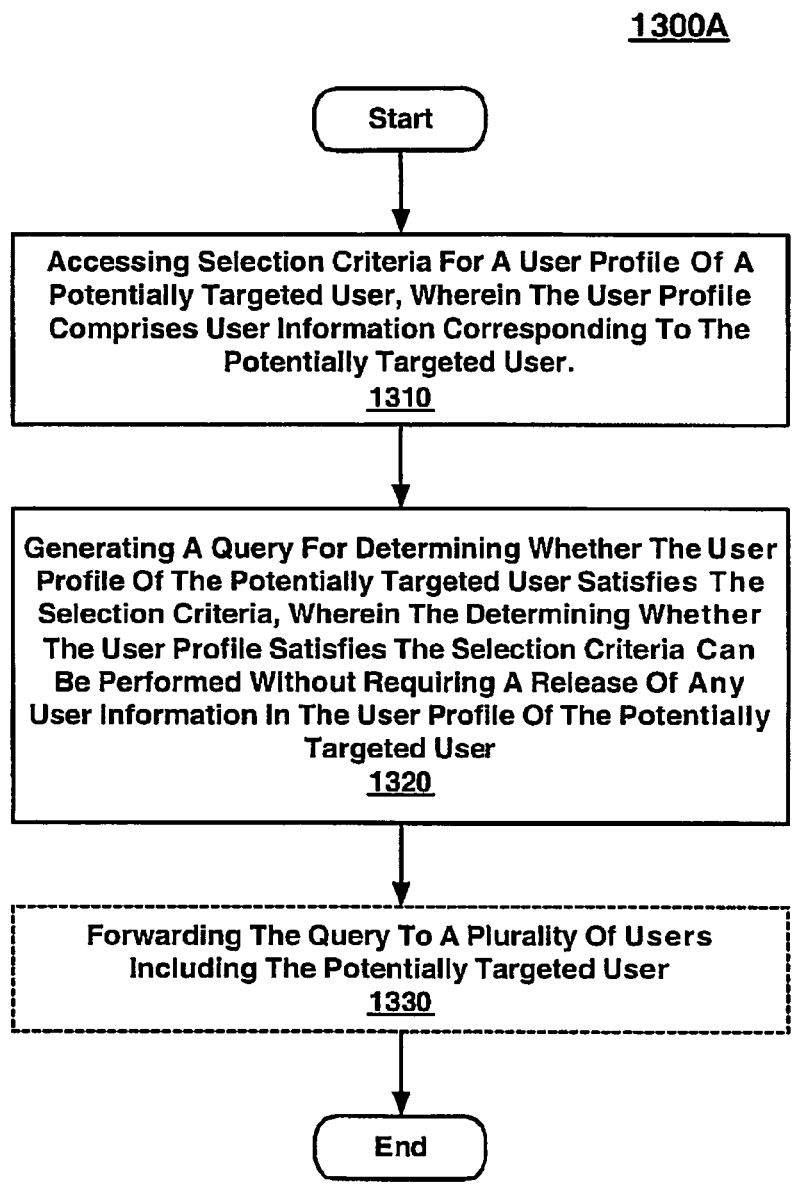
FIG. 13A is a flow diagram illustrating operations in a computer implemented method for targeted data delivery in which a query is generated, in accordance with one embodiment of the present invention.
Figure 13B:
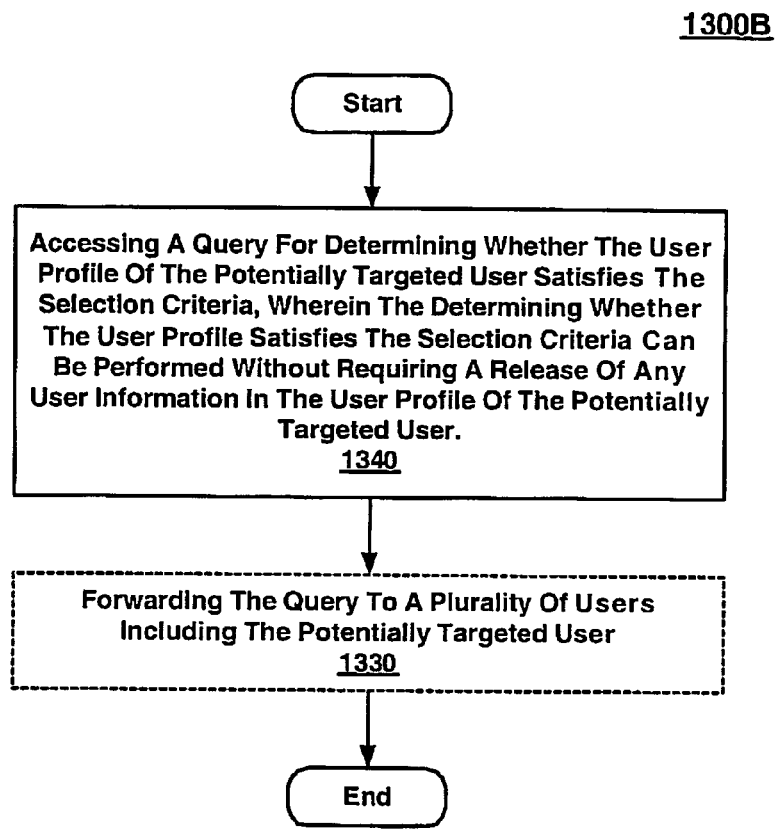
FIG. 13B is a flow diagram illustrating operations in a computer implemented method for targeted data delivery in which a query is accessed, in accordance with one embodiment of the present invention.
Figure 14:
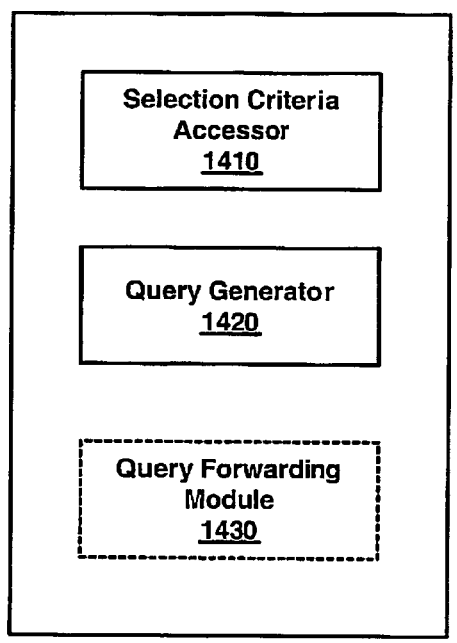
FIG. 14 is diagram illustrating a system capable of implementing the method of FIG. 13A, in accordance with one embodiment of the present invention.

Embodiments described in conjunction with FIGS. 13A, 13B, and 14 pertain to methods for targeted data delivery and a system for implementing the same. FIG. 13A is a flow diagram illustrating operations performed in a method for targeted data delivery in which a query is generated, in accordance with one embodiment. FIG. 13B is a flow diagram illustrating operations performed in a method for targeted data delivery in which a query is accessed, in accordance with one embodiment. FIG. 14 is diagram illustrating a system capable of implementing the methods of FIG. 13A, in accordance with one embodiment.

Although embodiments of FIGS. 13A, 13B, and 14 are described from the standpoint of the data distribution layer of FIG. 5 for purposes of clarity and brevity, other embodiments of the same Figures are implemented from the standpoint of other layers in FIG. 5, as will be described below.

The operations of the methods described in FIGS. 13A and 13B are performed at the data distribution layer of FIG. 5, in one embodiment of the present invention. In addition, in FIG. 14, the components of system 1400 which perform the operations of the method of FIG. 13A are located at the data distribution layer, in one embodiment. However, other embodiments of the present invention are well suited to locating the components of system 1400 at the data source layer of FIG. 5, or some other layer between the data source and the data distribution layer. In one embodiment in accordance with the present invention, the components of system 1400 are located on the system of a broker, not shown, who represents the data source and generates a query. Still other embodiments locate the components of system 1400 in a combination of the layers described above.

Turning now to FIG. 13A, a flow diagram 1300A is described illustrating operations for targeted data delivery for the generation of a query, in accordance with one embodiment of the present invention. In the present embodiment, the flow diagram 1300A is taken from the standpoint of the data distribution layer in FIG. 5. However, other embodiments of the present invention are well suited to performing the method of FIG. 13A at other layers, or a combination of layers in FIG. 5. That is, generation of the query occurs at the data distribution layer, the data source layer, or some layer in between, in accordance with embodiments of the present invention. The method of flow diagram 1300A is used to ensure the privacy of user information used for targeting delivery of data.

At 1310, the present embodiment accesses selection criteria. As described previously with respect to FIG. 7, the selection criteria defines characteristics exhibited by a targeted user for the delivery of data. These characteristics are met by the user profile of a targeted user. That is, the selection criteria is used to determine if the user profile of a potentially targeted user satisfies the target profile described by the selection criteria.

The user profile comprises user information corresponding to the potentially targeted user. If the user profile satisfies the selection criteria, then the potentially targeted user is a targeted user to whom data may be delivered. A full discussion regarding user profiles was previously presented in conjunction with operation 720 of FIG. 7.

As shown in FIG. 14, a selection criteria accessor 1410 is used to access the selection criteria. In the present embodiment, the components of system 1400 including the selection criteria accessor 1410 are located at the data distribution layer, however, in other embodiments the selection criteria accessor 1410 is located at other layers of FIG. 5.

At 1320, the present embodiment generates a query for determining whether the user profile of the potentially targeted user satisfies the selection criteria. That is, the query is used to determine if the potentially targeted user is targeted for the delivery of data by initiating operations that compare the user profile to the selection criteria, as previously described above in conjunction with the discussion of operation 740 of FIG. 7. As shown in FIG. 14, a query generator 1420 is used to generate the query. While the present embodiment describes the query generation as being located at the data distribution layer of FIG. 5, other embodiments are well suited to locating the query generator 1420 at other layers of FIG. 5.

Embodiments in accordance with the present invention determine whether the user profile satisfies the selection criteria without requiring a release of any user information in the user profile associated with the potentially targeted user. In one embodiment, user information is not required to be released beyond the data distributor. That is, in determining if the user profile satisfies the selection criteria, user information is not required to be released beyond the line A-A in FIG. 5. As such, embodiments in accordance with the present invention are capable of generating a query that is implemented within a system that targets users who satisfy selection criteria without requiring a release of user information. Thus, the present embodiment maintains the privacy of the user information comprising the user profiles.

In one embodiment, query generator 1420 generates the query in response to input through a web enabled interface.

For example, input entered from a data source is delivered to query generator 1420. The query generator 1420 is located at the data distribution layer of FIG. 5, in one embodiment. At that point, query generator 1420 generates the query for use in targeting data delivery.

In one embodiment, the query is vetted to see if it is objectionable. For example, before the query is broadcasted in 1330, the data distributor who forwards the query examines the contents of the query to determine if the query is searching for objectionable (e.g., very private information such as social security numbers), characteristics of users. If the data distributor finds the query is objectionable, then the query is rejected before it is broadcasted. In one embodiment, any data associated with the query is vetted to see if it is objectionable.

For purposes of organization, specific examples and detailed descriptions of the query generation process will be described in greater detail in section 4 in which targeted data delivery is described from the standpoint of the data source layer.

At 1330, the present embodiment optionally forwards the query to a plurality of users, including the potentially targeted user. That is, the query is broadly distributed to determine which of the plurality of users has a user profile that satisfies the selection criteria and is a targeted user for the delivery of data. In some embodiments, the query may be accompanied by data, a link to data, or a bid price.

As shown in FIG. 14, in one embodiment in accordance with the present invention, query forwarding module 1430 forwards the query to the plurality of users. In the present embodiment, query forwarding module 1430 is located at the data distribution layer. In other embodiments, query forwarding module 1430 is located at the broadcast layer of FIG. 5.

In embodiments of the present invention, the query forwarding module 1430 broadcasts the query to the plurality of users. The query forwarding module 1430 is a server of the data distributor 520 at the data distribution layer of FIG. 5, in one embodiment, or one or more servers of the data distributor 520 in other embodiments.

In one embodiment, the query forwarding module 1430 broadcasts the query through the internet. That is, the query is broadcast to the plurality of users via the internet, such as through a direct server to an electronic device (e.g., PC). However, other embodiments are well suited to other forms of broadcasting. For example, the query forwarding module 1430 is capable of broadcasting the query through an indirect connection, such as a peer-to-peer scheme.

Also, query forwarding module 1430 is capable of broadcasting through a datacasting method. The query is sent via a datacast network, such as an existing television (TV) network, a high definition television (HDTV) network, a HD radio network, satellite radio network, a radio network, or any suitable broadcasting medium. That is, in one embodiment in accordance with the present invention, the query is delivered to a broadcast antenna and then broadcasted to any user within the coverage area. The number of potential users is quite large, as datacasting will send the query to mobile as well as stationary users. For example, various handheld devices (e.g., PDAs, cell phones, etc.) as well as watches are configured to receive datacast messages. In this way, the query is anonymously transmitted to a plurality of users at one time without any targeting, instead of transmitting the query separately to each individual user. In another embodiment, the broadcasting of the query is implemented through client polling In one embodiment, query forwarding module 1430 is capable of selecting users to whom the query is broadcasted. For example, query forwarding module 1430 sends the query to all of its supported users, or to randomly selected users, or demographically selected users. This reduces the cost of broadcasting. For example, query forwarding module 1430 filters out the users by zip code. As such, the query is broadcast only to one or more predetermined zip codes, although query forwarding module 1430 is capable of supporting many more zip codes.

In one embodiment, query forwarding module 1430 broadcasts the query in stages. For example, the query is broadcast in stages to help determine the interest in the data. This aids in determining the interest in the associated data, how quickly a budget could be exceeded or how much a budget would have to be adjusted. For example, an incentive budget is placed for delivery of data associated with a query. The query is first sent to one-thousand potentially targeted users, for example, to determine interest in the data. The sample size is small enough that the budget will not be exceeded. If the hit rate of targeted users is high, then there is high interest in the data and the budget may be quickly exceeded. As such, the budget cap may need to be increased before another broadcast is made. On the other hand, if the hit rate is low, then there is lesser interest in the data. As such, the query is directly sent to another set of potentially targeted users.

In another embodiment, query forwarding module 1430 charges a fee for broadcasting the query. For example, a fee of one cent per broadcasted message might be charged. Other rate schemes are implemented depending on the number of queries that are broadcasted by a particular data source.

Turning now to FIG. 13B, a flow diagram 1300B illustrates operations performed in a method for targeting data delivery, in accordance with one embodiment of the present invention. In the present embodiment, the flow diagram 1300B is taken from the standpoint of the data distribution layer in FIG. 5. That is, the operations in flow diagram 1300B are performed between lines A-A and C-C.

At 1340, the present embodiment accesses a query for determining whether a user profile of a potentially targeted user satisfies the selection criteria. As described previously in 1310, the query includes the selection criteria and is used to select users who satisfy the selection criteria for the delivery of data. In the present embodiment, the query is forwarded to a plurality of users including the potentially targeted user, at 1330, as previously described in FIG. 13A.

In the present embodiment, the query is generated at a location other than the data distributor. That is, the query is generated at a layer other than the data distribution layer of FIG. 5. More specifically, the query is generated at the data source layer or some other layer between the data source and the data distribution layer. For example, the query is generated by a data source through a web enabled interface run by the data distributor, as will be described more fully below in section 4.

Figure 15:
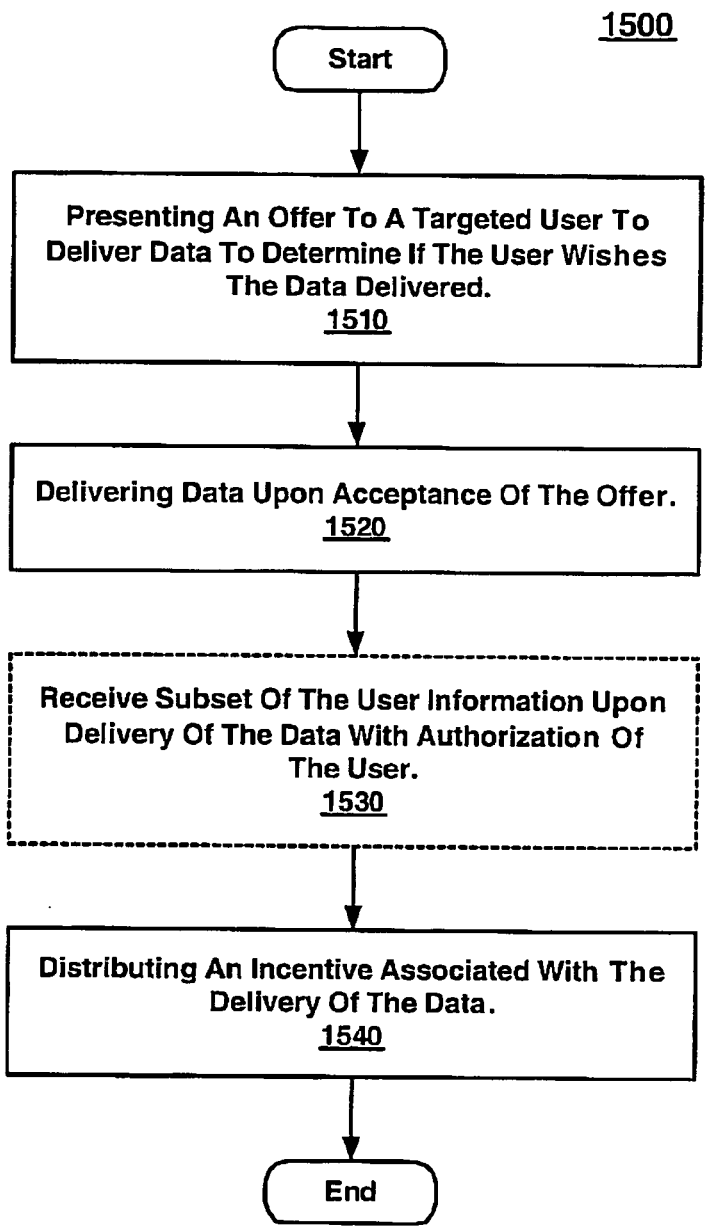
FIG. 15 is a flow diagram illustrating operations in a computer implemented method for targeted delivery of data in which an incentive is distributed, in accordance with one embodiment of the present invention.
Figure 16:
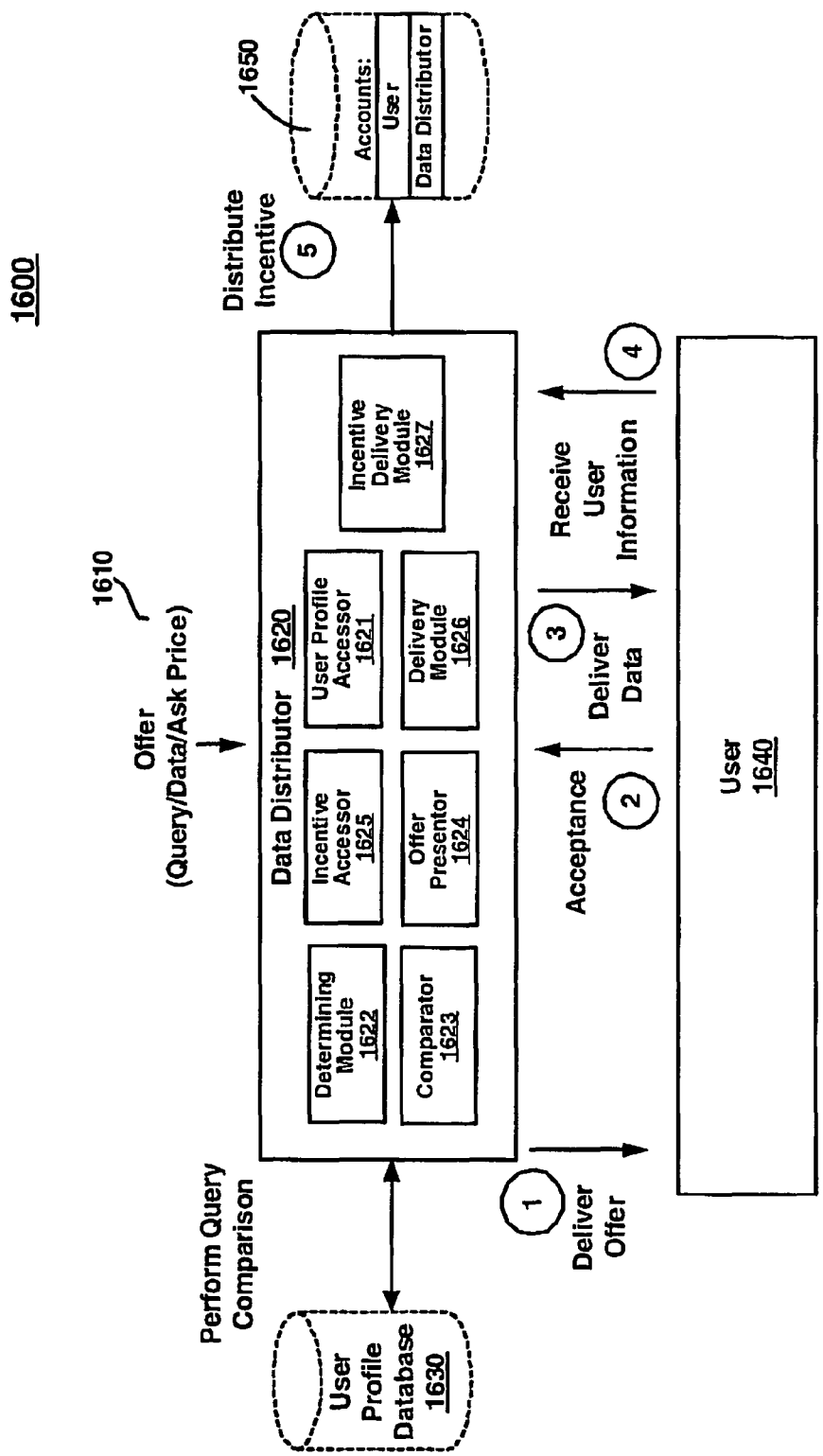
FIG. 16 is a data flow diagram illustrating the flow of information in the method of FIG. 15, in accordance with one embodiment of the present invention.

FIG. 15 in combination with FIG. 16 illustrate an exemplary system for the targeted delivery of data in which an incentive is distributed. FIG. 15 illustrates a method for targeted delivery of data, and FIG. 16 is a system for implementing the method of FIG. 15 in accordance with embodiments of the present invention.

Turning now to FIG. 15, a flow diagram 1500 illustrates operations performed in a method for targeted delivery of data in which an incentive is distributed, in accordance with one embodiment. Flow diagram 1500 describes additional operations performed subsequent to the performance of the operations described in the flow diagrams of FIGS. 13A and 13B.

At 1510, the present embodiment presents an offer to a targeted user for the delivery of data. This offer is presented to determine if the targeted user wishes the data delivered. The presentation of the offer by the offer presentor 1624 is shown in operation 1 of the data flow diagram of FIG. 16.

In FIG. 16, a data flow diagram illustrates the flow of information in the method of FIG. 15, in accordance with one embodiment. As shown in FIG. 16, an offer 1610 containing some combination of the query, data, and ask price is delivered to a receiver in the data distributor 1620. More specifically, the offer 1610 contains the query, in one embodiment. In another embodiment, the offer 1610 contains the query and some form of accessing the data, such as the data itself, or a link to the data. In still another embodiment, the offer 1610 contains the query, some form of accessing the data, and the ask price. As such, in embodiments in accordance with the present invention, the query is contained in the offer 1610, or is generated by the data distributor 1620.

In addition, an optional user profile database 1630 is configured to be accessible by the data distributor 1620. That is, the targeting mechanism is centralized at the data distributor 1620. As such, the data distributor 1620 is capable of determining which of the plurality of potentially targeted users it supports has a user profile that satisfies the query. In such an embodiment, the data distributor 1620 stores the user profiles of its network of users at the optional user profile database 1630. In another embodiment, to ease the considerable burden of storing and searching millions of user profiles, the storing and computation performed on user profiles are offloaded to the clients associated with the plurality of potentially targeted users, as previously discussed in section 2.

In one embodiment, operation 1 may be performed to determine whether the user profile of the potentially targeted user satisfies the selection criteria as defined by the query that is included within an offer. That is, the offer is delivered to the user by the offer presentor 1624 in operation 1. In accordance with embodiments of the present invention, the offer includes the query, and the location of the data to be offered for delivery, or alternatively the data itself. Additionally, an optional offer of compensation (e.g., incentive) for taking delivery is included within the offer. Also, additional information is included within the offer, such as expiration period, expiration date, etc.

More specifically, in accordance with one embodiment of the present invention, the data distributor 1620 is capable of determining which of the plurality of potentially targeted users it supports has a user profile that satisfies the query. As such, a determining module 1622 located within the data distributor 1620 uses the query within the offer to determine if the user profile satisfies the selection criteria. That is, in the present embodiment, a user profile accessor 1621 located within the data distributor 1620 accesses the user profile and a comparator 1623 located within the data distributor 1620 compares the user profile to the selection criteria.

In the embodiment where the data distributor 1620 performs the computation of determining whether the user profile satisfies the selection criteria, then data distributor 1620 is able to filter out targeted users. As such, delivery of data is targeted to those users (e.g., through user 1640) whose user profile satisfies the selection criteria in the query included within the offer. More specifically, in the present embodiment the offer is forwarded to users whose user profiles satisfy the selection criteria so that those users can determine whether to authorize delivery of the data.

On the other hand, in operation 1, if the computation for determining whether a user profile satisfies the selection criteria is not performed at the data distributor 1620, then the offer is delivered in a broadcast message to a plurality of users, including a user 1640 that is a potentially targeted user, in one embodiment. In such an embodiment, a determining module (e.g., located within the targeting mechanisms 561, 571, or 581 of FIG. 5) that is associated with a particular user uses the offer to determine if the user profile satisfies the selection criteria. That is, in the present embodiment a user profile accessor (e.g., located within the targeting mechanisms 561, 571, or 581 of FIG. 5) accesses the user profile and a comparator (e.g., located within the targeting mechanisms 561, 571, or 581 of FIG. 5) compares the user profile to the selection criteria. If the comparator determines that the user profile satisfies the query, then the offer is then presented to the user for acceptance of delivery of the data.

In accordance with one embodiment of the present invention, an optional bid price associated with the data is also delivered. That is, a bid price is presented to the user as part of the offer for the delivery of data, in one embodiment. As such, the bid price is used to determine if the user is interested in the delivery of data. That is, the bid price is accessed and compared against a user selected relevancy criteria. The incentive associated with the data is a function of the bid price. Data is delivered only when the bid price satisfies the user selected relevancy criteria. Previously, a full discussion on the delivery of the bid price was presented in relation to FIG. 10. The bid price is shown in FIGS. 3, 4, 5, and 12.

For example, if data distributor 1620 determines if the bid price satisfies the user selected relevancy criteria, then an incentive accessor 1625 in the data distributor 1620 accesses the incentive (e.g., bid price) associated with the data. Comparator 1623 in the data distributor 1620 compares the incentive against the user selected relevancy criteria (e.g., ask price). An offer presentor 1624 in the data distributor 1620 offers to deliver the data when the incentive satisfies the user selected relevancy criteria.

Returning to FIG. 15, at 1520, the present embodiment delivers data upon acceptance of the offer. Acceptance of the offer is conditioned upon a determination that the user profile satisfies the selection criteria. For example, delivery module 1626 in the data distributor 1620 delivers the data. Previous descriptions of the presentation and acceptance of the offer was presented in FIG. 9. As shown in FIG. 16, acceptance of the offer is illustrated in operation 2, where the user 1640 delivers acceptance of the offer. In such an embodiment, the user authorizes the delivery of data.

At 1520 of FIG. 15, the present embodiment delivers data to the user 1640 upon acceptance of the offer. As shown in FIG. 16, operation 3 illustrates the delivery of data from data distributor 1620 to the user 1640 whose user profile satisfies the selection criteria. Delivery module 1626 contained within the data distributor 1620 delivers the data. For example, in one embodiment the delivery is implemented when the user invokes a link to the data. In such an embodiment, the data is stored at the data distributor 1620 and is delivered to the user 1640 upon invoking the link.

In addition, at 1530, optionally, the present embodiment receives a subset of user information upon delivery of the data. For example, a receiver at the data distributor 1620 receives a subset of the user information upon delivery of the data. Release of the subset of user information from an information receiver (e.g., located at a targeting mechanism 561, 571, or 581 of FIG. 5) is conditioned upon authorization of the user, in one embodiment. Release of the user information was presented in conjunction with the discussion of FIG. 9. For example, the released information is limited to only the user information used to satisfy the selection criteria. As shown in FIG. 16, operation 4 illustrates the receipt of the user information by the data distributor 1620.

In still another embodiment, data distributor 1620 forwards the user information to the data source of the data. In still other embodiments, the data distributor 1620 only forwards an aggregate of the user information to the data source in the interest of protecting the privacy of the network of users.

At 1540, the present embodiment distributes an incentive associated with the delivery of data. As shown in FIG. 16, operation 5 illustrates the delivery of the incentive from an incentive delivery module 1627 of the data distributor 1620 to the database of accounts 1650. In FIG. 16, the data distributor 1620 controls accounts for both the user 1640 and the data distributor 1620. As such, in one embodiment of the present invention the distribution of an incentive is made directly to an account associated with the user 1640. In another embodiment, the distribution of an incentive is made directly to an account associated with the data distributor 1620. In still another embodiment, the incentives are distributed to accounts associated with the user 1640 and the data distributor 1620. The various types of incentives (e.g., cash, frequent flier miles, points for goods and services, etc.) have been previously discussed in conjunction with the discussion of FIG. 10.

In one embodiment, data distributor 1620 controls the distribution of incentives. That is, data distributor determines the allocation of the incentive for the delivery of data. For example, data distributor 1620 distributes funds according to a function $V(A,B)$, where $A<=V(A,B)<=B$. The variable A is the ask price of the user and B is the bid price. In one embodiment, the delivery of data occurs when the bid price exceeds the ask price set by the user. As such, the incentive V is set between the ask price and the bid price.

In embodiments in accordance with the present invention, the exact value of V is determined according to a number of formulas that split the valuation surplus between the user 1640 and the data distributor 1620. The choice of the formula is important because it creates different incentives.

In one embodiment, data distributor 1620 distributes the incentive to a combination of the user and the data distributor 1620. For example, the data distributor allocates a flat fee for every data delivered to itself, and assigns the rest to the user 1640, or allocate incentives according to a percentage of the amount paid for the delivery of data by the data source (e.g., the bid price), etc.

In addition, other rate schemes are implemented by data distributor 1620 in various other embodiments of the present invention. For example, newer users receive a higher portion of the incentives distributed. Older users receive a lower portion of the incentives distributed. In addition, data distributor 1620 receives no incentive, or the user 1640 receives no incentive.

Section 4

Method and System for Targeted Data Delivery from the Standpoint of the Data Source Layer Embodiments of the present invention in section 4 are described from the standpoint of the data source layer. For example, the data source layer is located above line A-A in FIG. 5. As such, description of the targeted delivery of data is described below from the standpoint of the data source layer.

Figure 17:
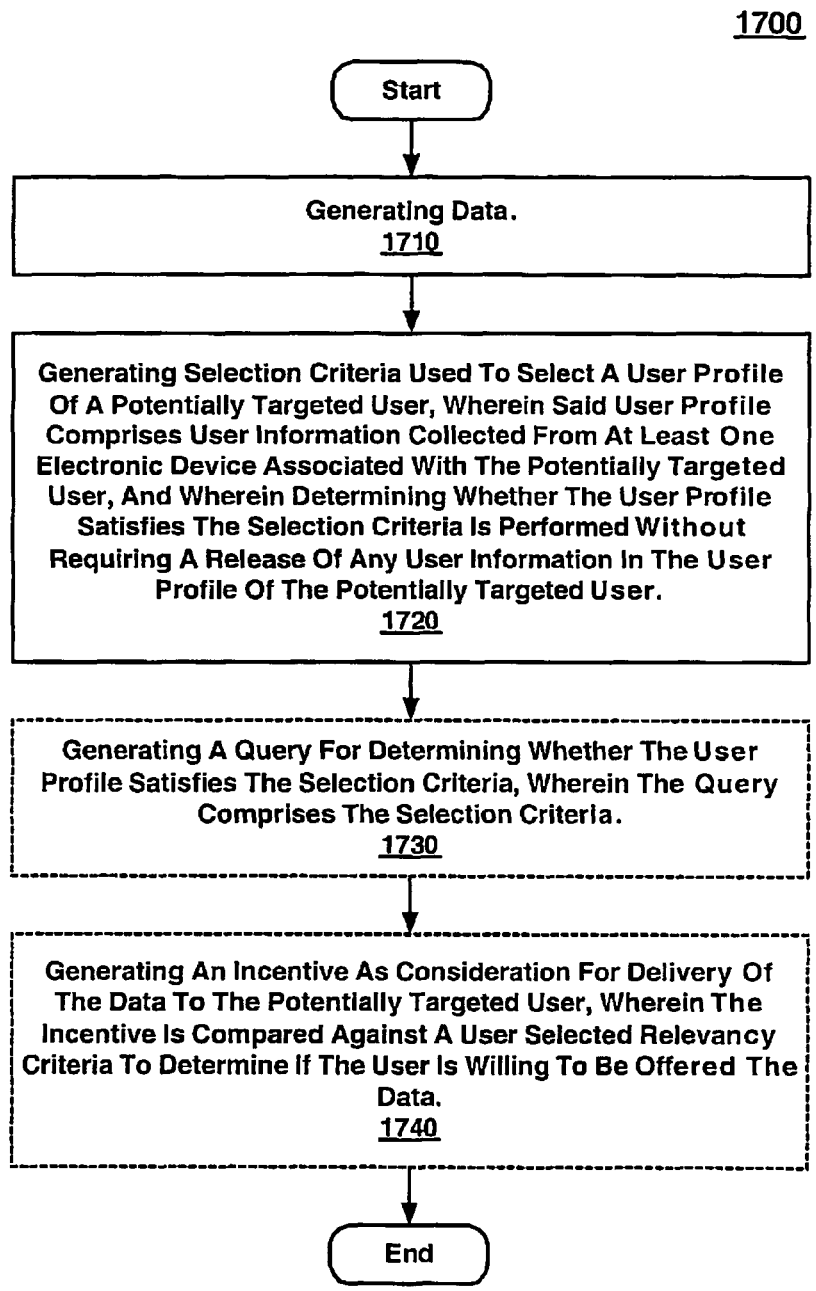
FIG. 17 is a flow diagram illustrating operations in a computer implemented method for targeted data delivery in which data and a query are generated for targeted data delivery, in accordance with one embodiment of the present invention.
Figure 18:
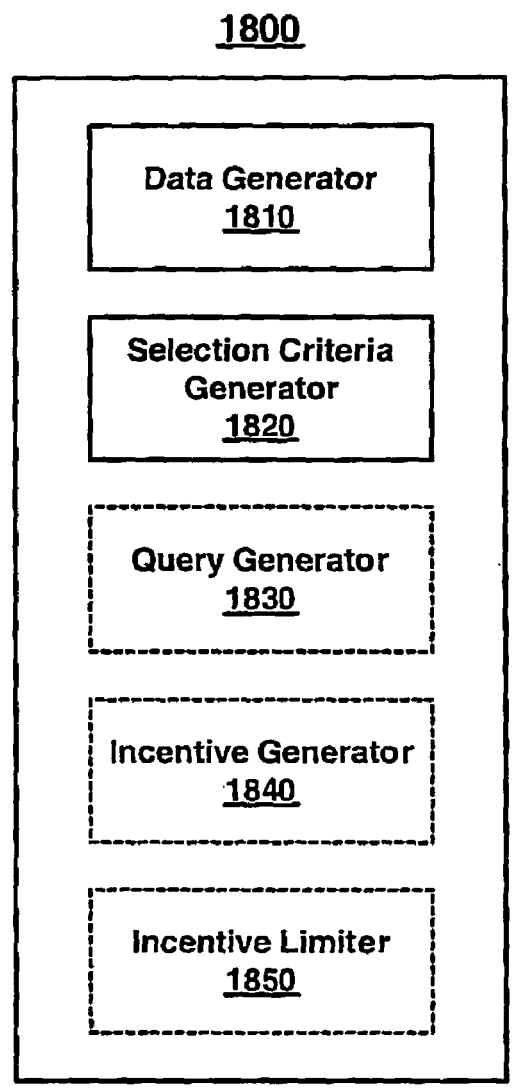
FIG. 18 is diagram illustrating a system capable of implementing the method of FIG. 17, in accordance with one embodiment of the present invention.

Embodiments described in conjunction with FIGS. 17 and 18 pertain to methods for targeted data delivery and a system for implementing the same. FIG. 17 is a flow diagram illustrating operations performed in a method for targeted data delivery in which data and a query are generated for targeted data delivery, in accordance with one embodiment. FIG. 18 is a diagram illustrating a system capable of implementing the method of FIG. 17, in accordance with one embodiment.

Although embodiments of FIGS. 17 and 18 are described from the standpoint of the data source layer of FIG. 5 for purposes of clarity and brevity, other embodiments of the same figures are implemented from the standpoint of other layers in FIG. 5, as will be described below.

As such, the operations of FIG. 17 are performed at the data source layer of FIG. 5 in accordance with one embodiment of the present invention. In addition, in FIG. 18, the components of system 1800 which perform the operations of FIG. 17 are located at the data source layer, in one embodiment. However, other embodiments of the present invention are well suited to locating some or all of the components of system 1800 at the data distribution layer of FIG. 5, or some other layer in between the data source and the data distribution layer, for example at a server of a broker who represents the data source and generates the data and the query.

Embodiments of the present invention are discussed within the context of a data source that provides data. For purposes of brevity and clarity, the targeted delivery of advertisements, as data, that are generated from advertisers, as a data source, is used for illustrative purposes throughout the application. However, although advertisements that are generated from advertisers are used for purposes of brevity and clarity in certain examples, the targeted delivery of data generated from data sources is not intended to be limited to the targeted delivery of advertisements from advertisers.

Turning now to FIG. 17, a flow diagram 1700 is described illustrating operations for the generation of data and a query for the targeted delivery of the data. In accordance with one embodiment, the flow diagram 1700 is taken from the standpoint of the data source layer in FIG. 5. However, other embodiments of the present invention are well suited to performing the method of FIG. 17 at other layers, or a combination of layers in FIG. 5. That is, generation of one or both of data and query occurs at the data source layer, the data distribution layer, or some layer in between, in accordance with embodiments of the present invention. The method of flow diagram 1700 is used to ensure the privacy of user information used for targeting the delivery of data.

At 1710, the present embodiment generates data. The data that is generated is any suitable form of data that is targeted to particular users. It is assumed that the targeted users have a perceived interest in the data.

As shown in FIG. 18, data generator 1810 generates the data. In the present embodiment, the components of system 1800 are located at the data source layer, however, in other embodiments the data generator 1810 is located at other layers of FIG. 5.

In one embodiment, for illustrative purposes only, the data that is generated by data generator 1810 is an advertisement. The advertisement is generated specifically to appeal to a particular targeted group of users. For example, the advertisement promotes a series of reading books that are tailored to the education of science to elementary school-aged girls. More specifically, the books are not textbooks. The targeted group of users is the elementary school-aged girls, or the parents of those elementary school-aged girls.

As mentioned above, embodiments in accordance with the present invention are not limited to use with data comprising advertisements. Listed below are examples of data other than advertisements which are well suited to being targeted to users in accordance with embodiments of the present invention. For illustrative purposes only, the data that is generated by data generator 1810 is an announcement, such as public service announcement, business announcement, internal company announcement, professional group announcement, etc. The announcement is targeted to a particular targeted group of users. For example, in the case of the public service announcement, the data generated by data generator 1810 is a warning for a flash flood and the data is targeted to a targeted group of news media. The warning is targeted to the group of news media for further dissemination to the general public. In the case of the business announcement, the data generated by data generator 1810 is breaking news affecting a price of a stock that is targeted to a group of users who subscribe to an investment publication. Those users use the data for their personal investment strategies. In the case of the internal company announcement, the data is general news particular to employees of a company. As such, this news is targeted only to those employees. In the case of the professional group announcement, the data generated by data generator 1810 is breaking news affecting the activities of that professional group. For example, the targeted group of users is medical doctors. As such, the data is breaking news regarding the efficacy of a particular drug that is widely disseminated for public use. In addition, other data are generated by data generator 1810 for the targeted delivery of that data.

At 1720, the present embodiment generates selection criteria which define characteristics exhibited by a targeted user. That is, the selection criteria defines characteristics met by a user profile of a potentially targeted user. As such, the selection criteria as generated by a selection criteria generator 1820 are used to determine if a potentially targeted user is a user to whom the data should be targeted for delivery. A full discussion on the selection criteria and its comparison to a user profile is provided in conjunction with a discussion of the operations of FIG. 7 of section 2. For instance, the selection criteria might contain characteristics (e.g., activity on a user's electronic device, search behavior, income, zip code, etc.) that help target or identify a user. In one embodiment, the selection criteria as generated by the selection criteria generator 1820 define a location of an electronic device associated with the potentially targeted user. In another embodiment, the selection criteria generated by the selection criteria generator 1820 include a history of web sites or URLs visited. In another embodiment, the selection criteria generated by the selection criteria generator include a history of web sites or URLs that are not visited. In still another embodiment, the selection criteria generated by the selection criteria generator 1820 include positive (e.g., did search URL X) as well as negative characteristics (e.g., did not search URL X).

As shown in FIG. 18, selection criteria generator 1820 generates the selection criteria. In the present embodiment, the components of system 1800 are located at the data source layer, however, in other embodiments the selection criteria generator 1820 is located at other layers of FIG. 5.

In addition, the user profile which is compared against the selection criteria includes user information collected from at least one electronic device associated with the potentially targeted user. A full discussion on the user information of the user profile is provided in conjunction with a discussion of the operations of FIG. 7 of section 2. For example, user information might contain the user's search behavior, name, zip code, etc.

Further, the selection criteria that are generated by selection criteria generator 1820 are used to determine whether the user profile satisfies the selection criteria with requiring a release of any user information in the user profile, in accordance with one embodiment of the present invention. In another embodiment, user information is not required to be released to a data source. That is, in determining whether the user profile satisfies the selection criteria, user information is not required to be released beyond the line A-A in FIG. 5. More specifically, in determining whether the user profile satisfies the selection criteria, user information is not required to be released to the data source (e.g., 511, 513, or 515) of FIG. 5. As such, user information associated with the potentially targeted user that is used to determine whether the user profile satisfies the selection criteria is not required to be released. In other words, the determination that the potentially targeted user is selected as one to whom the data is targeted is made without releasing any of the user information.

In one embodiment, the data includes open faced questions. That is, a question is posed to the targeted user. Based on the answer to the question, a follow on offer for the delivery of additional data is sent to the targeted user. For example, an open ended question to a targeted user might ask if the user owns a green car. If the user answers positively, another additional offer is posed to the user wherein the additional offer asks if the user would like to see additional advertisements.

A close relationship exists between the data as generated by data generator 1810 and selection criteria as generated by selection criteria generator 1820. In particular, the selection criteria is generated very narrowly and with great granularity to target data to a specific group of users. As such, various relationships exist in generating both the data and the selection criteria.

In one embodiment the data is generated by data generator 1810 before the selection criteria are generated by the selection criteria generator 1820. That is, the data is generated by the data generator 1810 with a general user in mind. Thereafter, selection criteria is created which pertain to a particular group of users which are targeted for the delivery of data generated by the data generator 1810. As such, in one case the selection criteria is more general, and targeted to a wide group of users. In another case, the selection criteria is more specific, and is targeted narrowly to appeal to a specific group of users. In both cases, the advertisement is identical.

As an example, the data is an advertisement promoting laundry detergent. In one case, the selection criteria are used to describe characteristics of a homemaker. Targeting of the homemaker through the method of flow diagram 1700 is a supplement to more traditional forms of advertising targeted to the homemaker, such as television advertisements during soap operas. In another case, the selection criteria describes characteristics of a college student. In such an embodiment, the targeting of the college student through the method of flow diagram 1700 is more effective than traditional forms of advertising, since college students may not be exposed to television or print advertising.

In another embodiment, the selection criteria are generated by selection criteria generator 1820 before the data is generated by data generator 1810. That is, the data is narrowly generated with a particular user group in mind. In the present embodiment, a specific group of users and their characteristics are first determined. Thereafter, the data is generated to be targeted to that particular group of users. In this scenario, data is narrowly tailored to appeal to the specific group of users that are targeted.

In the above scenario two different items of data are generated by data generator 1810 even though they both promote the same product, for example a high performance outdoor jacket. In one case, the selection criteria generated by the selection criteria generator 1820 narrowly describes a group of users who rock climb on a regular basis. Thereafter the data promoting the outdoor jacket is created to appeal to the rock climbers as a group of users and includes images of rock climbers wearing the jacket. This same selection criteria is used for other data (e.g., rock climbing equipment) that is targeted to that group of rock climbers.

In another case, the selection criteria generated by the selection criteria generator 1820 more generally describes a group of users who like to wear quality outdoor gear whether walking around town, hiking, etc. The data promoting the outdoor jacket is generated by the data generator to appeal to this more general group of users and includes images of hikers wearing the jacket. In both cases, the advertisement is different.

In still another embodiment, the data generated by data generator 1810 and the selection criteria generated by the selection criteria generator 1820 are created jointly. That is, the data and the selection criteria are created simultaneously.

Also, in another embodiment, the data is configured by data generator 1810 such that a design module is capable of customizing the data to a potentially targeted user based on user information in an associated user profile. That is, once the user profile of the potentially targeted user is determined to satisfy the section criteria, before delivery, the data is customized to the potentially targeted user using a customizer, not shown. For example, using the example of a user in the market for an inkjet printer, if the query included search terms that included a search URL of company A, and a non-search of company C, the data is customized to include the following terms: "Reasons that company C's inkjet printers are superior to company A's inkjet printers."

At 1730, the present embodiment optionally generates a query for determining whether the user profile satisfies the selection criteria. A full discussion describing the operations used for determining whether a user profile satisfies the selection criteria is provided in conjunction with a discussion of the operations of FIG. 7 of section 2. As shown in FIG. 18, a query generator 1830 generates the query.

Further, the selection criteria is included within the query that is used for the targeted delivery of data, as previously described in conjunction with FIG. 13 of section 3 in accordance with one embodiment of the present invention. The query is broadcast to a plurality of users by a broadcaster (e.g., one located at the broadcast layer of FIG. 5). More specifically, the query is broadcast to a controller associated with a potentially targeted user. The controller is able to access the user profile associated with the potentially targeted user and compare the user profile against the target profile defined by the selection criteria to determine if the user profile satisfies the selection criteria.

In one embodiment, the selection criteria are modified by selection criteria generator 1820 before the query is broadcasted to a plurality of users. That is, the selection criteria are adjusted by selection criteria generator 1820 to pinpoint delivery of the data to a particular group of users. For instance, data is generated that is targeted to a group of users. If it is found that the query used to target delivery of the data to the group of users had a low hit rate, then the selection criteria used in the query are adjusted before making another broadcast.

In another embodiment, the offer is only broadcast once by a broadcaster (not shown). That is, to discourage fraud, the availability of the data is not repeated so that fraudulent users cannot try afterwards to generate a user profile that satisfies the selection criteria included within the offer. As a result, if the offer is only broadcast once, then there is no incentive to try to simulate the characteristics identified by the selection criteria in hopes of generating consideration when that offer is repeated in the future.

In still another embodiment, to prevent fraud, the query generated by query generator 1830 is partially encrypted so that it is difficult to determine exactly what characteristics are included within the selection criteria of a query. In such an embodiment, the risk of broadcasting a query multiple times and having users guess and simulate the characteristics comprising the selection criteria is lower.

At 1740, the present embodiment generates an incentive by incentive generator 1840 as compensation or consideration for delivering the data to the potentially targeted user. In the present embodiment, the offer for the delivery of data includes the incentive. The incentive is compared against a user selected relevancy criteria to determine if the user is interested in being presented with the offer. A full discussion of the user selected relevancy criteria is provided in relation to FIG. 9 of section 2.

For instance, the incentive is an offer of a certain amount of money, called the bid price, submitted by a data source. The user selected relevancy criteria is the minimum amount of money the user requires to view an advertisement, called an ask price. In such an embodiment, the data is delivered when the incentive bid price meets or exceeds the ask price.

In addition, an incentive limiter 1850 is shown in system 1800. The incentive limiter 1850 sets a cap on the total amount of incentives that are distributed for a particular item of data. That is, the incentive limiter 1850 limits the incentives that are paid to a set of targeted users whose user profiles satisfy the selection criteria. As such, even if a user profile of a particular user satisfies the selection criteria, any incentive will not be paid to the user since the cap has been reached. In still another embodiment, a cap is placed on payments to individual users. This is also an important tool for limiting fraud. For instance, incentive payments are capped to all users associated with a specific US postal address.

In still another embodiment, the number of users whose user profiles satisfy the selection criteria of an offer and whose asking price for their attention is exceeded by the bid price associated with the offer is not known before the distribution of the offer. As such, the cost for distributing the offer is unknown. This is addressed using caps, random sampling, message primitives, and voting protocols. For example, in one embodiment, the costs for distributing incentives are capped by specifying to users that only the first n number of users whose user profiles satisfy the selection criteria and accept will receive an incentive. In another embodiment, through random sampling of the user population, the overall cost of an advertisement is estimated to (almost) arbitrary accuracy. In still another embodiment, anonymous message primitives are allowed in the system (e.g., through a broadcast layer that uses a peer-to-peer architecture), and the number of user profiles that satisfy the selection criteria is determined transparently to users, still without violating a user's privacy. In another embodiment, interne voting protocols are used to determine the number of users whose user profiles satisfy the selection criteria.

In addition, the present embodiment is configured such that user information is released upon delivery of data. That is, once the present embodiment determines that a user profile of an associated user satisfies the selection criteria of a query, and the data has been delivered for viewing by the user, user information is released as compensation or consideration of receipt of the data by a receiver (e.g., a receiver at the data distributor 520 of FIG. 5).

In another embodiment, information related to a set of targeted users is received by a receiver (e.g., a receiver at a data source of FIG. 5). The information is an aggregate of information compiled from the user information received from individual users upon receipt of data. In such an embodiment, the privacy of each individual user is still ensured since information is not identifiable to a particular user. Additionally, in embodiments in accordance with the present invention, user information is only released with explicit authorization by the user.

FIGS. 19A-F are diagrams illustrating exemplary user interfaces used to generate an offer for the targeted delivery of data, in accordance with one embodiment. The user interfaces of FIGS. 19A-F are implemented within the data source layer of FIG. 5, or by a third party between the data source layer and the data distributor layer of FIG. 5. In addition, the user interfaces of FIGS. 19A-F are implemented in conjunction with the data distributor layer of FIG. 5. That is, a server associated with a data distributor of the data distributor layer of FIG. 5 manages the user interfaces of FIGS. 19A-F that are used to generate an offer for the targeted delivery of data. For purposes of illustration only, the offer that is generated in FIGS. 19A-F is related to a spam killer application advertisement that is being targeted to a particular group of users. In one embodiment, the broadcasting of the offer is implemented through client polling. In addition, values and terms used as inputs are for illustration only and other embodiments of the present invention supports various other values and terms.

Figure 19A:
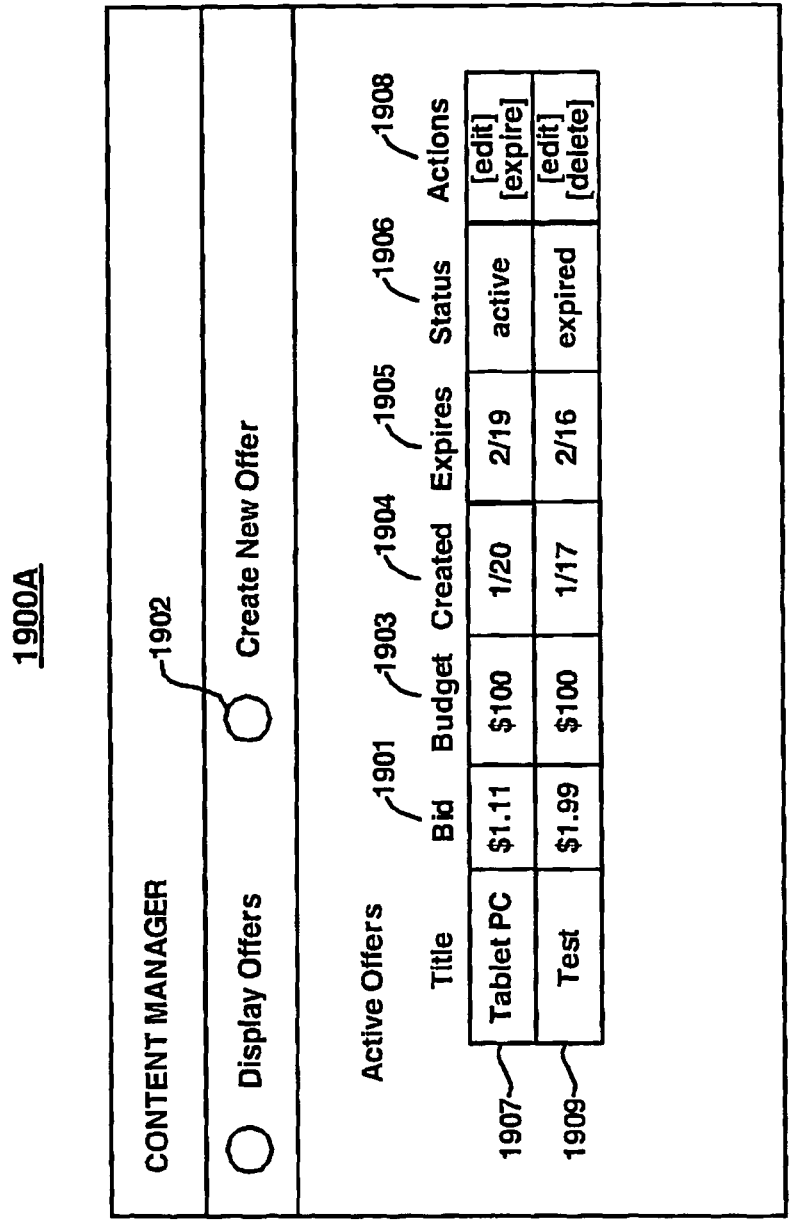

Turning now to FIG. 19A, a window 1900A of a user interface for generating an offer is shown, in accordance with one embodiment. The window 1900A is a content manager for a system that is capable of targeted delivery of data. The window 1900A is relevant to a data source that is simultaneously presenting multiple offers for the delivery of different items of data. For example, as shown in FIG. 19A, two active offers are shown. A first active offer presented by the data source is related to the heading of "Table PC." A second active offer presented by the data source is a TEST offer in row 1909.

Information in row 1907 is provided for the heading of "Tablet PC." For example, the bid price is set to $1.11 in column 1901 and represents the amount of cash as an incentive the data source is willing to pay for the targeted delivery of data. In addition, a budget of $100.00 total is included in column 1903 and represents the maximum incentives the supplier is willing to pay for the distribution of the data. That is, no more than $100.00 is to be distributed as incentive for the delivery of data. In the next two columns, a creation date is included in column 1904 and an expiration date is included in column 1905. Also, in column 1906, the status of the offer with the heading of "Tablet PC" is included. As shown in FIG. 19A, the offer for the data with the heading of "Tablet PC" is in an active state. In column 1908, further options are available. For example, editing of the offer is possible, changing the expiration date is possible, or deleting the offer is possible.

A button 1902, when invoked, presents exemplary interfaces used to generate another offer. That is, button 1902 enables entry to the interfaces of FIGS. 19B-E in order to generate a new offer.

FIG. 19B is a window of an exemplary user interface 1900B that is used to create an offer for the promotion of the spam killer application, in accordance with one embodiment of the present invention. In general, FIGS. 19B-E are used to generate a new offer.

At input block 1910, the title of the advertisement is created. That is, the text "Spam Killer" referring to the application being promoted is included within block 1910. As such, the offer is being generated to promote the "Spam Killer" application.

At input block 1912, additional information is included that is related to the "Spam Killer" application. This additional information is presented to a potentially targeted user for helping that user decide if the "Spam Killer" application is worthwhile to view.

At input block 1915, a method of delivering data is presented. For example in window 1900B, a URL is inputted that contains the data, in this case the advertisement that is promoting the "Spam Killer" application. As such, the offer being generated includes the link to the URL contained in block 1915. If the user profile satisfies the selection criteria, as later defined, then the URL at block 1915 is invoked to deliver the data contained within the URL.

Once the blocks in window 1900B have been completed, selection of the continue option brings up window 1900C.

FIG. 19C is a window of an exemplary user interface 1900C that is used to set selection criteria, in accordance with one embodiment. More specifically, the user interface 1900C is used to generate selection criteria used to identify targeted users. As such, those user profiles that satisfy the selection criteria are the targeted users to whom the delivery of data is targeted.

Block 1937 provides a summary of important information associated with the offer being generated by the user interfaces of FIGS. 19B-E. For example, the title of the application is included, along with a brief description of the application. The location of the URL where the data is located (e.g., the advertisement) is also included.

The first matching criteria includes the exact terms used in recent searches. Block 1930, a drop-down field, describes the type of the first matching criteria as "Exact Search String." Input block 1931 includes the terms or values of the "Exact Search String." In block 1931, the term "spam" is used to define characteristics of targeted users. That is, the selection criteria is isolating users who have searched the internet using the "spam" search term.

The second matching criteria includes a visited URL. Block 1933 describes the type of the second matching criteria as "URL (visited)." In block 1934, the term "http://howtokillallspam" is used to define the visited URL for the second matching criteria.

Block 1935 is presented to illustrate that multiple criteria is used to define characteristics of the targeted users. For instance, another type of "URL (visited)" is used as a third matching criteria. In such an embodiment, the value is blank until the URL is entered.

Once the input blocks in window 1900C have been completed, selection of the continue option brings up window 1900D.

FIG. 19D is a window of an exemplary user interface 1900D that is used to confirm the matching criteria that is set in window 1900C, in accordance with one embodiment of the present invention. More specifically, the user interface 1900D is used to confirm the selection criteria used to identify targeted users.

Block 1947 provides a summary of important information associated with the offer being generated by the user interfaces of FIGS. 19B-E. For example, the title of the application is included, along with a brief description of the application. The location of the URL where the data (e.g., the advertisement) is accessed is also included, as well as the data source that generates the data associated with the offer. In this case, the "Test Advertiser" is the provider.

In window 1900D, two selection criteria have been generated. At row 1941, the selection criteria for the "spam" search term is presented in summary. At row 1942, the selection criteria for the URL "http://howtokillallspam" is presented in summary. In column 1945, an action is available to delete either of these selection criteria. In addition, selection of option 1949 allows the user to return to window 1900C and add another selection criteria, for example.

Once the input blocks in window 1900D have been completed, selection of the continue option brings up window 1900E.

FIG. 19E is a window of an exemplary user interface 1900E that is used to set the budget for the offer created in FIGS. 19B-E, in accordance with one embodiment of the present invention.

Block 1957 provides a summary of important information associated with the offer being generated by the user interfaces of FIGS. 19B-E. The summary in block 1957 is identical to the summary in block 1947.

Input block 1951 sets the total budget for distributing the offer. In block 1951, five thousand dollars is set as the total budget. As such, up to five thousand dollars will be distributed as incentives for the delivery of the advertisement promoting the "Spam Killer" application, for example in one embodiment.

Input block 1953 sets the individual cap for incentives that are paid for each delivery of data to a targeted user whose user profile satisfies the selection criteria of the offer. In this case, a sum of $2.45 is provided as incentive to be distributed. The incentive is distributed to the user who receives the advertisement, the data distributor broadcasting the offer, or a combination of the two, in embodiments of the present invention.

Input block 1955 sets the block of time that the offer is valid. In this case, a total of 30 days is provided as a window for an active offer.

Once the blocks in window 1900E have been completed, selection of the continue option brings up window 1900F. In FIG. 19F, a window 1900F of a user interface for generating an offer is shown, in accordance with one embodiment of the present invention. The window 1900F is a content manager to a system that is capable of targeted delivery of data and is similar to the window 1900A of FIG. 19A, except for the additional row of information 1960 indicating the offer generated through the use of windows 19B-19E.

The window 1900F is relevant to a data source that is simultaneously presenting multiple offers for the delivery of different items of data. For example, as shown in FIG. 19F, three active offers are shown. A first active offer presented by the data source is related to the heading of "Table PC." A second active offer presented by the data source is a TEST query in row 1909. In addition, a third active offer presented by the data source is related to the newly generated offer with the heading of "Spam Killer."

In accordance with another embodiment of the present invention, a conversion tracking capability is provided for a particular offer. For purposes of the present Application, the term "conversion" is intended to refer to a specific action taken by a user in response to an offer. Typically, the action has some benefit to the originator of the offer. As such, conversion includes hard actions, such as purchasing a product, or soft actions, such as clicking through a web site, or signing up for an electronic newsletter delivered over the internet, etc. In addition, in another embodiment, an incentive (e.g., cash, frequent flier miles, coupons, etc) can be paid to the user and/or the network owner delivering the offer when the user performs a conversion. For example, a user is said to convert when they purchase the good being offered by that advertisement. That is, for a particular offer, the present embodiment is able to track a future event, such as the conversion of a product being promoted in the offer. For example, an offer associated with promotional data advertising a tennis racket is tracked. That is, the present embodiment is able to track the total number of tennis rackets being promoted that were sold to the targeted users whose user profiles satisfy the selection criteria of the offer.

In still another embodiment of the present invention, the cookies related to delivery of the data are automatically blocked. Cookies are used to identify users who have visited a URL, for example. In this manner, further protection of the identity of the targeted user is preserved.

In accordance with another embodiment of the present invention, multiple items of data are generated for a single query. For example, one query is associated with two or more advertisements for the same product. The present embodiment is able to track the version of the data that is presented to a particular user and ensure that only one item of data is presented to that user. For instance, one version of an advertisement of a single product is only presented to the targeted user.

In still another embodiment, an auction is provided for a particular type of data that is targeted to one targeted user. For example, one item of data (e.g., an advertisement) is promoting vehicle type V and is generated by dealer A. At the same time, a second item of data promoting the same vehicle type V is generated by dealer B. The first and second items are not identical. That is, the items of data are tailored to each individual dealer, A and B. One item of data is tailored to dealer A for the promotion of vehicle type V, and the other item of data is tailored to dealer B for the promotion of vehicle type V. In addition, the selection criteria is configured such that the first and second items of data are targeting a single user.

In such an embodiment, the present embodiment employs an auction between dealer A and B in order to determine which dealer can deliver their item of data. In this way, additional revenue is generated, and the user is not bombarded with two advertisements promoting the same product.

Section 5

Business Method for Generating Revenue by Enabling Targeted Data Delivery

Embodiments of the present invention are discussed within the context of electronic devices that are associated with a user. One electronic device, for example is the PC and is used for illustrative purposes. Although the PC is used for purposes of brevity and clarity in many of the following examples, other embodiments of the present invention are well suited to creating networks of users for the targeted delivery of data using electronic devices other than PCs.

In one embodiment, manufacturers of PCs can leverage their position to create a network of users that are controlled by the PC manufacturer as the network owner. The PC as a commodity is ubiquitous throughout the world. As such, the PC is used to efficiently connect data sources (e.g., advertisers) and users through the targeted delivery of data (e.g., advertisements). For example user information collected from PCs is used to efficiently target delivery of data. In one implementation, a data source targets data to users over a communication network based on the user information. As an added benefit, the targeted delivery of data is accomplished without requiring a release of any of the user information absent authorization and consent by the user. As a result, data sources utilize networks, which couple vast numbers of PCs, to electronically distribute their data to a large audience of PC users.

As a result, the use of the PC for the targeted delivery of data provides economic advantages to manufacturers of the PC. In this way, the use of the PC brings an economic benefit both to the user and manufacturers of the PC. This economic shift to the manufacturer of the PC, for example, would be in direct contrast to another highly commoditized technology, the television (TV) which provides virtually no marginal economic benefit to manufactures of the TV with the use of their TV product. For example, TVs are ubiquitous and inexpensive. As such, manufacturers of TVs marketed to the general public have low profit margins. However, even though the television occupies a crucial position in the chain of delivering content to users, heretofore the use of the TV provides little or no economic benefit to the TV manufacturers. That is, the conventional use of TVs and PCs directs profits to the suppliers of content and the suppliers of software that shape the delivery of content, and not the manufactures of the TVs or PCs.

On the other hand, embodiments of the present invention provide for a network architecture that allows PC manufacturers as data distributors to leverage their position as a supplier and center point of tens of millions of PCs in order to obtain an economic benefit from the use of PCs. This is possible by turning the base of computer users into a proprietary network of users to which data (e.g., advertising) is delivered. The network architecture of embodiments of the present invention is beneficial in that it discourages spam. In addition, the network architecture provides for highly relevant targeted advertising by exploiting the PC's position as the last link in the delivery of content. Also, the network architecture protects the privacy of all user data.

Figure 20:
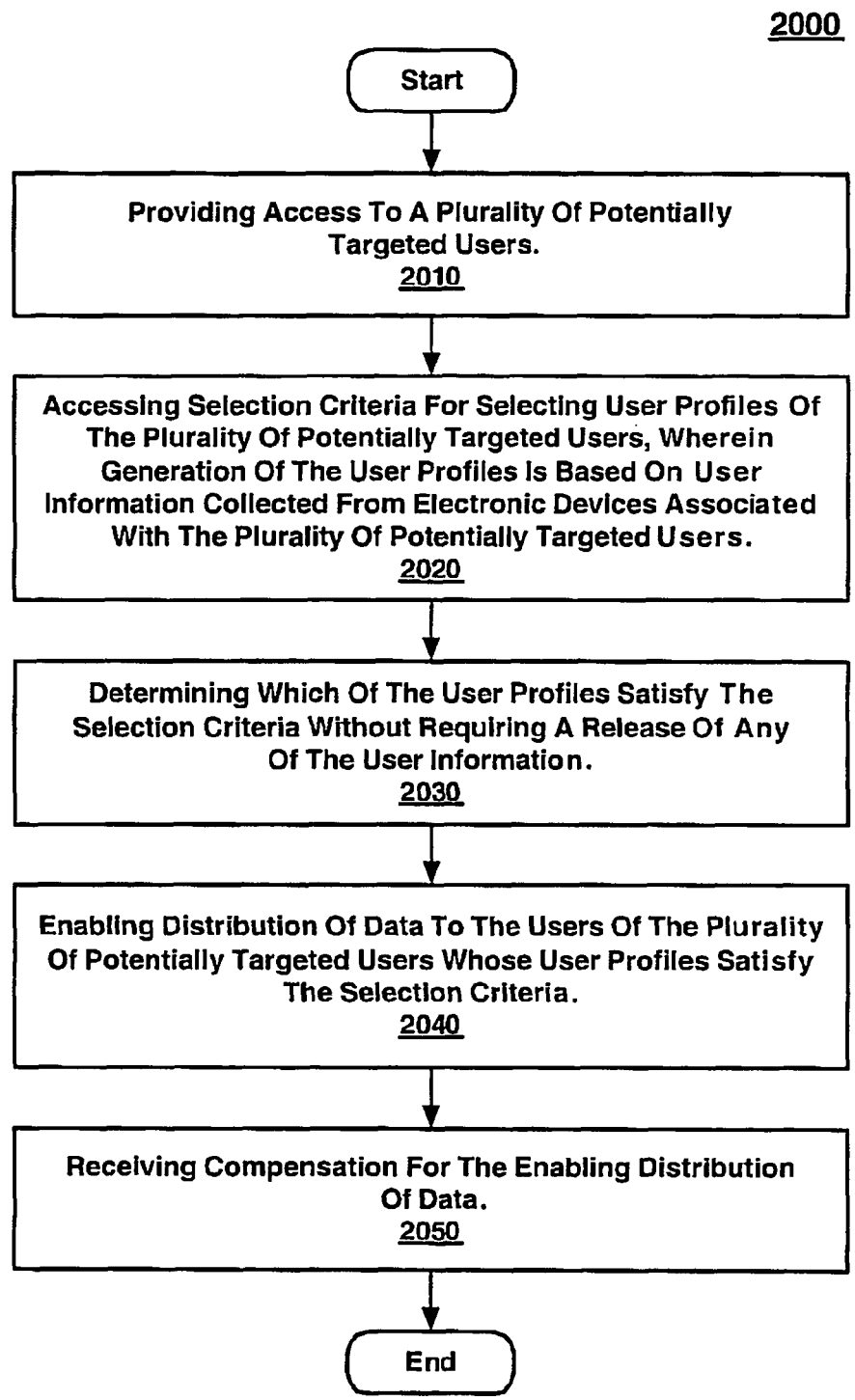
FIG. 20 is a flow diagram illustrating operations in a business method for revenue generation by enabling targeted data delivery, in accordance with one embodiment of the present invention.

FIG. 20 is a flow diagram 2000 illustrating operations in a business method for revenue generation by enabling data delivery to selected targets, in accordance with one embodiment of the present invention. The flow diagram 2000 is capable of providing an economic benefit to network owners that control access to a network of users.

At 2010, the present embodiment provides access to a plurality of potentially targeted users. Access to the plurality of potentially targeted users is achieved through a proprietary network, such as a virtual network. For example, in one embodiment, access is provided through the data distribution layer of FIG. 5 as the network owner.

As such, the targeted delivery of data provides benefits for network owners (e.g., data distributors of FIG. 5) who control the proprietary network. In such an embodiment, the network of potentially targeted users is owned by the network owner, and as such, access to those users is through the network owner. As such, data is targeted to those users through the network owner. Since the network owner is a control point, it realizes an economic benefit from providing the access to those users in its network.

At 2020, the present embodiment accesses selection criteria used for selecting user profiles of the plurality of potentially targeted users. The selection criteria is used to identify users to whom delivery of data is desired. As such, the selection criteria includes characteristics of users to whom the data is targeted. For example, the selection criteria defines in one embodiment behavioral activity of the targeted users on associated electronic devices. In addition, in another embodiment, the selection criteria defines a history of web sites visited, or not visited, or a combination of both.

In the present embodiment, the user profiles are based on user information collected from electronic devices associated with the plurality of potentially targeted users. For example, user information in one embodiment includes behavioral characteristics of the plurality of potentially targeted users. A full description of the collection of user information from associated electronic devices is provided in FIG. 7 of section 2.

At 2030, the present embodiment determines which of the user profiles associated with the plurality of potentially targeted users satisfy the selection criteria. As such, the present embodiment is able to provide access to the user profiles of the plurality of potentially targeted users in order to determine which of the user profiles satisfy the selection criteria.

More specifically, the selection criteria are included within a query that is performed to determine which user profiles of a plurality of potentially targeted users satisfy the selection criteria. That is, the query is forwarded to the plurality of potentially targeted users. The query is performed against the user profiles of the plurality of potentially targeted users to identify which of the potentially targeted users is a targeted user. A full discussion of the selection criteria and their use in determining whether a user profile satisfies the selection criteria is provided in FIG. 13A of section 3.

Moreover, the determination of which user profiles in the plurality of potentially targeted users satisfy the selection criteria is performed without requiring a release of user information in the user profiles. As such, the privacy of the plurality of potentially targeted users is maintained. That is, the network including the plurality of potentially targeted users targets the delivery of data by determining if a user profile satisfies the selection criteria without releasing any of the user information used to make that determination.

At 2040, the present embodiment enables distribution of data to the users of the plurality of potentially targeted users whose user profiles satisfy the selection criteria. The data is generated by a data source with the knowledge that the data is delivered to targeted users who are defined by definable user characteristics and whose user profiles satisfy the selection criteria. As such, the data is tailored to appeal directly to those targeted users.

At 2050, the present embodiment receives compensation or consideration for enabling the distribution of data. That is, the present embodiment is able to receive compensation or consideration for enabling the targeted delivery of data to a plurality of potentially targeted users whose user profiles satisfy the selection criteria. That is, by providing access to a plurality of potentially targeted users through a proprietary network, an economic platform is created that generates income for the targeted delivery of data to users whose user profiles satisfy the selection criteria.

In one embodiment, the source of the data provides the compensation to the network owner who controls access to the plurality of potentially targeted users. For example, the data source is an advertiser who is interested in the targeted delivery of advertisements, in one embodiment.

In another embodiment, the network owner who controls access to the plurality of potentially targeted users is a search engine. In such an embodiment, the search engine provides the network to perform the targeted delivery of data and, as such receives compensation for the targeted delivery of data to user profiles that satisfy the selection criteria.

In still another embodiment, the network owner who controls access to the plurality of potentially targeted users is an interne service provider (ISP). In such an embodiment, the ISP provides the network to perform the targeted delivery of data and, as such receives compensation for the targeted delivery of data to user profiles that satisfy the selection criteria.

In still another embodiment, the user to whom the data is delivered receives compensation. For example, an incentive as compensation or consideration is paid to the user for the user's attention in receiving and viewing the data. In that case, the offer for the delivery of data includes the incentive that is generated as consideration for the delivery of the data to a targeted user. The incentive is used to determine if a targeted user deems it worthwhile to receive the data, and as consideration for the delivery of the data. A full discussion of the satisfaction of the user selected relevancy criteria is presented in relation to FIG. 9 of section 2.

As a result, embodiments in accordance with the present invention enable the ubiquitous PC to be converted from a commodity with low profit margins to a revenue generating device. Other embodiments in accordance with the present invention are well suited to converting other low margin electronic devices to a high revenue generating appliance. For example, other low margin electronic devices include, but are not limited to, videocassette recorders (VCRs), personal digital assistants, cell phones, etc.

More specifically, embodiments in accordance with the present invention provide for after market revenue generation of these PCs and other low margin electronic devices. That is, instead of ending the economic relationship between a user who has purchased of one of these low margin electronic devices that are commodities, embodiments in accordance with the present invention establish an on-going economic relationship with the user. The relationship can extend for the lifetime of the user.

Embodiments in accordance with the present invention encourage participation of users by providing economic incentives and awards to the user. Specifically, by a user participating in a data delivery network, the present embodiments provides incentives to the user for viewing data that is relevant to the user's interests. Other embodiments reduce the amount of user's attention given to unwanted data. As such, embodiments of the present invention provide an economic and time benefit to the user.

In addition, the owner of the data delivery network (e.g., the data distributor) receives payment for delivering data to the user, in accordance with embodiments of the present invention. That is, by providing the network that allows access to the user and other users, embodiments of the present invention provide for revenue generation to the data distributor for the targeted delivery of data. The larger the network of users, the larger the revenue stream flowing to the data distributor. Also, the revenue flow per user can be timeless. That is, a user may participate within the data delivery network for the lifetime of the user if the incentives make it worthwhile to stay for the extended period.

Moreover, embodiments in accordance with the present invention are capable of providing the targeted delivery of data while maintaining the privacy of the users. As such, embodiments of the present invention are able to develop good will amongst the network of users that participate in the targeted delivery of data. This in turn develops a core of loyal customer users who are comfortable in receiving the targeted delivery of data, while at the same time receiving an economic incentive.

Hence, embodiments in accordance with the present invention provide for the extension and creation of a relationship with a user through a commoditized electronic device. As such, embodiments in accordance with the present invention are able to continue the relationship beyond the sale of the electronic device, and further are capable of generating revenue both for the user and the owner of the network (e.g., data distributor) that provides the targeted delivery of data. This revenue stream conceivably can last the lifetime of the user.

Section 6

Figure 21:
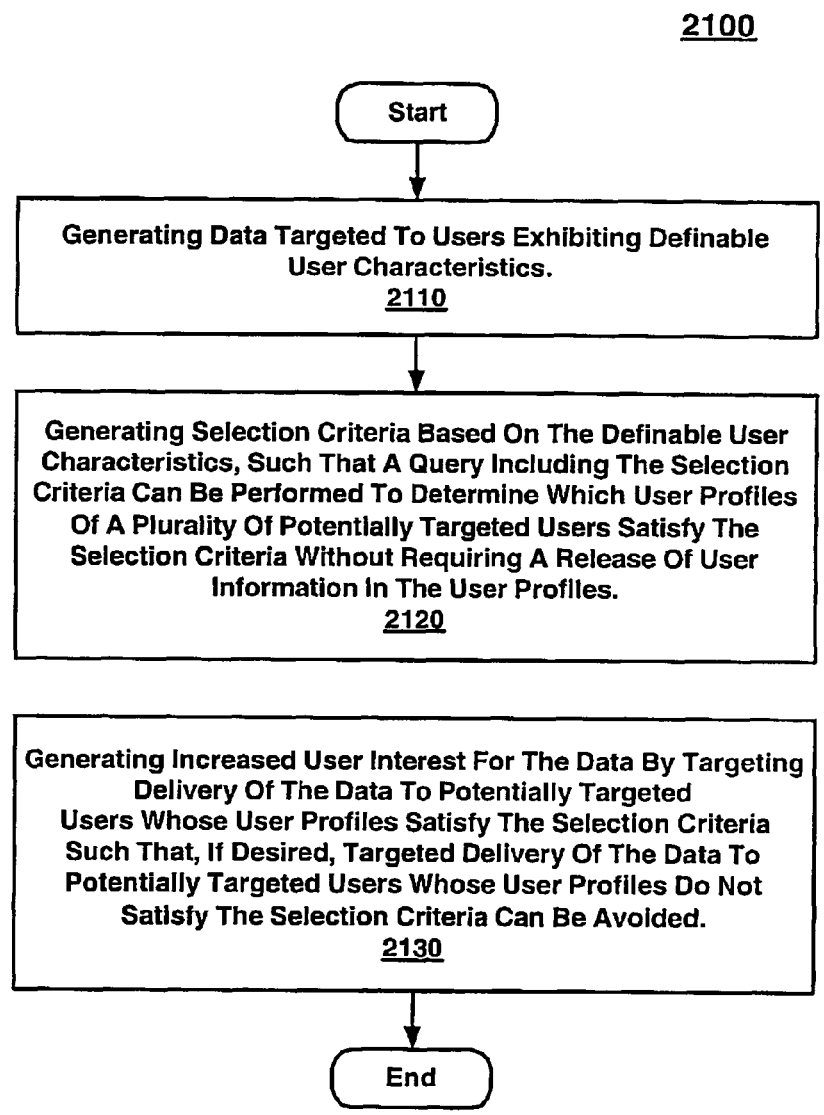
FIG. 21 is a flow diagram 2100 illustrating operations in a business method for generating increased user interest in a particular item of data by enabling delivery of the data to selected targets, in accordance with one embodiment of the present invention.
Figure 22:
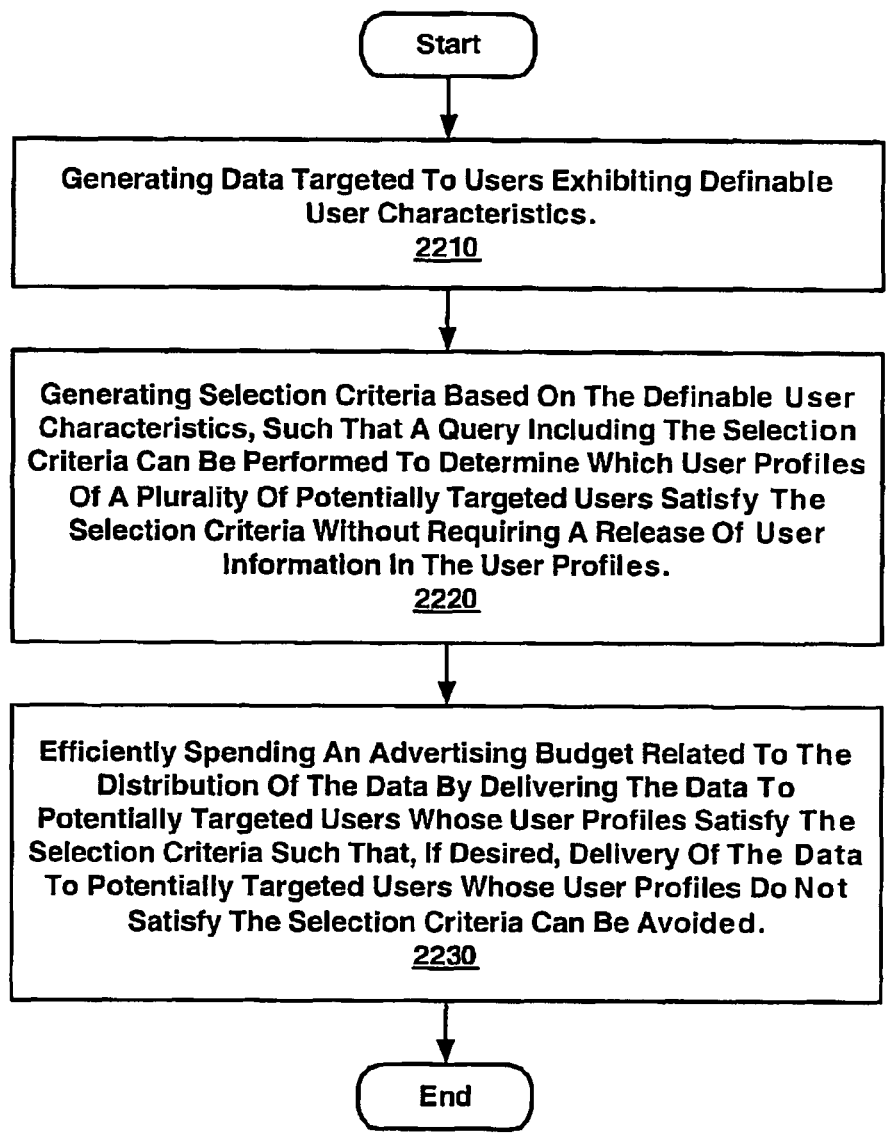
FIG. 22 is a flow diagram 2200 illustrating operations in a business method for efficiently spending an advertising budget by enabling delivery of the promotion data (e.g., advertisements) to selected targets, in accordance with one embodiment of the present invention.

Business Method for Generating Increased User Interest and Efficient Allocation of Advertising Resources by Enabling Targeted Data Delivery FIGS. 21 and 22 utilize the methods and systems as presented in the FIGS. 1-19 to provide increased user interest in the delivery of data and the efficient use of advertising money when advertising. Specifically, embodiments of the present invention of FIGS. 21 and 22 are capable of being implemented within the network structures of FIGS. 5 and 12 for the targeted delivery of data. That is, users are identified and targeted for the delivery of data without requiring a release of any user information.

FIG. 21 is a flow diagram 2100 illustrating operations in a business method for generating increased user interest in a particular item of data by enabling delivery of the data to selected targets, in accordance with one embodiment of the present invention. Embodiments of flow diagram 2100 are able to perform targeted delivery of data to generate increased interest in data while protecting the privacy of targeted users. Because embodiments of the present invention are able to deliver data to targeted users within a proprietary network, a revenue stream is generated related to the targeted delivery of data.

At 2110, the present embodiment generates data targeted to users exhibiting definable user characteristics. That is, data is generated with the knowledge that the data will be delivered to targeted users who are defined by the definable user characteristics. As such, the data is tailored to appeal directly to those targeted users. Since the data will not be received by users other than the targeted users, concerns relating to the creation of the data relevant to those users other than the targeted users do not need to be addressed. Generation of data is fully described in relation to FIG. 17 in section 4.

At 2120, the present embodiment generates selection criteria based on the definable user characteristics. This selection criteria is used to identify users to whom delivery of data is desired. The selection criteria includes characteristics of users to whom the data is targeted. For example, the selection criteria defines, in one embodiment, required behavioral activity of the potentially targeted users on associated electronic devices. In addition, in another embodiment, the selection criteria defines a list of web sites that must have been visited, or not visited, or a combination of both.

More specifically, the selection criteria is included within a query that is generated. The query is used to target delivery of the data. The query is forwarded to a plurality of potentially targeted users. The selection criteria is used to determine potentially targeted users whose user profiles satisfy the selection criteria. That is, performance of the query determines which user profiles of a plurality of potentially targeted users satisfy the selection criteria. A full discussion of the query and its use in determining whether a user profile satisfies the selection criteria is provided in FIG. 13A of section 3.

In one embodiment, the data is associated with an incentive that is generated as consideration for the delivery of the data to a targeted user. In one embodiment of the present invention, the incentive is included within the offer for the delivery of the data. The incentive determines if a targeted user deems it worthwhile to receive the data, and as consideration for the delivery of the data.

As such, the incentive is compared against a user selected relevancy criteria of said targeted user. For example, the incentive includes an incentive bid price, such that the targeted user's relevancy criteria is satisfied by the incentive when the incentive bid price meets or exceeds the user ask price defined by the user selected relevancy criteria. The incentive is used to determine which of those users whose user profiles satisfies the selection criteria are willing to consider the associated offer of data delivery. A full discussion of the satisfaction of the user selected relevancy criteria is presented in relation to FIG. 9 in section 2.

In addition, in return for the delivery of the data, the network owner receives user information that was used to determine if an associated user profile satisfies the selection criteria. This information is used to further refine the selection criteria for targeted users in the targeted delivery of data, in one embodiment.

Moreover, the determination of which user profiles in the plurality of potentially targeted users satisfy the selection criteria is performed without requiring a release of user information in the user profiles. As such, the privacy of the plurality of potentially targeted users is maintained. That is, a network including the plurality of potentially targeted users targets the delivery of data by determining if a user profile satisfies the selection criteria without releasing any of the user information used to make that determination without authorization or consent.

At 2130, the present embodiment generates increased user interest for the data by distributing the data only to targeted users. That is, the data is efficiently delivered only to potentially targeted users whose user profiles satisfy the selection criteria. In that way, if desired, the targeted delivery of data to potentially targeted users whose user profiles do not satisfy the selection criteria is avoided. As such, the data is distributed only to users who are perceived to be highly interested in the data, as opposed to distributing data to a wide audience through conventional means that includes users who are highly interested, mildly interested, and not interested in the data. As a result, because the delivery of the data is specifically targeted to users who have high interest in the data and the users know this, a higher degree of interest is generated in the data than would occur if the data were broadly distributed to a wide audience.

In one embodiment, for efficient distribution, the query is broadcasted to the plurality of potentially targeted users. More specifically, the query is broadcasted to a controller associated with a potentially targeted user. The controller is capable of comparing a user profile of an associated potentially targeted user against selection criteria to determine if the user profile satisfies the selection criteria. A full discussion of the broadcasting of the query is provided in relation to FIGS. 13A and 13B of section 3.

In one embodiment, to more efficiently target the data, the selection criteria are adjusted based on changes to the definable user characteristics exhibited. That is, if the definable user characteristics of the desired users change throughout the life of an offer, the selection criteria are adjusted to reflect those changes. In that case, new and refined selection criteria are generated that are used to determine which of the potentially targeted users have user profiles that satisfy the selection criteria.

FIG. 22 is a flow diagram 2200 illustrating operations in a business method for efficiently allocating advertising resources by enabling delivery of the data (e.g., advertisements) to selected targets, in accordance with one embodiment of the present invention.

Embodiments of the present invention are described within the context of the targeted delivery of data, and more specifically to the targeted delivery of an advertisement. Because embodiments of the present invention are able to deliver the advertisement to only targeted users, the costs per conversion are minimized. Embodiments of FIG. 22 of the present invention are discussed within the context of delivering advertisements, but other embodiments are well suited to the targeted delivery of data that are not advertisements.

At 2210, the present embodiment generates data (e.g., advertisements) targeted to users exhibiting definable user characteristics. The operation executed in 2210 is similar to the operations of 2110 of FIG. 21. A full discussion devoted to the generation of data is provided with respect to 2110 of FIG. 21.

At 2220, the present embodiment generates selection criteria based on the definable user characteristics, such that a query comprising the selection criteria is performed to determine which user profiles of a plurality of potentially targeted users satisfy the selection criteria without requiring a release of user information in the user profiles. The selection criteria includes characteristics of users to whom the data is targeted and is included within the query. The operation executed in 2220 is similar to the operations of 2120 of FIG. 21. A full discussion devoted to the generation of selection criteria is provided with respect to 2120 of FIG. 21.

At 2230, the present embodiment efficiently spends an advertising budget related to the distribution of the advertisement by delivering the advertisement to potentially targeted users whose user profiles satisfy the selection criteria. That is, advertising money related to the distribution of the advertisement, as data, is efficiently spent by using a system that is capable of highly satisfactory conversion rates. Efficient spending of the advertising budget is achieved, even though the cost per user for delivery of the data may be higher, because the advertisement is delivered only to interested users, which are more likely to perform an action that converts the advertisement. For example, the advertisement is delivered directly users whose user profiles satisfy the selection criteria. Moreover, advertising expenditures are focused on interested users by only delivering the advertisement to potentially targeted users whose user profiles satisfy said selection criteria.

As such, since the advertisement is only delivered to interested users, advertising expenditures need not be unnecessarily expended for the delivery of the advertisement to users who are not interested in the advertisement. That is, the present embodiment is capable, if desired, of avoiding delivery of the advertisement to potentially targeted users whose user profiles do not satisfy the selection criteria.

In addition, the present embodiment generates increased user interest for the data by distributing the data only to targeted users. That is, the data is delivered only to potentially targeted users whose user profiles satisfy the selection criteria. As such, the data is distributed only to users who are perceived to be highly interested in the data. As a result, because the delivery of the data is specifically targeted to users who have high interest in the data and they know this, a higher degree of interest is generated in the data than would occur if the data were broadly distributed to a wide audience. It is easier and cheaper to attract the attention of a user to an advertisement the user knows is likely to be interesting than to one the user expects to be uninteresting.

In another embodiment, increased interest in the data is generated by marking the data that is delivered to users whose user profiles satisfy the selection criteria. That is, the data is marked in such a way to indicate that the data has been delivered to a user because the associated user profile satisfies the selection criteria. In this manner, the user can immediately distinguish data of greater interest to the user because of the marking that indicates that the data has been delivered because an associated user profile has satisfied the selection criteria.

Further, the targeted delivery of data provides economic benefits for network owners (e.g., data distributors of FIG. 5) who control a proprietary network, such as a virtual network in embodiments of the present invention. The network of users is owned by the network owner, and as such, access to those users is through the network owner. As such, data is targeted to those users through the network owner. Since the network owner is a control point, it realizes an economic benefit from providing the access to those users in its network.

As such, in one embodiment, a distributor of the data receives compensation or consideration for enabling the targeted distribution of data. That is, the present embodiment is able to provide compensation or consideration to the distributor upon delivery of the advertisement to potentially targeted users whose user profiles satisfy the selection criteria. That is, by providing access to a plurality of potentially targeted users through a proprietary network controlled by the distributor, embodiments in accordance with the present invention establish an economic platform that generates income to the distributor for the targeted delivery of data to users whose user profiles satisfy the selection criteria.

In still another embodiment, the data distributor who forwards the offer to targeted users whose user profile satisfy the selection criteria receives compensation or consideration. That is, the data distributor receives compensation for delivering the offer to a user even though it has not yet been determined if the user accepts the offer for the delivery of the data.

In another embodiment, the distributor who controls access to the plurality of potentially targeted users is a search engine. In such an embodiment, the search engine provides the network to perform the targeted delivery of data and, as such receives compensation for the targeted delivery of data to users whose user profiles satisfy the selection criteria.

In still another embodiment, the distributor who controls access to the plurality of potentially targeted users is an interne service provider (ISP). In such an embodiment, the ISP provides the network to perform the targeted delivery of data and, as such receives compensation for the targeted delivery of data to users whose user profiles satisfy the selection criteria.

Also, in still another embodiment, the user to whom the data is delivered receives compensation or consideration. For example, an incentive as compensation or consideration is paid to the user for the user's attention in receiving and viewing the data. That is, an incentive payment associated with the query is paid to potentially targeted users whose user profiles satisfy the selection criteria and to whom the advertisement is delivered.

In addition, in another embodiment, the incentive determines if a targeted user deems it worthwhile to receive the data. That is, an offer is shown only to targeted users whose user selected relevancy criteria meets or falls below the incentive. A full discussion of the satisfaction of the user selected relevancy criteria is presented in relation to FIG. 9 of section 2.

Accordingly, various embodiments of the present invention disclose methods and systems for targeted data delivery. Embodiments of the present invention provide for protection of user privacy. In addition, other embodiments of the present invention provide the above accomplishments and provide for more efficient advertising by targeting advertising to interested recipients. Also, other embodiments of the present invention provide the above accomplishments and also discourage spam through a filtering mechanism through the preprocessing of messages to determine if they meet a relevancy criteria set by the user. In addition, embodiments of the present invention are able to provide an incoming revenue stream from commodity electronic devices after the initial sale of the electronic device (e.g., PCs). Various other embodiments achieve the above accomplishments and generate increased user interest for data by distributing data only to targeted users. Still other embodiments achieve the above accomplishments and also more efficiently advertise by delivering the advertisement to only users who are interested in it.

While the methods of embodiments illustrated in flow charts 100, 200A, 200B, 700, 900, 1300A, 1300B, 1500, 1700, 2000, 2100 and 2200 show specific sequences and quantity of operations, the present invention is suitable to alternative embodiments. For example, not all the operations provided for in the methods presented above are required for the present invention. Furthermore, additional operations can be added to the operations presented in the present embodiments. Likewise, the sequences of operations can be modified depending upon the application.

Section 7

Method and System for Offsetting Printing Costs in a System for Targeted Data Delivery As an overview, the discussion above describes incentive payments and their distribution upon the selection and viewing of data on a display, such as advertisements, that are offered to a user. That is, an incentive is provided as earned compensation to view data (e.g., messages, digital content, advertisements, coupons, etc.) that is targeted to the user. This compensation comes in the form of some valuation (e.g., cash, points, frequent flier miles, etc.) and can then be exchanged for goods and services benefiting the user. In a sense, the incentive is pushed to the user after the user selects a corresponding and targeted advertisement for viewing on a display. The following section, on the other hand, will describe in detail the printing of targeted data, instead of or in conjunction with the viewing of the data on a display, and the incentives presented to the user to offset the cost of printing the targeted data. That is, embodiments of the present invention provide for the selection of targeted data that are printed on an attached printing device, such as an inkjet printer, and the various incentives provided to the user to compensate the user for printing the advertisement.

As described previously, according to embodiments of the present invention, referring to FIGS. 3 and 4, compensation as an incentive is pushed to the user upon acceptance of the delivery of targeted data. That is, a query 323 for the delivery of data includes a payment 327, as compensation, that is delivered to the user 350 once the user profile matches selection criteria include in the query and the payment exceeds a threshold. Specifically, the user profile of the user 350 includes a threshold 345 that defines, as also previously discussed in relation to FIG. 9, a relevancy criteria (e.g., a threshold) that defines the minimum payment required to make it worthwhile for the user 350 to accept delivery of data. For example, the threshold defines the payment to the user 350 required for the user 350 to willingly view an advertisement.

In addition, embodiments of the present invention provide for the application of part of the compensation provided to the user for the delivery of data as an additional incentive that is provided to the user for offsetting the cost of printing the relevant data that is targeted to the user 350. Specifically, the cost of printing of relevant data on a client device for viewing the targeted data is conventionally absorbed by the user 350. This cost is cumulative over time with each targeted data that is printed. In addition the costs may increase if the printing is accomplished in color, or in color with high resolution. As such, it may be undesirable to the user 350 to bear the cost of printing relevant data, such as advertisements, coupons, etc.

However, embodiments of the present invention offset the cost of printing relevant data. That is, instead of burdening the user 350 with the cost of printing relevant data, the cost of printing is offset by providing an incentive to the user 350 for printing the relevant data. The incentives may take the form of cash, coupons, frequent flier miles, points that are accumulated for purchasing goods or services, replacement ink cartridges, etc.

Accordingly, embodiments of the present invention provide for the cost of printing relevant data by each of the plurality of data sources 510 of FIG. 5 that originates and creates the targeted data that is eventually presented and delivered to the user 350 upon acceptance. As a result, because the cost of printing relevant data is not borne by the user 350, embodiments of the present invention provide for increased user interest in the interaction with the relevant data through the printing medium.

In particular, each of the plurality of data sources 510 is willing to bear the cost of printing because the benefits to the data source (e.g., increased sales or interest) may outweigh the cost of offsetting the printing costs to the user 350. This is analogous to the advertisers bearing the cost of junk postal mail. That is, the cost of sending the junk postal mail is borne by the senders of the messages in the junk mail because the benefits outweigh the cost of sending the junk mail. For example, credit car offers through the mail will, over time, generate new credit card customers.

In a concrete example, direct mail response rates can be around one percent. Assuming it costs $0.50 to send advertisements through the mail, it would require that the direct mailer to earn more than $50.00 per acquired customer to be profitable. Specifically, for every 100 recipients, the total cost to the advertiser is $50.00.

On the other hand, embodiments of the present invention allow for printing relevant items of targeted data. The advantage of embodiments of the present invention are that the data is targeted, and may increase response rates. In addition, the cost of delivering relevant data that is targeted to the user 350 is less expensive than direct mail. For purposes of illustration, assuming the response rate is still one percent. As such, if the cost for printing an item associated with relevant data is $0.20 then assuming that the advertiser is still willing to spend $0.50 for every customer, then there would be $0.30 left over for distribution. That is, $0.20, or an equivalent, is presented to the user 350 as an incentive, and $0.30 is distributed among various entities, such as the data distributor 520 as network owner, or to the user 350.

If response rates are higher than one percent, as anticipated for embodiments of the present invention since the relevant data is targeted to the user 350, then in the present illustration, the advertiser, or data source, is able to spend $1.00 per user, assuming that the acquired user would still spend $50.00. As such, again, $0.20 would be applied to the cost of printing, and $0.80 is available for other distribution.

Figure 23:
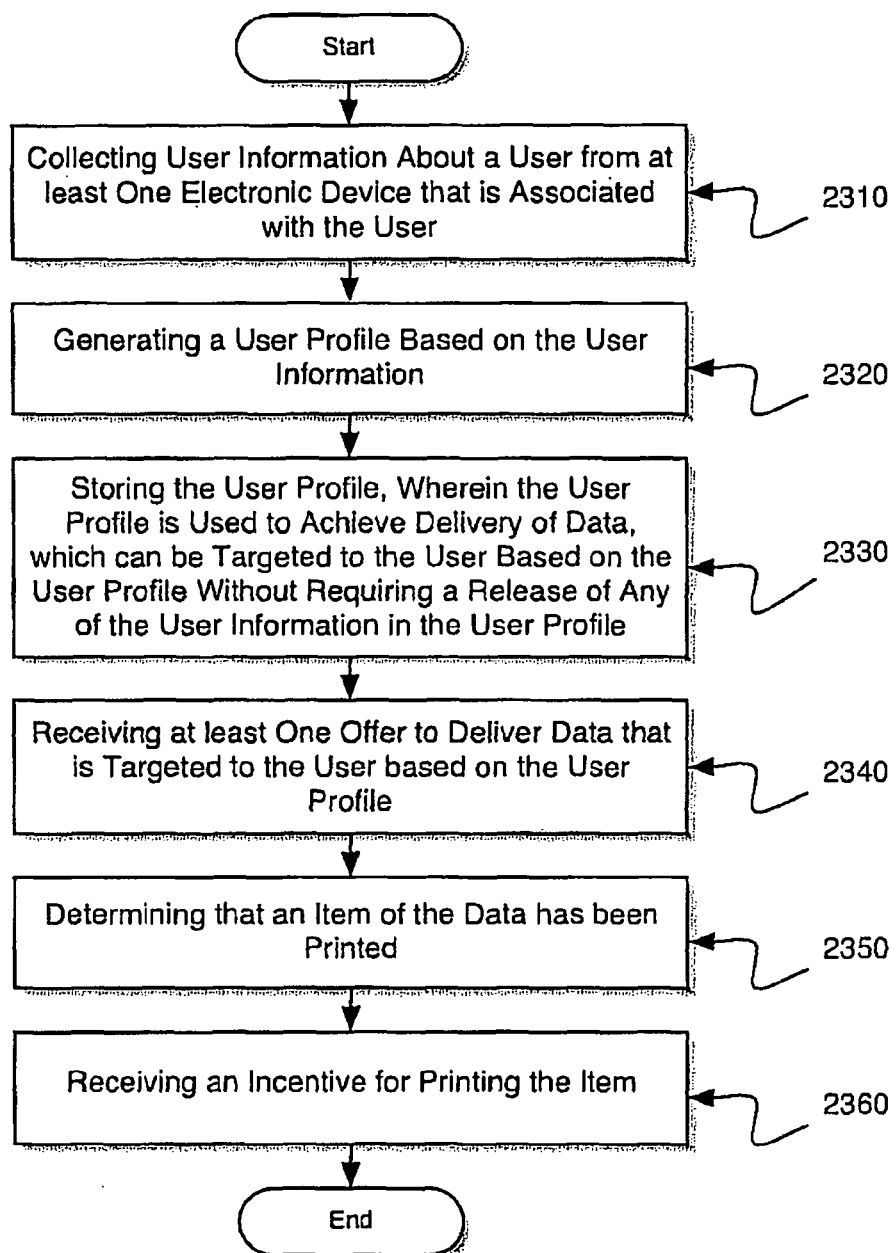
FIG. 23 illustrates a flow chart illustrating a computer implemented method for offsetting printing costs, in accordance with one embodiment of the present invention.
Figure 24:
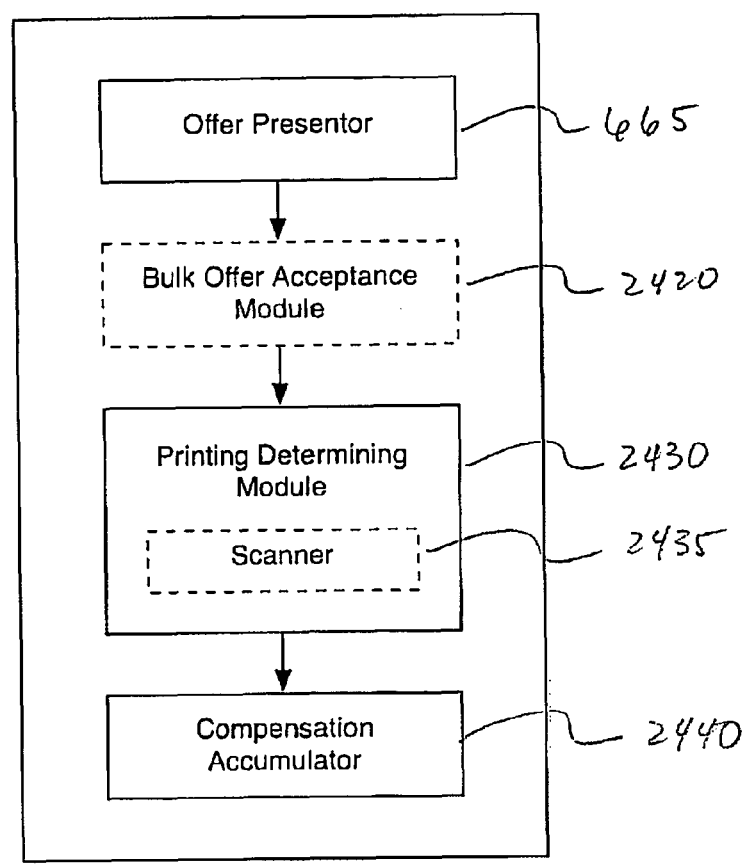
FIG. 24 is a diagram of a system that is capable of offsetting the cost of printing targeted data, in accordance with one embodiment of the present invention.

FIGS. 23 and 24 in combination illustrate a method and system for offsetting printing costs. Specifically, the flow chart 2300 of FIG. 23 illustrates a computer implemented method for offsetting the cost of printing relevant data, in accordance with one embodiment of the present invention. The system 2400 of FIG. 24 implements the method of FIG. 23. As a result, embodiments of the present invention as disclosed in FIGS. 23 and 24 shifts the cost of printing relevant data from the user 350 to the originator of the relevant data (e.g., one of the data sources 510, advertisers, etc.).

Turning now to FIG. 23, the operations performed in 2310, 2320, and 2330 are analogous to the operations in part performed in 710, 720, and 770, respectively, of FIG. 7, in accordance with one embodiment of the present invention. That is, the present embodiment is capable of collecting user information, generating a user profile based on the user information, and storing the user profile, such that the user profile can be used to achieve delivery of data which can be targeted to the user 350 without requiring a release of any of the user information in the user profile using techniques previously discussed in relation to FIGS. 1, 2A, 2B, 7, 9, and others.

For instance, at 2310, the present embodiment collects user information about a user 350 from at least one electronic device that is associated with the user 350, as in 710 of FIG. 7. For example, the user information describing characteristics of the user 350 is collected from one or more of the electronic devices located below line D-D within the user layer of FIG. 5. As shown in FIG. 8, the collector 810 collects the user information, in one embodiment.

At 2320, a user profile is generated based on the user information, as in 720 of FIG. 7. That is, a user profile is generated based on the user information collected in 2310. Correspondingly, as shown in FIG. 8, user profile generator 820 implements the operation described at 2320 of FIG. 23, in one embodiment.

At 2330, the present embodiment stores the user profile. For example, the user profile is stored on the client machine 575 of FIG. 5, or in various other locations previously described. The user profile is used to achieve delivery of the data that is targeted to the user 350 based on the user profile without requiring a release of any of the user information in the user profile, as in 770 of FIG. 7.

At 2340, the present embodiment presents at least one offer to deliver data that is targeted to the user 350 based on the user profile. For example, the offer presentor 665 of FIGS. 6 and 2400 presents each offer to an electronic device associated with the user 350 for the delivery of data to the user 350. The data is relevant to the user 350 since the user profile of the user 350 satisfies the selection criteria presented in the associated offer. The present embodiment is able to present multiple offers to the user 350. Each of the offers is associated with data that is relevant to the user 350. The user 350 can select from the offers presented for viewing the relevant data.

More specifically, in accordance with embodiments of the present invention, the user 350 can select from the offers presented for printing the relevant data. That is, each of the offers includes printable items that are associated with the relevant data. In one embodiment, the relevant data in its entirety is the printable item. In another embodiment, the printable item is a subset of the relevant data associated with the offer. For instance, the relevant data may include the printable item, as well as viewable content for presentation on a display.

Once the user 350 determines which offer is desirable for selection, the user 350 sends a request for printing the item based on the associated offer. That is, the user 350 sends a request for printing the item associated with the relevant data on a printer associated with the user 350. The request may be sent to the data distributor 520 at the data distribution layer between line A-A and B-B, in one embodiment. In another embodiment, the printing request is sent directly to one of the plurality of data sources 510 that is originator of the relevant data. User privacy is maintained, in one embodiment, by presenting to the data source only the fact that the selection criteria has been satisfied by a requester of the relevant data, instead of releasing specific user information about the requester.

Various methods can be implemented for sending a request for the item. In one embodiment, the printable item is requested by clicking on a printing interface in the offer for the relevant data. In this embodiment, the user 350 has control over which of the items of data is printed for viewing by the user 350.

In another embodiment, the printable item is automatically printed once the offer is presented to the user 350. In this embodiment, the user 350 has limited control over which of the items of data are printed for viewing by the user 350. However, the cost of printing is not borne by the user 350, and as such, the user 350 is willing to receive the automatic printing of items of relevant data.

At 2350, the printing determining module 2430 of the present embodiment determines that an item associated with the relevant data targeted to the user 350 has been printed. That is, the printing determining module 2430 may implement various methods for determining and verifying that the item was in fact printed. The printing determining module 2430 may be located on the printing device itself, or on the electronic device controlling the printing device, or in any other location capable of monitoring the activities of the printing device.

For example, in one embodiment, the printing determining module includes an optional scanner 2435. That is, the printing determining module includes scanning functionality. As such, as soon as a printed page including contents of the item of relevant data, the printed page is immediately scanned. The scanned data can then be used by the printing determining module 2430 to determine if the item was actually printed.

In one embodiment, the printing determining module 2430 is implemented to reduce fraud. For instance, trusted hardware located in the printing device verifies that an actual printed page is generated for the printable item. The trusted hardware includes code that is unalterable. As such, the information generated by the printing determining module for verifying the item was printed can be trusted, and used for determining if any incentive for offsetting the cost of printing is presented to the user 350.

As such, the prevention of fraud is implemented to address users who pretend to print. As discussed above, printers are equipped with hardware that makes it difficult to pretend to print, in one embodiment. Another embodiment uses multi-function printers to immediately scan printed pages, as previously described.

At 2360, the compensation accumulator 2440 of the present embodiment receives an incentive for printing the item. That is, the incentive is provided for compensation for printing the item associated with the relevant data. As such, the incentive is provided to offset the cost of printing the item.

The compensation accumulator maintains a total value for the compensation received by the user 350. That is, for each item that is printed and an associated incentive received as compensation, the compensation is combined with a total value of compensation associated with the user 350. The compensation may take the form of cash value, or points, or any other type of valuation that is redeemable for goods and services.

In one embodiment, the compensation received for printing the item is redeemable only towards purchasing replacement ink cartridges. The compensation received for printing an item is added to the total value of compensation. As such, as soon as the total value exceeds a threshold the total value is redeemable towards the purchase or earning of a replacement ink cartridge. Upon redemption, the compensation accumulator adjusts the total value of compensation to reflect the purchase of a replacement ink cartridge.

In other embodiments, the compensation received for printing the item is redeemable for goods and services, to include replacement ink cartridges. That is, the compensation can take the form of cash to be used to purchase any number of goods and services.

In one embodiment, the redemption of the replacement ink cartridge occurs automatically. That is, the compensation accumulator is capable of determining when the threshold has been met or exceeded, and automatically generating communication that results in an ink cartridge being sent to the user 350. As an example, the compensation accumulator 2440 is able to determine a number of items that are printed. The number is associated with the total value of compensation that is accumulated. Once the number or total value of compensation reaches or exceeds a threshold, the replacement ink cartridge is automatically sent. For instance, the compensation accumulator 2440 communicates with the data distributor 520 of FIG. 5 that acts as a network owner to set in motion actions to send a replacement ink cartridge to the user 350, in one embodiment.

In one embodiment, a coupon is presented to the user 350 for a replacement ink cartridge. That is, the compensation accumulator 2440 is able to determine a number of items that are printed. The number is associated with the total value of compensation that is accumulated. A coupon is sent after the number has reached a threshold. That is, the coupon is mailed to the user 350, in one embodiment. In another embodiment, the coupon is delivered to the user 350 through the client device (e.g., e-mail, offer prensentor 665, etc.) As such, the user 350 is able to present the coupon to an authorized entity and in return receives a replacement cartridge. For instance, the coupon may be presented to the data distributor 520 in order for the data distributor to deliver an ink cartridge to the user 350. In another embodiment, the coupon is presented to a store or other authorized dealer for immediate delivery of the replacement ink cartridge.

In another embodiment, the cost of printing as represented by the compensation paid to the user 350, for example, is received by the data distributor 520 from the plurality of data sources 510.

In still another embodiment, the use of coupons is to prevent fraud. For instance, instead of sending a replacement ink cartridge, the coupon is sent (e.g., sent to be printed). If the fraudulent user is not actually printing the items associated with relevant data, then the coupons also would not be printed.

In another embodiment, to combat the problem of multiple printings of a coupon, in one embodiment, a unique bar code is associated with the coupons. The unique bar code is then verified before redemption. As such, a coupon with a unique bar code can only be redeemed once.

In one embodiment, as shown in FIG. 24, an optional bulk offer acceptance module 2420 is able to efficiently batch print multiple items of data. For instance, this may conserve paper, ink, and other resources by combining multiple items of data for printing. In one embodiment, multiple items are printed on one page. In another embodiment, each item is printed on separate pages for distinction.

In one embodiment, the bulk offer acceptance module 2440 collects at least one request for printing items of the data. These items are associated with the offers presented to the user. Each item is associated with an offer price as the incentive. As a result, the bulk offer acceptance module 2440 is able to batch print a subset of items requested for printing when a total value of offer prices associated with the subset reaches a threshold. That is, the items are printed when the total value of offer prices of the items selected for printing exceeds a minimum total threshold. For example, the minimum total threshold is predefined or set by the user. As such, the total value of the offer princes must be equal to or greater than the minimum total threshold.

For example, assume for purposes of illustration only a user's threshold prince is $0.50 per printed item, and the minimum total threshold prices is $2.00. When an offer for a printable item with an offer price of $0.70 is received by the user 350, the item is not printed since the minimum total threshold of $2.00 has not been exceeded by the total value of offer prices, $0.70.

Thereafter, a second offer has an offer price of $0.80. Also, a third offer has an offer price of $0.60. After receiving the third offer, the present embodiment is able to print all three times on one or more pages in continuous fashion and without gaps, since the total value of offer prices of $2.10 exceeds he minimum total threshold of $2.00.

The decision implemented by the bulk offer acceptance module 2420 is summarized in the following equation (1), where T is the minimum total Threshold, P is the number of pages required to print all the items, C is the cost for printing per page to print the items, and S is the total compensation for printing a set of items, as follows:

$$S >= T - (P*C) \qquad (1)$$

Note the cost per page to print was assumed to be zero in the above example for purposes of illustration only.

In another embodiment, the compensation to the user 350 varies depending on what the user 350 has requested. For instance, the present embodiment is able to determine that the user has viewed additional information associated with an item that was printed. As such, the present embodiment provides for receipt of a further incentive as compensation for viewing the additional information. For example, if a user views an accompanying online advertisement associated with the relevant data, as well as printing the item that is associated with the relevant data, then the present embodiment would deliver an additional incentive. For illustration purposes only, suppose the user views a car advertisement online. An incentive of $1.00 would be provided. Further, if the user 350 prints out information providing directions to a car dealership, then the user 350 would receive an additional $1.00.

In another embodiment, a test is provided to the user to verify when the user has interacted with the item that was printed. For instance, a guarantee of printing the item does not guarantee that the user 350 is actually reading or interacting with the printed item. To have higher confidence that the item was actually printed, and interacted with, one embodiment requires a content-relevant Turing test that is printed along with the printable item. As such, the user 350 needs to answer a question based on the Turing test that is printed. The Turing test is small enough in one embodiment, that the print preview option would not reveal the Turing test. The answer could be input through the client device (e.g., 340) associated with the user 350 and sent back to the compensation accumulator 2440 that determines if the item was printed and interacted with, in the present embodiment.

In still another embodiment, the data source would pay increasing amounts for printed items of increasing quality. For example, advertisers would pay more for advertisements that are printed with higher quality resolution (e.g., high glossy prints). These higher quality prints would then require that a higher incentive as compensation for offsetting printer costs be provided to the user 350.

In addition, the present embodiment is able to track the number and cost of the printed pages even if relevant data is not printed. That is, the present embodiment is able to track the number of pages that are printed, along with diagnostic information, such as the number and cost of each printed job, and possibly the ink used directly, etc. This information can be sent back to the data distributor 520 so that a replacement ink cartridge is sent out as needed by the user 350.

Additionally, in another embodiment, the diagnostic information that is collected is used to determine when a user needs a new printer. As such, the present embodiment would automatically send the user 350 a new printer. In this case, the present embodiment also compensates the user for wear and tear on the printer when printing jobs in general, and specifically for printing the items associated with the relevant data.

Figure 25:
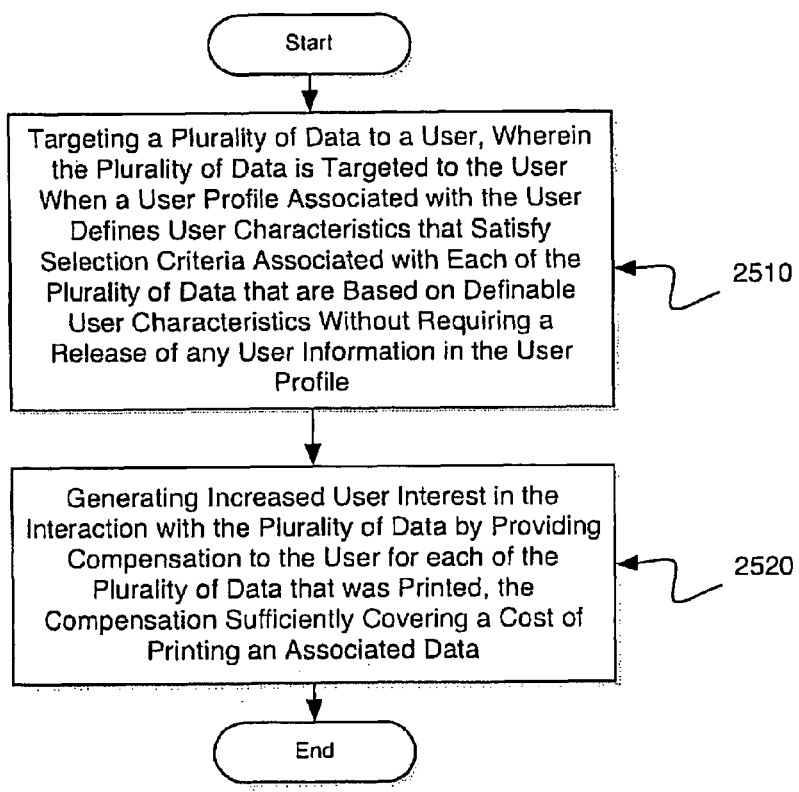
FIG. 25 is a flow chart illustrating a computer implemented method for generating increased user interest in the interaction of targeted data by offsetting the cost of printing targeted data, in accordance with one embodiment of the present invention.

FIG. 25 utilizes the methods and system as presented in FIGS. 1-24 to provide increased user interest in the interaction with data, in accordance with one embodiment of the present invention. Specifically, embodiments of the present invention of FIG. 25 are capable of being implemented within the network structures of FIGS. 5 and 12 for the interaction of targeted data, especially data that is printed. Increased user interest in the interaction with data that is printed is generated while preserving the privacy of users.

At 2510, the present embodiment targets a plurality of data to a user 350. The data is targeted to the user 350 when a user profile associated with said user 350 defines user characteristics that satisfy selection criteria associated with each of said plurality of data that are based on definable user characteristics without requiring a release of any user information in the user profile. As such, the present embodiment is able to present offers of relevant data to the user 350, which upon selection is printed out for the convenience of the user to view.

At 2520, the present embodiment generates increased user interest in the interaction with the plurality of data that is printed. Increased user interest is generated by providing compensation to the user 350 for each of the plurality of data that is printed. In one embodiment, the compensation sufficiently covers a cost of printing an associated data that is relevant and targeted to the user. In this way, the user has an increased interest in interacting with the printed data since the cost of printing the data relevant and targeted to the user is not borne by the user 350. Instead, the cost of printing is ultimately borne by the group of data sources 510 that are generating the data that is printed by the user 350.

While the invention is described in conjunction with the preferred embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the detailed description of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the present invention.

What is claimed is:

1. A computer implemented method for offsetting printing costs in a system for targeted data delivery, comprising:
    collecting, at said computer, user information about a user from at least one electronic device that is associated with said user;
    generating, at said computer, a user profile based on said user information;
    storing, at said computer, said user profile, wherein said user profile is used to achieve delivery of data, which can be targeted to said user based on said user profile without requiring a release of any of said user information in said user profile;
    receiving, at said computer from a data distributor, at least one offer to deliver data that is targeted to said user based on said user profile, including receiving, with said offer, selection criteria defining targeted user profiles for said data;
    determining, at said computer, that said user profile of said user matches said selection criteria for said data;
    after determining that said user profile of said user matches said selection criteria for said data, receiving, at said computer, said data;
    determining, by said computer, that an item of said data has been printed; and
    receiving, at said computer, an incentive for printing said item.

2. The method of claim 1, further comprising:
    sending a request for printing said item based on said at least one offer.

3. The method of claim 1, wherein said determining that an tem of said data has been printed further comprises:
    verifying said item has been printed to prevent fraud.

4. The method of claim 1, wherein said receiving an incentive is taken from a group further comprising:
    receiving compensation that is redeemable towards purchasing ink cartridges for printing said item;
    determining that a number of items of said data that has been printed and sending a replacement ink cartridge to said user after said number has reached a threshold; and
    determining that a number of items of said data that has been printed and sending a coupon for a replacement ink cartridge to said user after said number has reached a threshold.

5. The method of claim 1, further comprising:
    collecting at least one request for printing items of said data that are associated with said at least one offer, wherein each item is associated with an offer price as said incentive; and
    batch printing a subset of items requested for printing when a total value of offer prices associated with said subset reaches a threshold.

6. The method of claim 1, further comprising:
    determining that said user has viewed additional information associated with said item that was printed;
    receiving a further incentive for viewing said information.

7. The method of claim 1, further comprising:
    providing a test to said user for verifying if said user has interacted with said item that was printed.

8. A non-transitory computer-readable medium containing application instructions where said application instructions when executed effect a computer implemented method for offsetting printing costs, said computer comprising a client device, and said application instructions comprising:
    collecting, at said client device, user information about a user from at least one electronic device that is associated with said user;
    generating, at said client device, a user profile based on said user information;
    storing, at said client device, said user profile, wherein said user profile is used to achieve delivery of data, which can be targeted to said user based on said user profile without requiring a release of any of said user information in said user profile;
    receiving, at said client device from a data distributor, at least one offer to deliver data that is targeted to said user based on said user profile, including receiving, with said offer, selection criteria defining targeted user profiles for said data;
determining, at said client device, that said user profile of said user matches said selection criteria for said data;
after determining that said user profile of said user matches said selection criteria for said data, receiving, at said client device, said data;
determining, by said client device, that an item of said data has been printed; and
receiving, at said client device, an incentive for printing said item.

9. The non-transitory computer-readable medium recited in claim 8, further comprising additional instructions which, when executed effect said method for offsetting printing costs, said additional instructions comprising:
sending a request for printing said item based on said at least one offer.

10. The non-transitory computer-readable medium recited in claim 8, wherein said instruction for determining that an item of said data has been printed comprises additional instructions which, when executed effect said method for offsetting printing, said additional instructions further comprising:
verifying that said item has been printed to prevent fraud.

11. The non-transitory computer-readable medium recited in claim 8, wherein said instruction for receiving an incentive comprises additional instructions which, when executed effect said method for offsetting printing, said additional instructions taken from a group comprising:
receiving compensation that is redeemable towards purchasing ink cartridges for printing said item;
determining that a number of items of said data that has been printed and sending a replacement ink cartridge to said user after said number has reached a threshold; and
determining that a number of items of said data that has been printed and sending a coupon for a replacement ink cartridge to said user after said number has reached a threshold.

12. The non-transitory computer-readable medium recited in claim 8, further comprising additional instructions which, when executed effect said method for offsetting printing costs, said additional instructions comprising:
collecting at least one request for printing items of said data that are associated with said at least one offer, wherein each item is associated with an offer price as said incentive; and
batch printing a subset of items requested for printing when a total value of offer prices associated with said subset reaches a threshold.

13. The non-transitory computer-readable medium recited in claim 8, further comprising additional instructions which, when executed effect said method for offsetting printing costs, said additional instructions comprising:
determining that said user has viewed additional information associated with said item that was printed;
receiving a further incentive for viewing said information.

14. The non-transitory computer-readable medium recited in claim 8, further comprising additional instructions which, when executed effect said method for offsetting printing costs, said additional instructions comprising:
providing a test to said user for verifying if said user has interacted with said item that was printed.

15. The method of claim 1, further comprising:
scaling said incentive based on a quality of resolution of said printing of said item.

16. The method of claim 1, further comprising:
increasing said incentive for printing of said item in color.

17. The method of claim 5, wherein said threshold is predefined by said user.

18. The method of claim 5, wherein said threshold is a minimum total threshold, and said total value of offer prices is represented by $S>=T-(P*C)$, where S is a total compensation for printing said subset of items, T is said minimum total threshold, P is a number of pages used to print said subset of items, and C is a printing cost per page to print said subset of items.

19. The non-transitory computer-readable medium recited in claim 8, further comprising additional instructions which, when executed effect said method for offsetting printing costs, said additional instructions comprising:
scaling said incentive based on a quality of resolution of said printing of said item, and increasing said incentive for printing of said item in color.

20. The non-transitory computer-readable medium recited in claim 12, wherein said threshold is a minimum total threshold predefined by said user, and said total value of offer prices is represented by $S>=T-(P*C)$, where S is a total compensation for printing said subset of items, T is said minimum total threshold, P is a number of pages used to print said subset of items, and C is a printing cost per page to print said subset of items.

* * * * *

UNITED STATES PATENT AND TRADEMARK OFFICE
CERTIFICATE OF CORRECTION

| | |
|---|---|
| PATENT NO. | : 8,296,181 B1 |
| APPLICATION NO. | : 11/414245 |
| DATED | : October 23, 2012 |
| INVENTOR(S) | : Rajan Mathew Lukose et al. |

Page 1 of 1

It is certified that error appears in the above-identified patent and that said Letters Patent is hereby corrected as shown below:

In column 66, line 23, in Claim 3, delete "tem" and insert -- item --, therefor.

Signed and Sealed this
Twenty-sixth Day of February, 2013

Teresa Stanek Rea
*Acting Director of the United States Patent and Trademark Office*